(12) United States Patent
Tamura

(10) Patent No.: US 7,986,467 B2
(45) Date of Patent: Jul. 26, 2011

(54) ZOOM LENS AND IMAGING APPARATUS

(75) Inventor: Masaki Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 12/065,024

(22) PCT Filed: Jun. 28, 2007

(86) PCT No.: PCT/JP2007/063027
§ 371 (c)(1),
(2), (4) Date: Sep. 2, 2009

(87) PCT Pub. No.: WO2008/001861
PCT Pub. Date: Jan. 3, 2008

(65) Prior Publication Data
US 2010/0014169 A1    Jan. 21, 2010

(30) Foreign Application Priority Data

Jun. 28, 2006 (JP) .................................. 2006-177855
Sep. 19, 2006 (JP) .................................. 2006-253251

(51) Int. Cl.
*G02B 15/14* (2006.01)
(52) U.S. Cl. ........ 359/686; 359/683; 359/684; 359/687; 359/715; 359/726; 359/727; 359/771
(58) Field of Classification Search .................. 359/683, 359/684, 686, 687, 715, 726, 727, 771
See application file for complete search history.

(56) References Cited

U.S. PATENT DOCUMENTS 5,861,986 A    1/1999   Tanaka et al.
(Continued)

FOREIGN PATENT DOCUMENTS

EP    1637913 A2    3/2006
(Continued)

OTHER PUBLICATIONS

International Search Report dated Jun. 28, 2007.
(Continued)

*Primary Examiner* — Evelyn A. Lester
(74) *Attorney, Agent, or Firm* — SNR Denton US LLP

(57) ABSTRACT

This is addressed to provide a zoom lens which has a good optical performance for imaging device having a large number of pixels even with its simple construction, and which can also be small and thin in structure, and an imaging apparatus using the zoom lens. A zoom lens 1 is composed by arranging, in the following order from an object side, a first lens group GR1 having a weak refractive power, a second lens group GR2 having a negative refractive power, a third lens group GR3 having a positive refractive power, and a fourth lens group GR4 having a positive refractive power, and is configured to perform zooming by moving the second lens group and the third lens group. The first lens group is composed by arranging, in the order from an object side, a single lens G1 having a a negative refractive power, a prism G1 for folding an optical path, and a single lens G3 having a a positive refractive power. The second lens group is composed of one single lens G4 having a negative refractive power, and satisfies the following conditional formula (1):

$$t2/fw<0.4 \qquad (1)$$

where t2 represents the center thickness of the single lens having a negative refractive power constituting the second lens group, and fw represents the focal length of a whole lens system at a wide-angle position.

24 Claims, 35 Drawing Sheets

U.S. PATENT DOCUMENTS

| | | | | |
|---|---|---|---|---|
| 6,771,432 B2 * | 8/2004 | Mihara | ............... | 359/687 |
| 6,975,462 B2 * | 12/2005 | Mihara | ............... | 359/687 |
| 7,085,070 B2 * | 8/2006 | Mihara | ............... | 359/686 |
| 7,145,730 B2 * | 12/2006 | Mihara | ............... | 359/686 |
| 7,154,680 B2 * | 12/2006 | Satori et al. | ............... | 359/687 |
| 7,215,486 B2 * | 5/2007 | Mihara | ............... | 359/687 |
| 7,218,455 B2 * | 5/2007 | Iwasawa | ............... | 359/680 |
| 7,286,299 B2 * | 10/2007 | Matsui | ............... | 359/687 |
| 7,505,210 B2 * | 3/2009 | Kuroda et al. | ............... | 359/676 |
| 7,508,595 B2 * | 3/2009 | Kojima | ............... | 359/687 |
| 7,522,346 B2 * | 4/2009 | Hagimori et al. | ............... | 359/676 |
| 7,782,542 B2 * | 8/2010 | Mihara | ............... | 359/680 |
| 7,872,806 B2 * | 1/2011 | Mihara et al. | ............... | 359/676 |
| 2004/0051960 A1 * | 3/2004 | Mihara | ............... | 359/686 |
| 2004/0179273 A1 | 9/2004 | Ishikawa et al. | | |
| 2006/0268427 A1 * | 11/2006 | Mihara | ............... | 359/686 |

FOREIGN PATENT DOCUMENTS

| | | |
|---|---|---|
| JP | 64-044908 | 2/1989 |
| JP | 04-223418 | 8/1992 |
| JP | 11-119100 | 4/1999 |
| JP | 11-281889 | 10/1999 |
| JP | 2000-131610 | 5/2000 |
| JP | 2001-091861 | 4/2001 |
| JP | 2002-072089 | 3/2002 |
| JP | 2003-315687 | 11/2003 |
| JP | 2004-348082 | 12/2004 |
| JP | 2004-354869 | 12/2004 |
| JP | 2005-266173 | 9/2005 |
| JP | 2005-308963 | 11/2005 |
| JP | 2006-154481 | 6/2006 |
| JP | 2006-163075 | 6/2006 |

OTHER PUBLICATIONS

Japanese Patent Office Action corresponding to Japanese Serial No. 2006-253251 dated Jul. 1, 2010.

European Patent Office, Search Report and Communication issued in Patent Application EP 07767820.9, on Sep. 24, 2010.

* cited by examiner

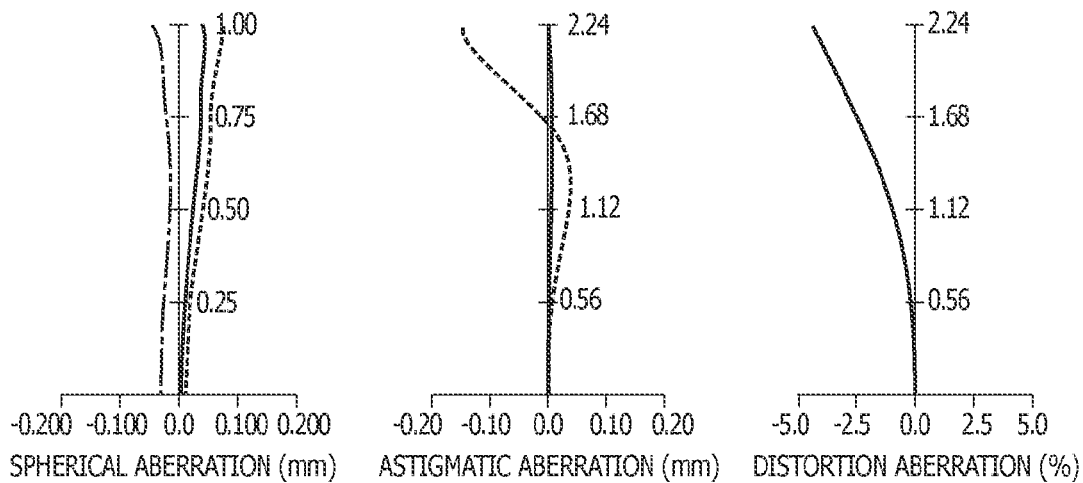
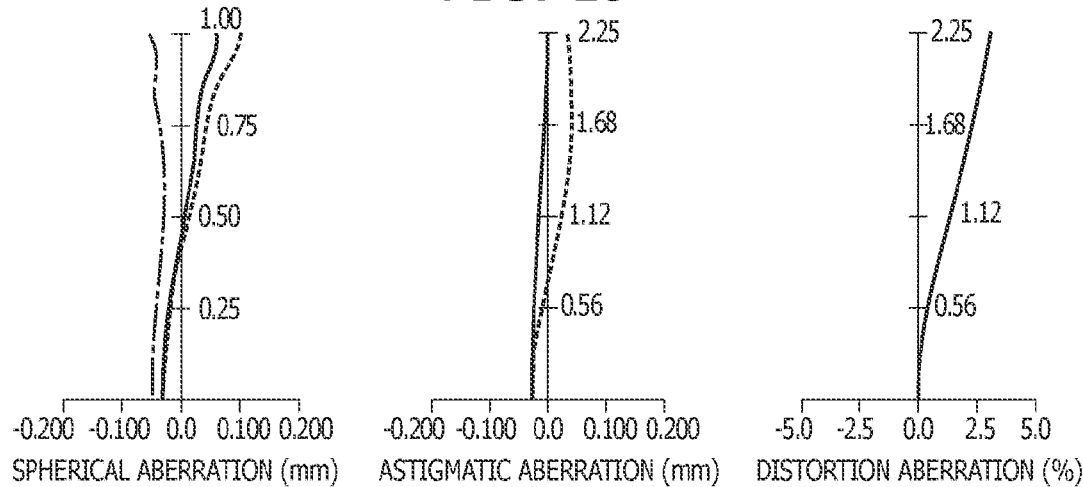
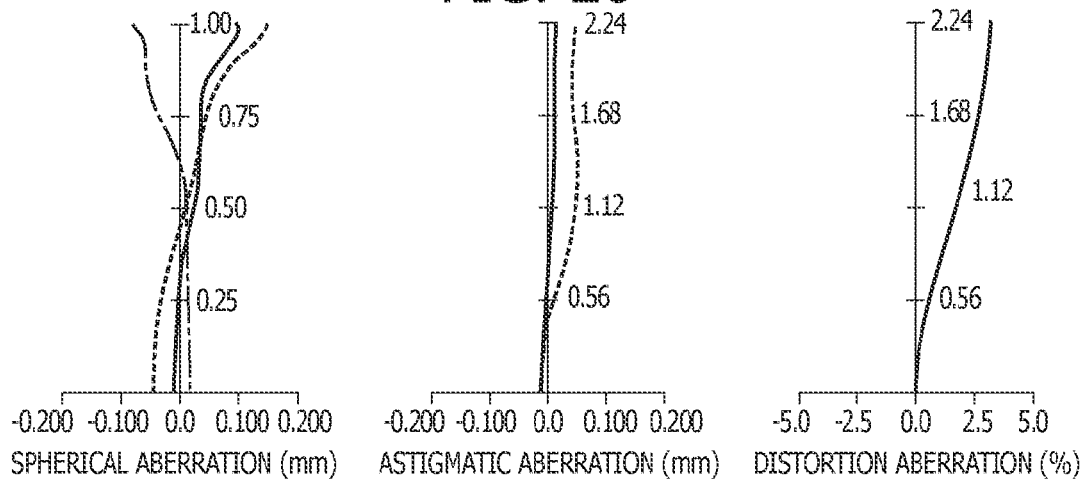

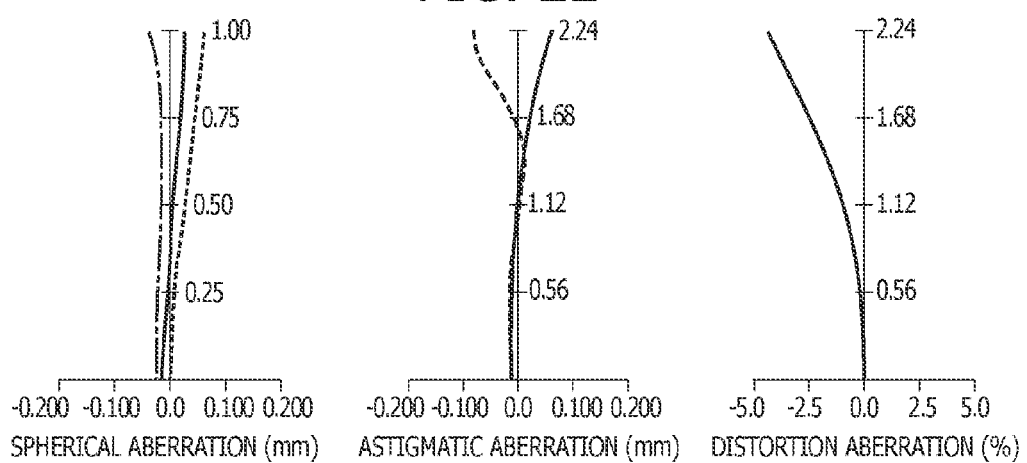
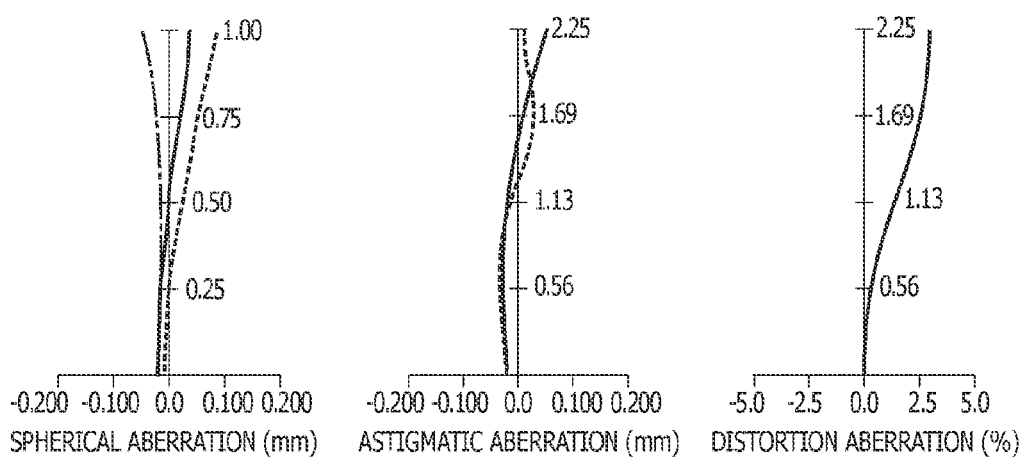
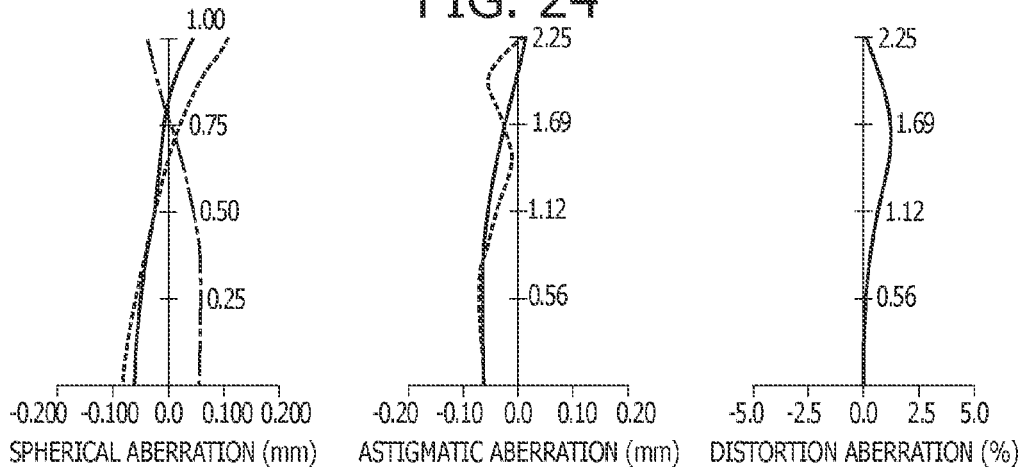

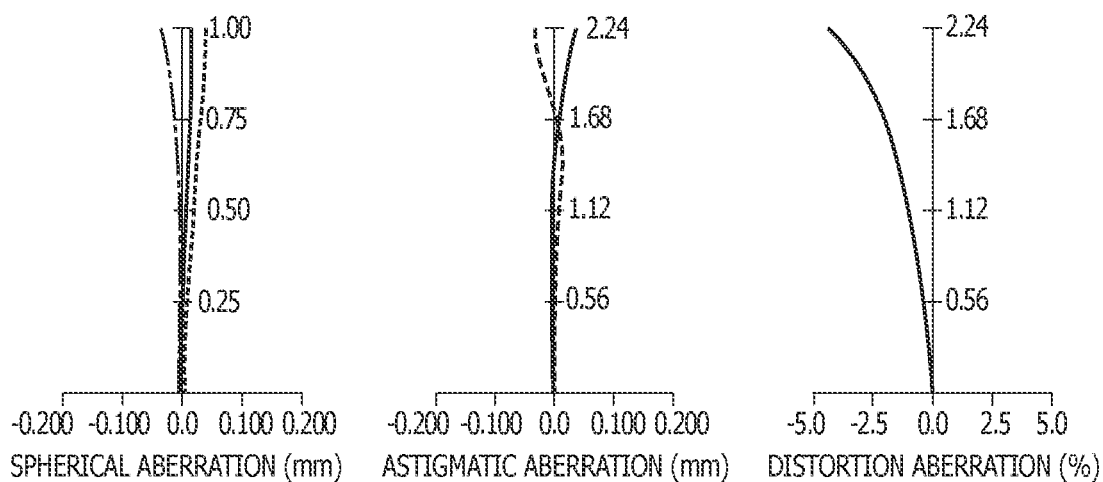
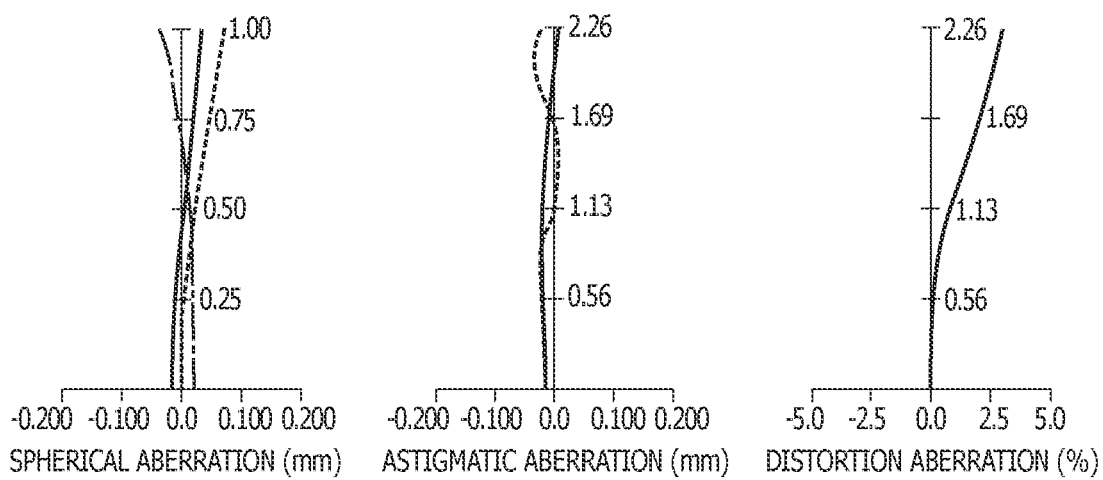
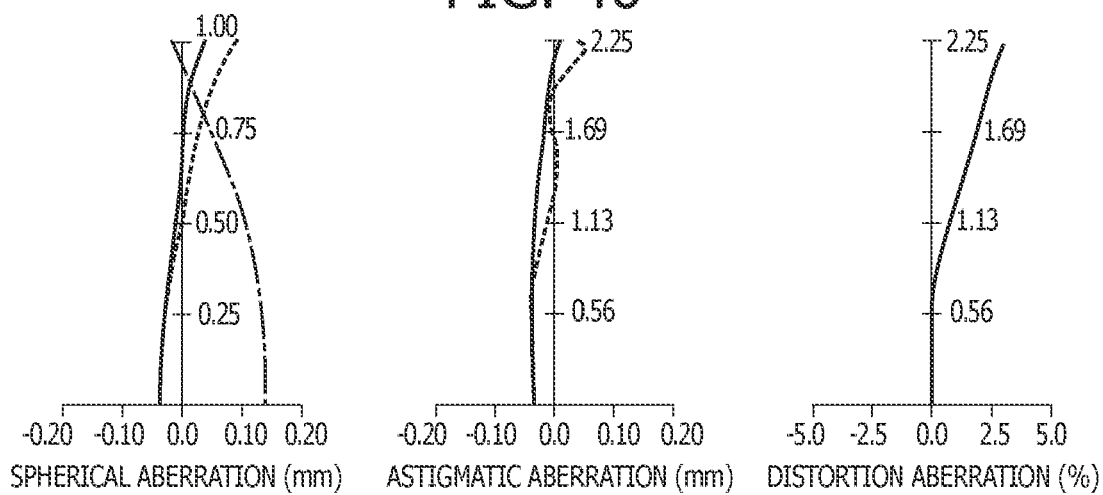

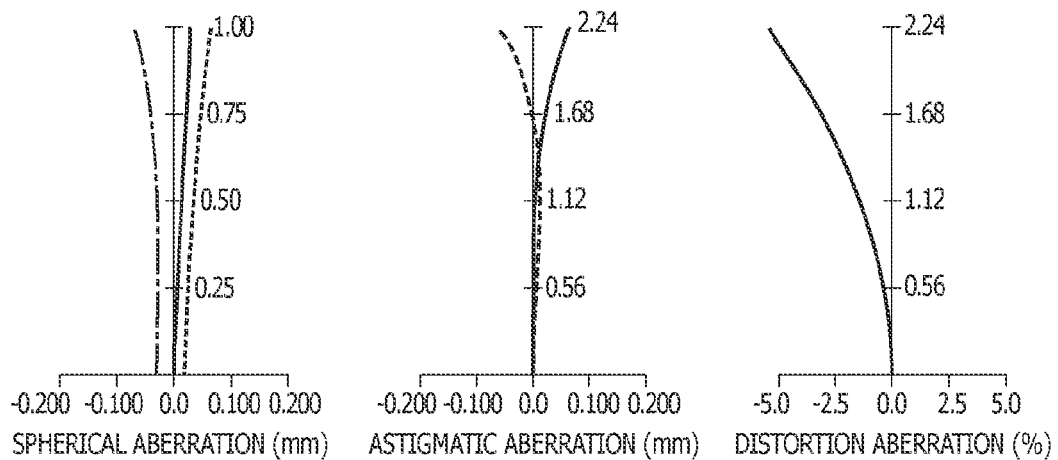
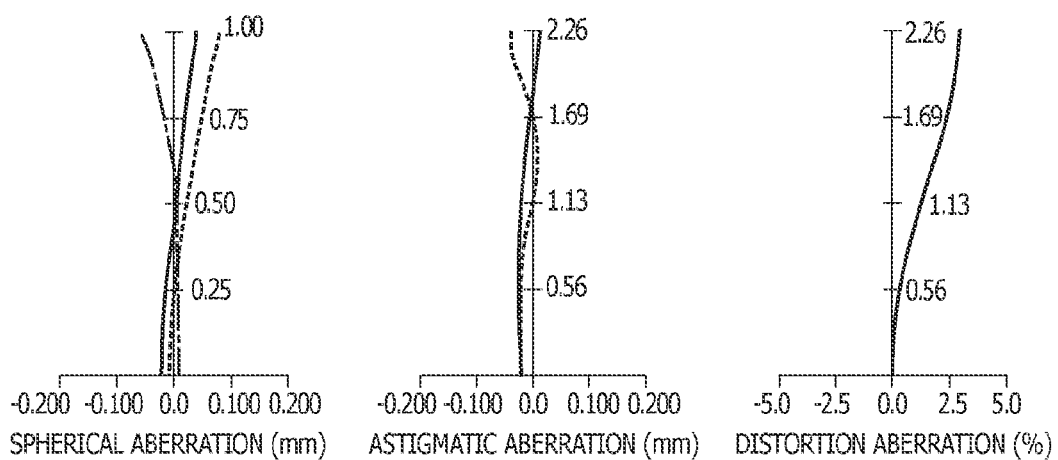
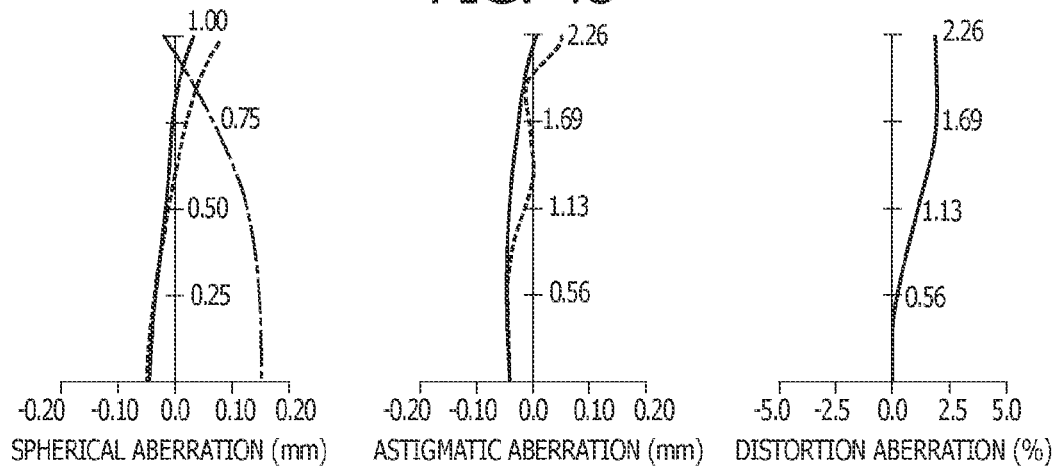

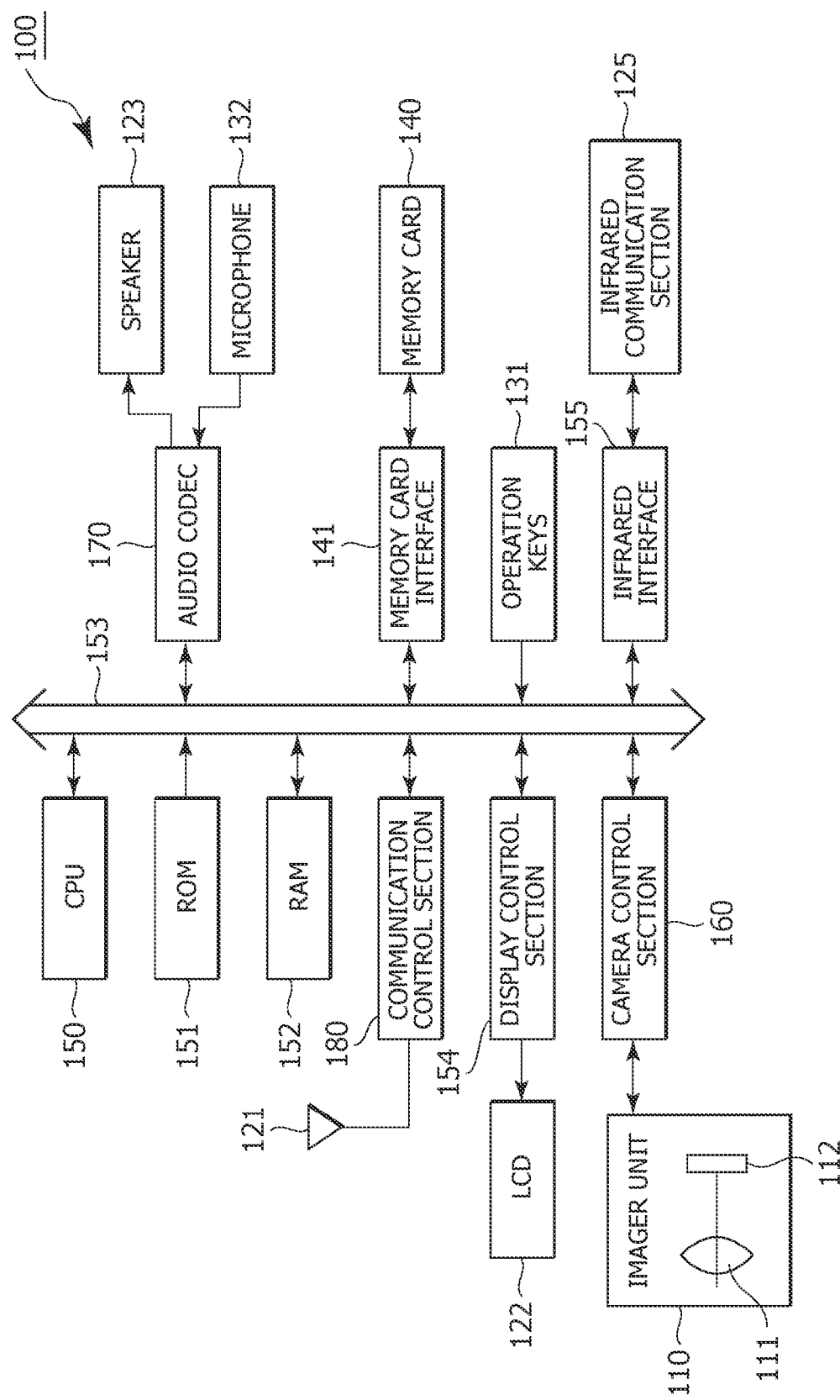

ZOOM LENS AND IMAGING APPARATUS

TECHNICAL FIELD

The present invention relates to a zoom lens and an imaging apparatus using this zoom lens as an imager lens, and more particularly, to a zoom lens having a zooming ratio of about three times and an imaging apparatus using this zoom lens, which are suitable for camera-equipped cellular phones and digital still cameras using a solid-state imaging device such as a CCD (Charge Coupled Device) or a CMOS (Complementary Metal Oxide Semiconductor).

BACKGROUND ART

Camera-equipped cellular phones and digital still cameras using a solid-state imaging device such as a CCD or a CMOS have been hitherto known. In such an imaging apparatus, further reductions in the size and the thickness are required, and an imager lens to be incorporated therein whose total length and depth are short is also demended.

Meanwhile, even in small-sized image capture equipment such as camera-equipped cellular phones, a trend is toward their miniaturization as well as a larger number of pixels in their imaging device in recent years, and it is required that even an imager lens to be incorporated therein have a high lens performance for such a solid-state imaging device having a large number of pixels.

In addition, as part of the above-mentioned requirements, even in the small-sized image capture equipment such as camera-equipped cellular phones, there has been a growing demand for optical zoom lenses.

As small- and thin-sized, high-performance zoom lenses, there have been proposed those which, by arranging a prism for folding an optical path in a lens group, have achieved size and thickness reductions in a direction of an incident light axis. For example, zoom lenses disclosed in Japanese Unexamined Patent Application Publications No. 2000-131610 and No. 2004-354869 are known.

The zoom lenses disclosed in the above-mentioned Japanese Unexamined Patent Application Publications No. 2000-131610 and No. 2004-354869 are zoom lenses which have at least a first lens group having a positive refractive power, a second lens group having a negative refractive power, a third lens group having a positive refractive power, and a fourth lens group having a positive refractive power, arranged in order from an object side, and which, by arranging a prism for folding an optical path in the first lens group, have achieved a thickness reduction in the direction of the incident light axis.

However, in the zoom lenses of this type, their total optical length is still large, and when considered to be incorporated in small-sized image capture equipment such as a camera-equipped cellular phone, the zoom lenses are inadequate in view of miniaturization. In addition, due to the facts that the number of lenses is large and that a glass material is used in many constituent lenses, there has been an issue such that the manufacturing cost is elevated.

The present invention has been made in view of the issues such as mentioned above, and is intended to provide a zoom lens which has a good optical performance for imaging device having a large number of pixels even with its simple construction, and which can also be small and thin in structure, and an imaging apparatus using the zoom lens.

DISCLOSURE OF THE INVENTION

A zoom lens according to an embodiment of a first invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a single lens having a negative refractive power, a prism for folding an optical path, and a single lens having a positive refractive power. The second lens group is composed of one single lens having a negative refractive power, and satisfies the following conditional formula (1):

$$t2/fw < 0.4 \quad (1)$$

where t2 represents the center thickness of the single lens having a negative refractive power constituting the second lens group, and fw represents the focal length of a whole lens system at a wide-angle position.

A zoom lens according to an embodiment of a second invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a single lens having a negative refractive power, a prism for folding an optical path, and a single lens having a positive refractive power. The second lens group is composed of one single lens having a negative refractive power, and satisfies the following conditional formula (1):

$$t2/fw < 0.4 \quad (1)$$

where t2 represents the center thickness of the single lens having a negative refractive power constituting the second lens group, and fw represents the focal length of a whole lens system at a wide-angle position.

A zoom lens according to an embodiment of a third invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a lens prism having a negative refractive power for folding an optical path, and a single lens having a positive refractive power. The second lens group is composed of one single lens having a negative refractive power, and satisfies the following conditional formula (1):

$$t2/fw < 0.4 \quad (1)$$

where t2 represents the center thickness of the single lens having a negative refractive power constituting the second lens group, and fw represents the focal length of a whole lens system at a wide-angle position.

A zoom lens according to an embodiment of a fourth invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a lens prism having a negative refractive power for folding an optical path, and a single lens having a positive refractive power. The second lens group is composed of one single lens having a negative refractive power, and satisfies the following conditional formula (1):

$$t2/fw<0.4 \quad (1)$$

where t2 represents the center thickness of the single lens having a negative refractive power constituting the second lens group, and fw represents the focal length of a whole lens system at a wide-angle position.

An imaging apparatus according to an embodiment of the first invention in the present invention has a zoom lens and an imaging device for converting an optical image formed by the zoom lens into an electrical signal. The zoom lens is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a single lens having a negative refractive power, a prism for folding an optical path, and a single lens having a positive refractive power. When t2 represents the center thickness of the single lens having a negative refractive power constituting the second lens group and fw represents the focal length of a whole lens system at a wide-angle position, a conditional formula (1) t2/fw<0.4 is satisfied.

An imaging apparatus according to an embodiment of the second invention in the present invention has a zoom lens and an imaging device for converting an optical image formed by the zoom lens into an electrical signal. The zoom lens is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a single lens having a negative refractive power, a prism for folding an optical path, and a single lens having a positive refractive power. The second lens group is composed of one single lens having a negative refractive power, and, if t2 represents the center thickness of the single lens having a negative refractive power constituting the second lens group and fw represents the focal length of a whole lens system at a wide-angle position, satisfies a conditional formula (1) t2/fw<0.4.

An imaging apparatus according to an embodiment of the third invention in the present invention has a zoom lens and an imaging device for converting an optical image formed by the zoom lens into an electrical signal. The zoom lens is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a lens prism having a negative refractive power for folding an optical path, and a single lens having a positive refractive power. The second lens group is composed of one single lens having a negative refractive power, and, when t2 represents the center thickness of the single lens having a negative refractive power constituting the second lens group and fw represents the focal length of a whole lens system at a wide-angle position, satisfies a conditional formula (1) t2/fw<0.4.

An imaging apparatus according to an embodiment of the fourth invention in the present invention has a zoom lens and an imaging device for converting an optical image formed by the zoom lens into an electrical signal. The zoom lens is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a lens prism having a negative refractive power for folding an optical path, and a single lens having a positive refractive power. The second lens group is composed of one single lens having a negative refractive power, and, when t2 represents the center thickness of the single lens having a negative refractive power constituting the second lens group and fw represents the focal length of a whole lens system at a wide-angle position, satisfies a conditional formula (1) t2/fw<0.4.

According to the present invention, the zoom lens and the imaging apparatus have a good optical performance for an imaging device having a large number of pixels even with their simple constructions, and can also be composed small and thin in structure.

BRIEF DESCRIPTION OF DRAWINGS

FIG. 18 is a graph showing, along with FIGS. 19 and 20, aberrations of a numeral example 5 obtained by applying specific numerical values to the fifth embodiment, FIG. 18 showing a spherical aberration, an astigmatic aberration, and a distortion aberration measured at the wide-angle position.

FIG. 19 is a graph showing a spherical aberration, an astigmatic aberration, and a distortion aberration at the intermediate focal length.

FIG. 20 is a graph showing a spherical aberration, an astigmatic aberration, and a distortion aberration at the telephoto position.

FIG. 22 is a graph showing, along with FIGS. 23 and 24, aberrations of a numeral example 6 obtained by applying specific numerical values to the sixth embodiment, FIG. 22 showing a spherical aberration, an astigmatic aberration, and a distortion aberration at the wide-angle position.

FIG. 23 is a graph showing a spherical aberration, an astigmatic aberration, and a distortion aberration at the intermediate focal length.

FIG. 24 is a graph showing a spherical aberration, an astigmatic aberration, and a distortion aberration at the telephoto position.

FIG. 38 is a graph showing, along with FIGS. 39 and 40, aberrations of a numeral example 4 obtained by applying specific numerical values to the fourth embodiment, FIG. 38 showing a spherical aberration, an astigmatic aberration, and a distortion aberration at the wide-angle position.

FIG. 39 is a graph showing a spherical aberration, an astigmatic aberration, and a distortion aberration at the intermediate focal length.

FIG. 40 is a graph showing a spherical aberration, an astigmatic aberration, and a distortion aberration at the telephoto position.

FIG. 46 is a graph showing, along with FIGS. 47 and 48, aberrations of a numeral example 2 obtained by applying specific numerical values to the second embodiment, FIG. 46 showing a spherical aberration, an astigmatic aberration, and a distortion aberration at the wide-angle position.

FIG. 47 is a graph showing a spherical aberration, an astigmatic aberration, and a distortion aberration at the intermediate focal length.

FIG. 48 is a graph showing a spherical aberration, an astigmatic aberration, and a distortion aberration at the telephoto position.

FIG. 67 is a block diagram showing an internal configuration.

BEST MODES FOR CARRYING OUT THE INVENTION

Figure 1:
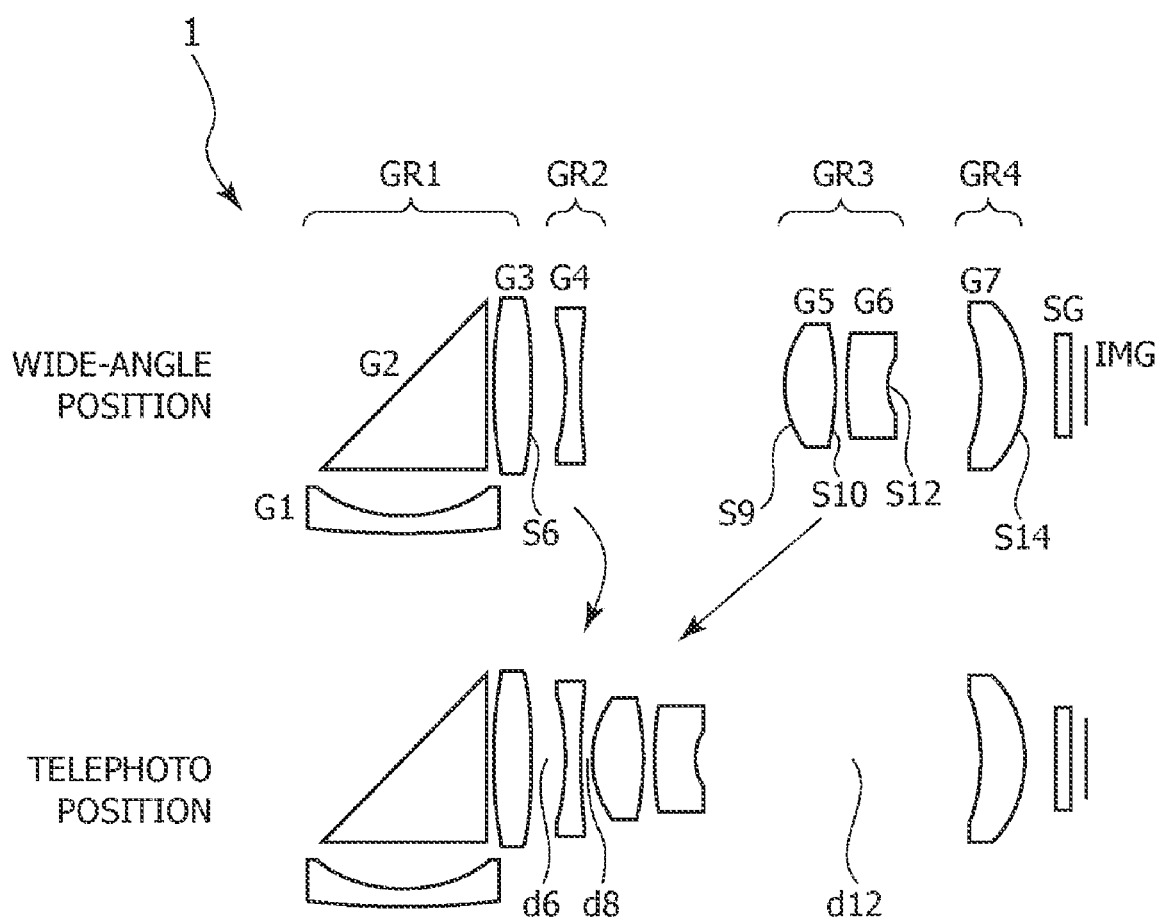
FIG. 1 is a diagram showing the lens construction of a first embodiment of a zoom lens according to a first invention in the present invention.

The best mode for carrying out a zoom lens and an imaging apparatus of the present invention will be described below with reference to the drawings and tables.

A zoom lens according to a first invention in the present invention will be described first.

The zoom lens according to the first invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a single lens having a negative refractive power, a prism for folding an optical path, and a single lens having a positive refractive power. The second lens group is composed of one single lens having a negative refractive power, and satisfies the following conditional formula (1):

$$t2/fw < 0.4 \qquad (1)$$

where t2 represents the center thickness of the single lens having a negative refractive power constituting the second lens group, and fw represents the focal length of the whole lens system at a wide-angle position.

The zoom lens by the first invention in the present invention is constructed as described above, thereby having a good optical performance for an imaging device having a large number of pixels even with its simple construction, and can also be constructed small and thin in structure.

Namely, by constituting the first lens group by arranging the single lens having a negative refractive power, the prism for folding the optical path, and the single lens having a positive refractive power, in order from the object side, a direction in which the second lens group and the third lens group are moved for zooming equals an optical-axis direction of the single lens having a positive refractive power of the first lens group, so that the thickness is reduced in a direction of an incident light axis.

In addition, by constituting the second lens group of the one single lens having a negative refractive power and by setting the second lens group so as to satisfy the conditional formula (1), a miniaturization of the total length and a good optical performance are realized.

The conditional formula (1) is intended to define a ratio of the center thickness of the single lens having a negative refractive power constituting the second lens group to the focal length of the whole lens system at the wide-angle position, and limits the thickness of the single lens having a negative refractive power constituting the second lens group. In the event of outside the value specified in the conditional formula (1), the total length of the second lens group in the optical-axis direction increases, making it difficult to miniaturize the total length of the whole lens system. It becomes also difficult to correct a positive curvature of field.

In a zoom lens according to an embodiment of the first invention, at least the single lens having a negative refractive power constituting the second lens group is made of a resin material, and is desired to satisfy the following conditional formula (2), so that it is possible to realize the ensuring of optical performance and a reduction of the manufacturing cost.

$$f2/fw < -2.0 \qquad (2)$$

where f2 represents the focal length of the single lens having a negative refractive power constituting the second lens group.

The conditional formula (2) is intended to define a ratio of the focal length of the single lens having a negative refractive power constituting the second lens group to the focal length of the whole lens system at the wide-angle position, and limits the refractive power of the single lens having a negative refractive power constituting the second lens group. In the event of outside the value specified in the conditional formula (2), the refractive power of the lens made of the resin material increases, making it difficult to ensure good optical performance using the resin material which exhibits relatively large variations in optical properties (refractive index and Abbe number).

In the zoom lens according to an embodiment of the first invention, at least, the single lens having a positive refractive power constituting the first lens group is made of a resin material, and is desired to satisfy the following conditional formula (3), so that it is possible to realize the ensuring of optical performance and a reduction of the manufacturing cost.

$$f12/fw > 2.0$$

where f12 represents the focal length of the single lens having a positive refractive power constituting the first lens group.

The conditional formula (3) is intended to define a ratio of the focal length of the single lens having a positive refractive power constituting the first lens group to the focal length of the whole lens system at the wide-angle position, and limits the refractive power of the single lens having a positive refractive power constituting the first lens group. In the event of outside the value specified in the conditional formula (3), the refractive power of the lens made of the resin material increases, making it difficult to ensure good optical performance using the resin material which exhibits relatively large variations in optical properties (refractive index and Abbe number).

In the zoom lens according to an embodiment of the first invention, in a case where the single lens having a positive refractive power constituting the first lens group and the single lens having a negative refractive power constituting the second lens group are made of the resin materials, it is desirable to satisfy the following conditional formula (4):

$$-2.0 \leq f12/f2 \leq -0.5. \quad (4)$$

As a result, fluctuations in optical characteristics with temperature change can be reduced.

The conditional formula (4) is intended to set a ratio of the focal length of the single lens having a positive refractive power constituting the first lens group to the focal length of the single lens having a negative refractive power constituting the second lens group, and limits the balance of refractive power. In the event of outside the values specified in the conditional formula (4), the balance of aberration correction during temperature change breaks to degrade the optical performance, making it difficult to maintain good optical performance for the imaging device having a large number of pixels.

In the zoom lens according to an embodiment of the first invention, the third lens group is composed by arranging, in the following order from the object side, a single lens having a positive refractive power and a single lens having a negative refractive power. When vd31 represents the Abbe number, relative to d-line (wavelength=587.6 nm), of the single lens having a positive refractive power constituting the third lens group, that vd32 represents the Abbe number, relative to d-line, of the single lens having a negative refractive power constituting the third lens group, that β3w represents the transverse magnification at the wide-angle position of the third lens group with respect to an infinity object, and that β3t represents the transverse magnification at a telephoto position of the third lens group with respect to the infinity object, the third lens group is desired to satisfy the following conditional formulae (5) and (6):

$$vd31 - vd32 > 20, \text{ and} \quad (5)$$

$$0.9 < \beta 3w \cdot \beta 3t < 1.1. \quad (6)$$

By constituting the third lens group of the two single lenses, i.e., the single lens having a positive refractive power and the single lens having a negative refractive power, positioned in order from the object side, the third lens group can be composed by using a small number of lenses, thereby compatibly realizing a miniaturization and a reduction of the manufacturing cost.

In addition, by causing the third lens group to satisfy the conditional formulae (5) and (6), a zoom lens can be obtained which has a good optical performance for the imaging device having a large number of pixels and which is small.

The conditional formula (5) is intended to set a difference between the Abbe number, relative to d-line, of the single lens having a positive refractive power constituting the third lens group and the Abbe number, relative to d-line, of the single lens having a negative refractive power constituting the third lens group, and is a condition for satisfactorily correcting a chromatic aberration occurring in the third lens group. In the event outside the value specified in the conditional formula (5), it becomes difficult to correct the chromatic aberration.

The conditional formula (6) is intended to set a product of the transverse magnification at the wide-angle position and the transverse magnification at the telephoto position, of the third lens group with respect to an infinity object, and limits the magnification of the third lens group. In the event of outside the values specified in the conditional formula (6), the total length of the optical system increases, making it difficult to achieve the miniaturization. Namely, by using the transverse magnification of the third group at an intermediate focal position between the wide-angle position and the telephoto position, in the vicinity of minus one (−1) times, the total length of the optical system is prevented from increasing, thereby realizing the miniaturization.

In the zoom lens according to an embodiment of the first invention, a lens cell on an incident light surface side of the single lens having a positive refractive power constituting the third lens group also serves as an aperture stop, so that it is possible to reduce the number of parts for the aperture stop and to shorten the total length. It is noted that this is not all, but the aperture stop may be disposed separately ahead of or inside the third lens group.

In the zoom lens according to an embodiment of the first invention, it is configured to move the second lens group in the optical-axis direction for focusing on an object at short-distance, and thus to arrange the fourth lens group as a fixed group, thereby suppressing infiltration of dust into the imaging device. However, the fourth lens group may alternatively be moved along an optical axis for focusing on the short-distance object.

In the zoom lens according to an embodiment of the first invention, by moving a part or the whole of the lens groups in a direction not parallel to the optical axis, an image on an image plane can be moved. By using this effect, optical correction of camera shaking can be realized.

Specific embodiments of the zoom lens according to the first invention in the present invention, and numeral examples obtained by applying specific numerical values to these embodiments will be described next with reference to the drawings and tables.

It is noted that an aspherical surface is introduced to each of the embodiments, and embodiments of zoom lenses according to later-described first to fourth inventions in the present invention, and that the aspherical surface is to be defined by a formula 1, wherein the depth of the aspherical surface is Z, and that the height from the optical axis is Y.

$$Z = \frac{Y^2/R}{1 + \sqrt{1-(1+K)(Y/R)^2}} + AY^4 + BY^6 + CY^8 + DY^{10} \quad \text{[Formula 1]}$$

where R represents the radius of curvature, K represents the cone constant, and A, B, C, and D denote the 4th-, 6th-, 8th-, and 10th-order aspherical coefficients, respectively.

FIG. 1 shows the lens construction of a first embodiment 1 of the zoom lens according to the first invention, with a maximum wide-angle state shown above and a maximum telephoto state shown below, and with moving loci along the optical axis shown with arrows in between.

A zoom lens 1 according to the first embodiment is composed by arranging, in the following order from the object side, a first lens group GR1 having a weak negative refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward an image side while depicting a convex locus, and the third lens group GR3 moves monotonously toward the object side, to perform zooming.

The first lens group GR1 is composed by arranging, in the following order from the object side, a negative meniscus lens G1 facing the convex surface toward the object side, a prism G2 for folding an optical path, and a positive lens G3 formed in a biconvex shape, the image-side surface of which is aspheric. The negative meniscus lens G1 and the prism G2 each are made of a glass material, and the positive lens G3 is made of a resin material. The second lens group GR2 is composed of a biconcave negative single lens G4, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing a convex surface toward the object side, the image side of which is aspheric. The positive lens G5 and the negative meniscus lens G6 each are made of a glass material. The fourth lens group GR4 is composed of a positive meniscus single lens G7 facing the concave surface toward the object side, the image-side surface of which is aspheric. The positive meniscus single lens G7 is made of a resin material. It is noted that a seal glass SG is positioned between the fourth lens group GR4 and an image capture plane IMG.

Table 1 shows lens data of a numeral example 1 in which specific numeral values are applied to the zoom lens 1 according to the first embodiment. It is noted that in Table 1 and other lens-data tables, "Si" denotes an i-th surface counted from the object side, "Ri" denotes a paraxial radius of curvature of the i-th surface, "di" denotes an axial surface distance between the i-th surface and an (i+1)-th surface, "ni" denotes a refractive index, relative to d-line, of a glass member having the i-th surface on the object side, and "vi" denotes an Abbe number, relative to d-line, of the glass member having the i-th surface on the object side. In addition, "ASP" regarding "ASPHERICAL SURFACE" means that the screen is aspheric, and regarding "di", "variable" means that the axial surface distance is variable. Furthermore, regarding "Ri", "∞" means that the surface is a flat surface, and "IMG" indicates that the surface is an image capture plane.

TABLE 1

| Si | Ri | ASPHERICAL SURFACE | di | ni | vi |
|---|---|---|---|---|---|
| 1 | 24.919 | | 0.60 | 1.834 | 37.3 |
| 2 | 5.222 | | 1.49 | | |
| 3 | ∞ | | 5.50 | 1.834 | 37.3 |
| 4 | ∞ | | 0.20 | | |
| 5 | 13.895 | | 1.31 | 1.583 | 30.0 |
| 6 | −16.389 | ASP | variable | | |
| 7 | −8.395 | | 0.50 | 1.530 | 55.8 |
| 8 | 25.056 | | variable | | |
| 9 | 3.157 | ASP | 1.70 | 1.583 | 59.5 |
| 10 | −5.035 | ASP | 0.40 | | |
| 11 | 12.237 | | 1.40 | 1.821 | 24.1 |
| 12 | 2.324 | ASP | variable | | |
| 13 | −6.292 | | 1.49 | 1.530 | 55.8 |
| 14 | −2.950 | ASP | 1.10 | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 1 at the wide-angle position (f=3.71), at an intermediate focal length (f=6.25) between the wide-angle position and the telephoto position, and at the telephoto position (f=10.58) are shown in Table 2 along with focal lengths f, F-Numbers Fno, and angles of view 2ω.

TABLE 2

| | WIDE-ANGLE POSITION | INTERMEDIATE FOCAL LENGTH | TELEPHOTO POSITION |
|---|---|---|---|
| f | 3.71 | 6.25 | 10.58 |
| Fno | 2.87 | 3.83 | 5.48 |
| 2ω | 64.9 | 38.5 | 23.5 |
| d6 | 1.10 | 2.76 | 1.10 |
| d8 | 7.02 | 2.92 | 0.50 |
| d12 | 3.18 | 5.62 | 9.70 |

The image-side surface S6 of the positive lens G3 of the first lens group GR1, both surfaces S9, S10 of the positive lens G5 and the image-side surface S12 of the negative meniscus lens G6, of the third lens group GR3, and the image-side surface S14 of the positive meniscus single lens G7 of the fourth lens group GR4 are formed of aspherical surfaces. The 4th-, 6th-, 8th-, and 10th-order aspherical coefficients A, B, C, and D of these surfaces in the numeral example 1 are shown in Table 3 along with cone constants K. It is noted that in each of Table 3 and the following tables showing aspherical coefficients, "E-i" is an exponential representation which is to base 10, i.e., "10$^{-i}$"; for example, "0.12345E−05" represents "0.12345×10$^{-5}$".

TABLE 3

| Si | K | A | B | C | D |
|---|---|---|---|---|---|
| 6 | 0 | −4.399E−04 | −6.997E−06 | 1.971E−06 | −5.414E−08 |
| 9 | 0 | −2.412E−03 | 3.750E−05 | −5.207E−05 | 1.195E−05 |
| 10 | 0 | 1.191E−02 | −1.353E−03 | 1.823E−04 | 0 |
| 12 | 0 | −8.013E−03 | 1.503E−03 | 1.512E−03 | −5.761E−04 |
| 14 | 0 | 1.085E−02 | −1.928E−04 | −6.095E−05 | 1.471E−05 |

Figure 2:
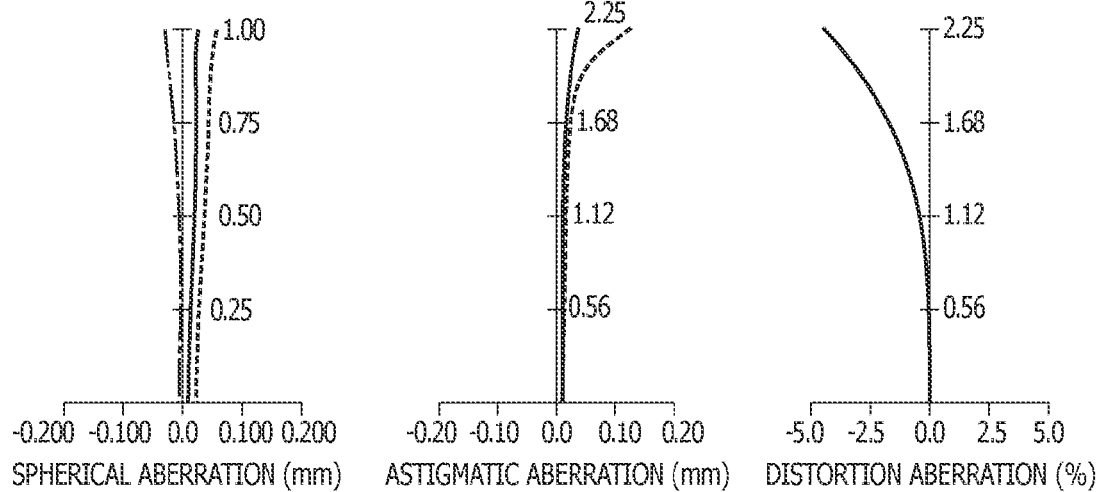
FIG. 2 is a graph showing, along with FIGS. 3 and 4, aberrations of a numeral example 1 obtained by applying specific numerical values to the first embodiment, FIG. 2 showing a spherical aberration, an astigmatic aberration, and a distortion aberration at a wide-angle position.
Figure 3:
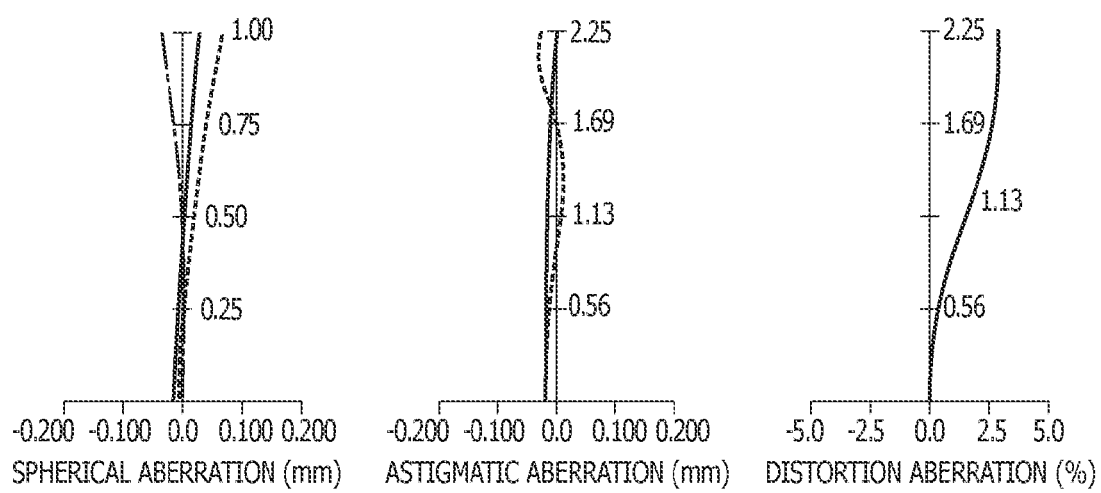
FIG. 3 is a graph showing a spherical aberration, an astigmatic aberration, and a distortion aberration measured at an intermediate focal length.
Figure 4:
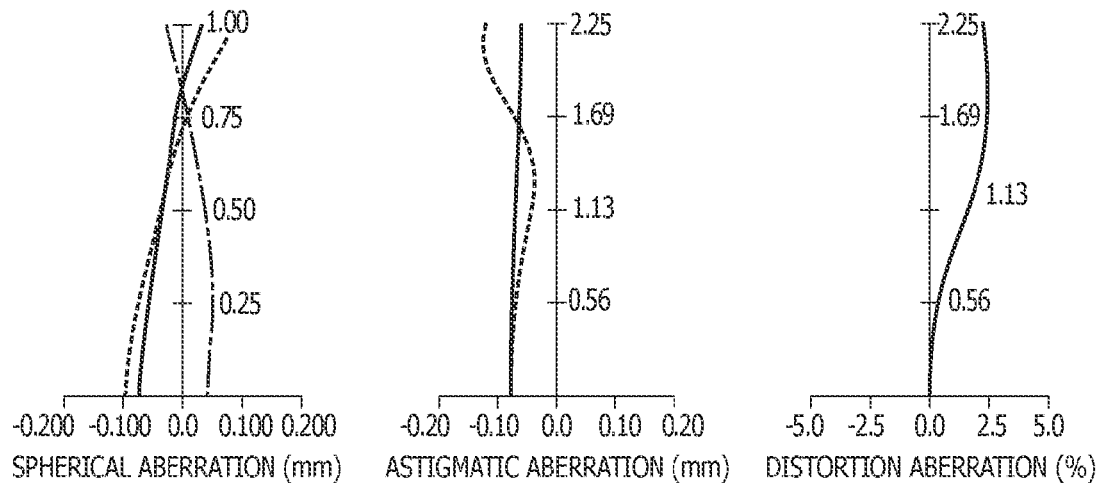
FIG. 4 is a graph showing a spherical aberration, an astigmatic aberration, and a distortion aberration at a telephoto position.

Each of FIGS. 2 to 4 shows a spherical aberration, an astigmatic aberration, and a distortion aberration in the numeral example 1 which is in focus at infinity. FIG. 2 shows the aberrations at the wide-angle position, FIG. 3 shows the aberrations at the intermediate focal length, and FIG. 4 shows the aberrations at the telephoto position. It is noted that in each of the spherical-aberration graphs, a solid line represents a spherical aberration at d-line, a dashed line represents a spherical aberration at C-line (wavelength=656.28 nm), and an alternate-long-and-short-dashed line represents a spherical aberration at g-line (wavelength=435.84 nm). In each of the astigmatic aberration graphs, a solid line represents a sagittal image plane and a dashed line represents a meridional image plane.

Figure 5:
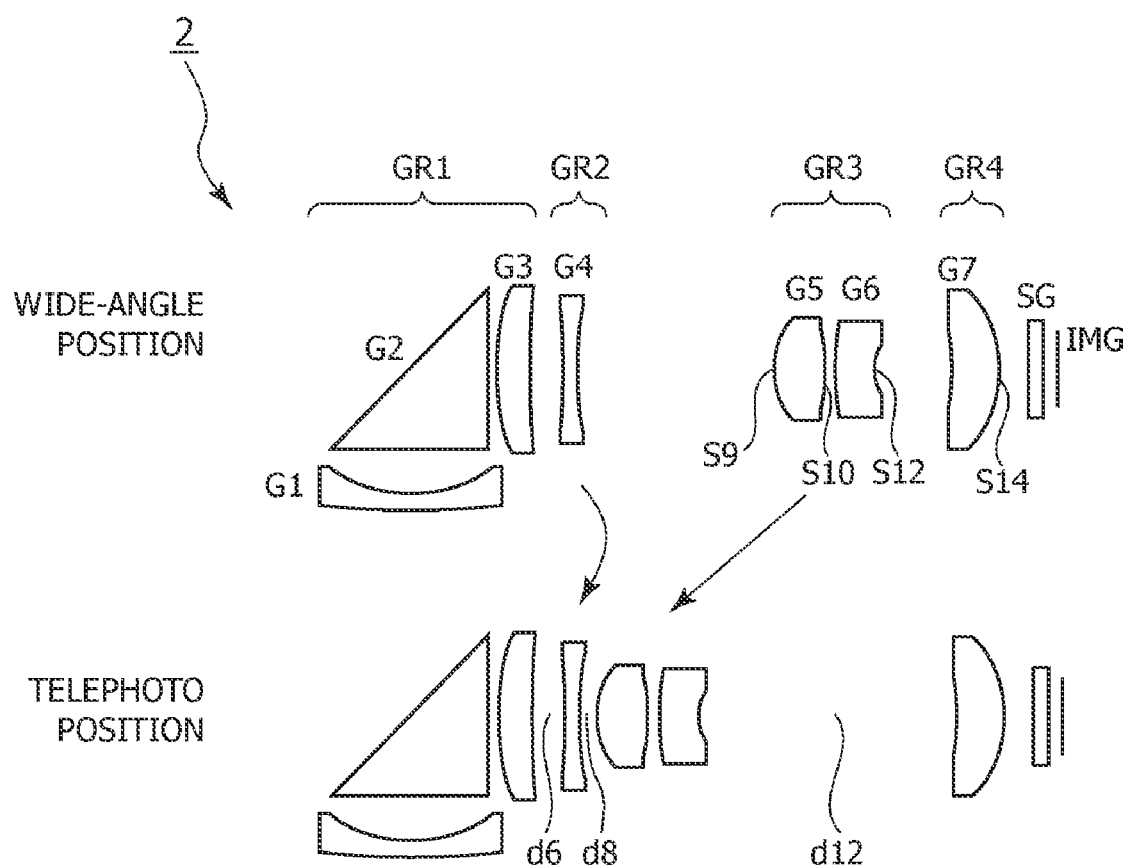
FIG. 5 is a diagram showing the lens construction of a second embodiment of the zoom lens according to the first invention.

FIG. 5 shows the lens construction of a second embodiment 2 of the zoom lens according to the first invention, with a maximum wide-angle state shown above and a maximum telephoto state shown below, and with moving loci along the optical axis shown with arrows in between.

A zoom lens 2 according to the second embodiment is composed by arranging, in the following order from the object side, a first lens group GR1 having weak a negative refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a negative meniscus lens G1 facing the convex surface toward the object side, a prism G2 for folding an optical path, and a positive meniscus lens G3 facing the concave surface toward the image side. The negative meniscus lens G1 and the prism G2 each are made of a glass material, and the positive meniscus lens G3 is made of a resin material. The second lens group GR2 is composed of a single lens G4 having a biconvex shape, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus lens G7 facing the concave surface toward the object side, the image-side surface of which is aspheric. The positive meniscus lens G7 is made of a resin material. It is noted that a seal glass SG is positioned between the fourth lens group GR4 and an image capture plane IMG.

Table 4 shows lens data of a numeral example 2 in which specific numeral values are applied to the zoom lens 2 according to the second embodiment.

TABLE 4

| Si | Ri | ASPHERICAL SURFACE | di | ni | vi |
|---|---|---|---|---|---|
| 1 | 43.748 | | 0.60 | 1.834 | 37.3 |
| 2 | 5.707 | | 1.41 | | |
| 3 | ∞ | | 5.50 | 1.834 | 37.3 |
| 4 | ∞ | | 0.20 | | |
| 5 | 7.079 | | 1.28 | 1.583 | 30.0 |
| 6 | 34.484 | | variable | | |
| 7 | −30.727 | | 0.50 | 1.530 | 55.8 |
| 8 | 11.236 | | variable | | |
| 9 | 3.281 | ASP | 1.80 | 1.623 | 58.2 |
| 10 | −5.228 | ASP | 0.40 | | |
| 11 | 9.782 | | 1.40 | 1.821 | 24.1 |
| 12 | 1.953 | ASP | variable | | |
| 13 | −9.380 | | 1.65 | 1.530 | 55.8 |
| 14 | 2.910 | ASP | 1.10 | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 2 at the wide-angle position (f=3.71), at the intermediate focal length (f=6.25) between the wide-angle position and the telephoto position, and at the telephoto position (f=10.59) are shown in Table 5 along with focal lengths f, F-Numbers Fno, and angles of view 2ω.

TABLE 5

| | WIDE-ANGLE POSITION | INTERMEDIATE FOCAL LENGTH | TELEPHOTO POSITION |
|---|---|---|---|
| f | 3.71 | 6.25 | 10.59 |
| Fno | 2.87 | 3.91 | 5.56 |
| 2ω | 64.9 | 38.4 | 23.4 |
| d6 | 1.10 | 2.77 | 1.10 |
| d8 | 7.06 | 2.81 | 0.50 |
| d12 | 2.72 | 5.31 | 9.29 |

Both surfaces S9, S10 of the positive lens G5 and the image-side surface S12 of the negative meniscus lens G6, of the third lens group GR3, and the image-side surface S14 of the positive meniscus lens G7 of the fourth lens group GR4 are formed of aspherical surfaces. The 4th-, 6th-, 8th-, and 10th-order aspherical coefficients A, B, C, and D of these surfaces in the numeral example 2 are shown in Table 6 along with cone constants K.

TABLE 6

| Si | K | A | B | C | D |
|---|---|---|---|---|---|
| 9 | 0 | −1.345E−03 | 2.543E−04 | −2.934E−05 | 2.288E−05 |
| 10 | 0 | 1.544E−02 | −1.754E−03 | 4.132E−04 | 0 |
| 12 | 0 | −1.984E−02 | 1.512E−04 | 2.109E−03 | −1.155E−03 |
| 14 | 0 | 1.035E−02 | 7.969E−04 | −2.601E−04 | 2.936E−05 |

Figure 6:
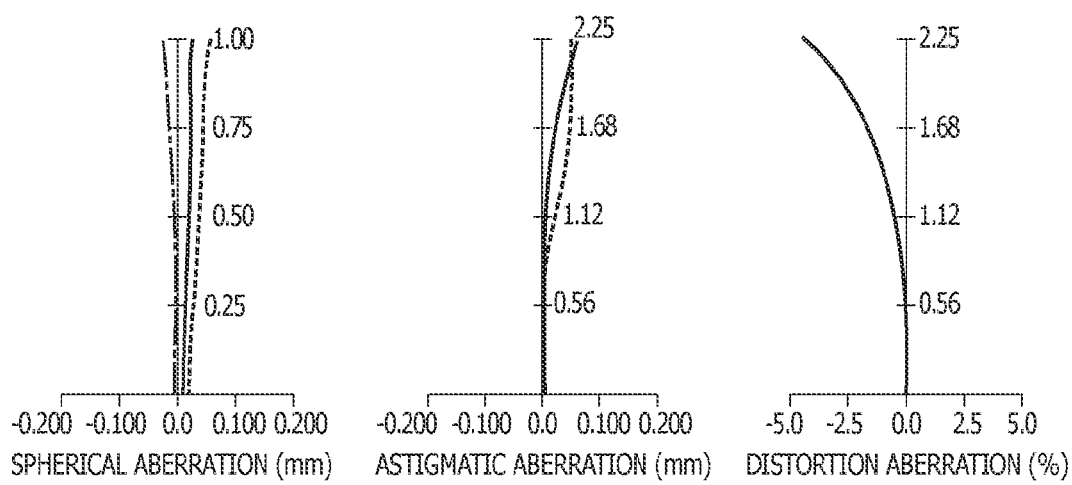
FIG. 6 is a graph showing, along with FIGS. 7 and 8, aberrations of a numeral example 2 obtained by applying specific numerical values to the second embodiment, FIG. 6 showing a spherical aberration, an astigmatic aberration, and a distortion aberration at the wide-angle position.
Figure 7:
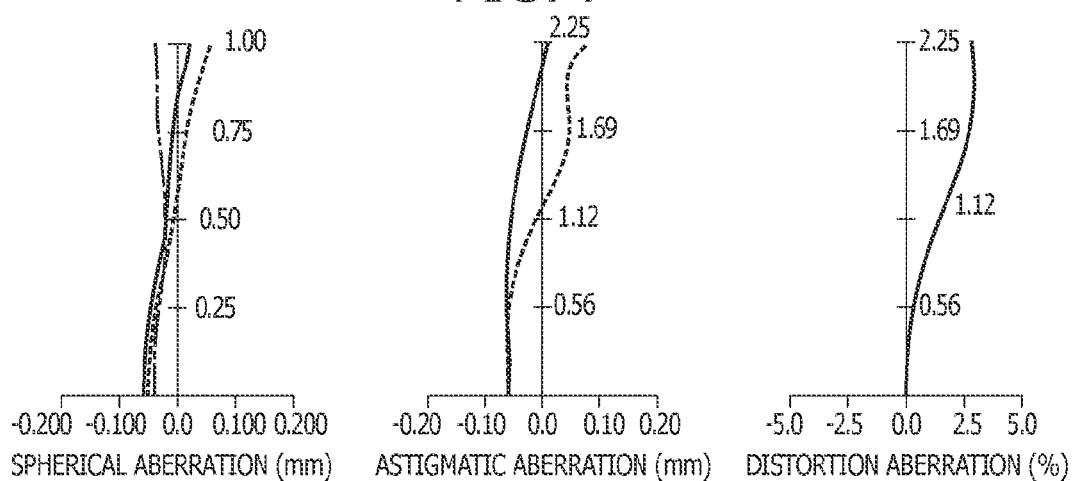
FIG. 7 is a graph showing a spherical aberration, an astigmatic aberration, and a distortion aberration at the intermediate focal length.
Figure 8:
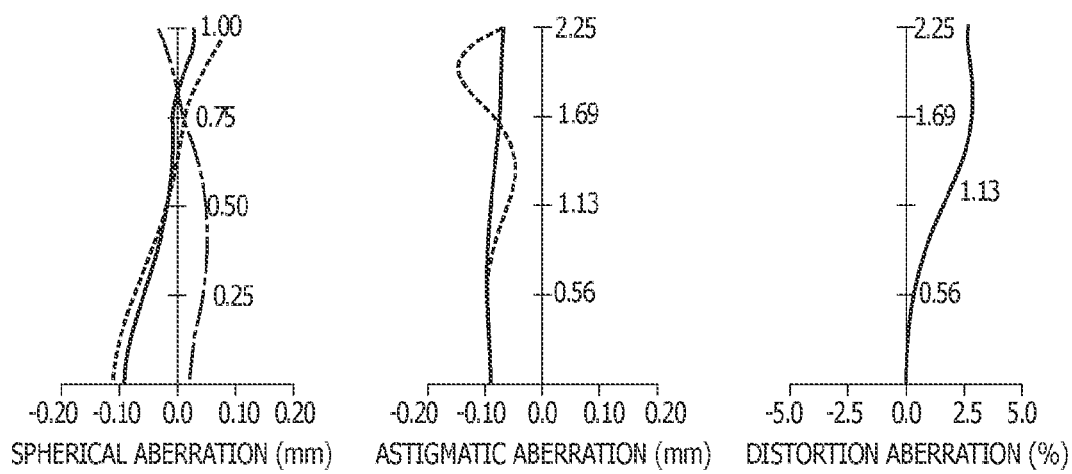
FIG. 8 is a graph showing a spherical aberration, an astigmatic aberration, and a distortion aberration at the telephoto position.

Each of FIGS. 6 to 8 shows a spherical aberration, an astigmatic aberration, and a distortion aberration in the numeral example 2 which is in focus at infinity. FIG. 6 shows the aberrations at the wide-angle position, FIG. 7 shows the aberrations at the intermediate focal length, and FIG. 8 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 9:
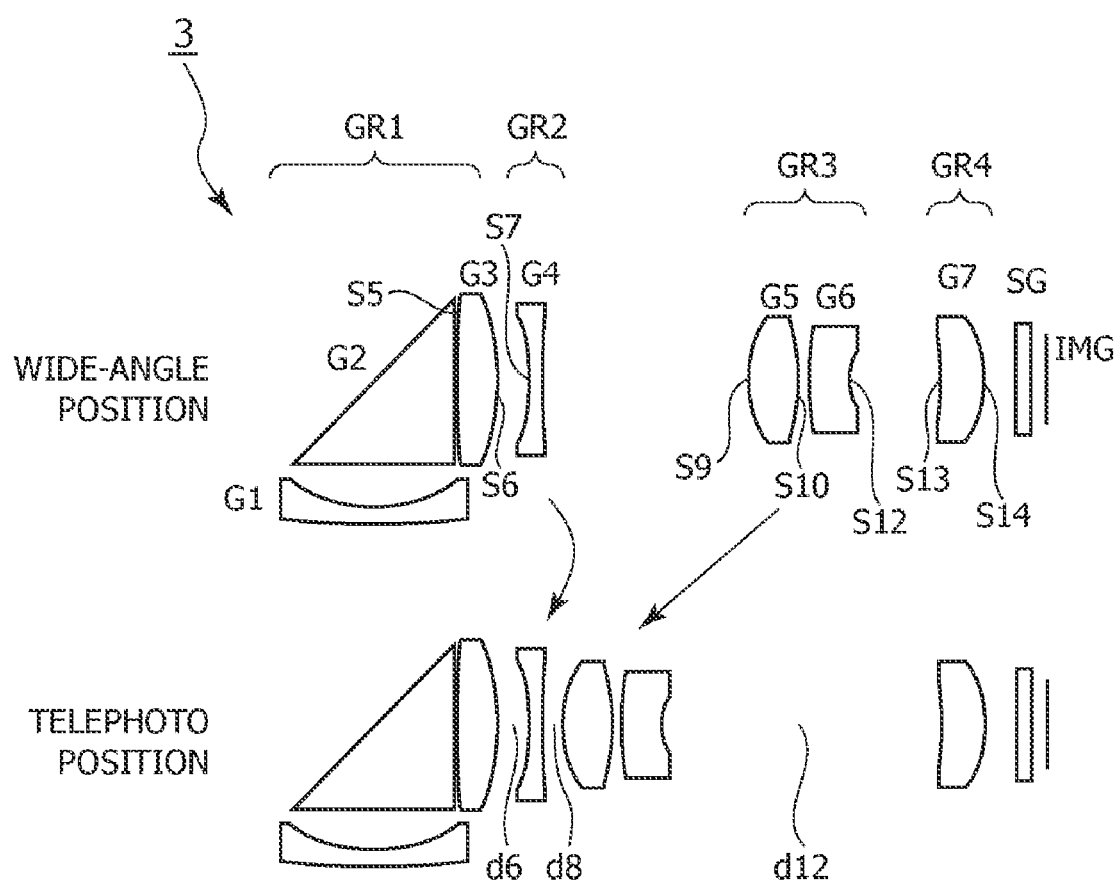
FIG. 9 is a diagram showing the lens construction of a third embodiment of the zoom lens according to the first invention.

FIG. 9 shows the lens construction of a third embodiment 3 of the zoom lens according to the first invention, with a wide-angle position state shown above and a telephoto position state shown below, and with moving loci along the optical axis shown with arrows in between.

A zoom lens 3 according to the third embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a negative meniscus lens G1 facing the convex surface toward the object side, a prism G2 for folding an optical path, and a positive lens G3 formed in a biconvex shape, both surfaces of which are aspheric. The negative meniscus lens G1 and the prism G2 each are made of a glass material, and the positive lens G3 is made of a resin material. The second lens group GR2 is composed of a negative meniscus single lens G4 facing the convex surface toward the image side, the object-side surface of which is aspheric, and the negative meniscus single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus single lens G7 facing the concave surface toward the object side, both surfaces of which are aspheric. The positive meniscus single lens G7 is made of a resin material. It is noted that a seal glass SG is positioned between the fourth lens group GR4 and an image capture plane IMG.

Table 7 shows lens data of a numeral example 3 in which specific numeral values are applied to the zoom lens 3 according to the third embodiment.

TABLE 7

| Si | Ri | ASPHERICAL SURFACE | di | ni | vi |
|---|---|---|---|---|---|
| 1 | 93.027 |  | 0.60 | 1.834 | 37.3 |
| 2 | 6.516 |  | 1.29 |  |  |
| 3 | ∞ |  | 5.50 | 1.834 | 37.3 |
| 4 | ∞ |  | 0.20 |  |  |
| 5 | 76.069 | ASP | 1.33 | 1.583 | 30.0 |
| 6 | −8.017 | ASP | variable |  |  |
| 7 | −5.286 | ASP | 0.50 | 1.530 | 55.8 |
| 8 | −68.485 |  | variable |  |  |
| 9 | 3.166 | ASP | 1.71 | 1.583 | 59.5 |
| 10 | −5.144 | ASP | 0.40 |  |  |
| 11 | 10.688 |  | 1.40 | 1.821 | 24.1 |
| 12 | 2.232 | ASP | variable |  |  |
| 13 | −6.751 | ASP | 1.49 | 1.530 | 55.8 |
| 14 | −3.004 | ASP | 1.10 |  |  |

TABLE 7-continued

| Si | Ri | ASPHERICAL SURFACE | di | ni | vi |
|---|---|---|---|---|---|
| 15 | ∞ |  | 0.50 | 1.517 | 64.2 |
| 16 | ∞ |  | 0.50 |  |  |
| 17 | IMG |  |  |  |  |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 3 at the wide-angle position (f=3.71), at the intermediate focal length (f=6.25) between the wide-angle position and the telephoto position, and at the telephoto position (f=10.58) are shown in Table 8 along with focal lengths f, F-Numbers Fno, and angles of view 2ω.

TABLE 8

|  | WIDE-ANGLE POSITION | INTERMEDIATE FOCAL LENGTH | TELEPHOTO POSITION |
|---|---|---|---|
| f | 3.71 | 6.25 | 10.58 |
| Fno | 2.87 | 3.82 | 5.51 |
| 2ω | 64.9 | 38.5 | 23.7 |
| d6 | 1.10 | 2.78 | 1.10 |
| d8 | 7.18 | 3.12 | 0.60 |
| d12 | 3.20 | 5.58 | 9.78 |

Both surfaces S5, S6 of the positive lens G3 of the first lens group GR1, the object-side surface S7 of the negative meniscus single lens G4 of the second lens group GR2, both surfaces S9, S10 of the positive lens G5 and the image-side surface S12 of the negative meniscus lens G6, of the third lens group GR3, and both surfaces S13, S14 of the positive meniscus single lens G7 of the fourth lens group GR4 are formed of aspherical surfaces. The 4th-, 6th-, 8th-, and 10th-order aspherical coefficients A, B, C, and D of these surfaces in the numeral example 3 are shown in Table 9 along with cone constants K.

TABLE 9

| Si | K | A | B | C | D |
|---|---|---|---|---|---|
| 5 | 0 | −4.494E−04 | −6.218E−05 | 9.711E−06 | 0 |
| 6 | 0 | −4.511E−04 | −7.505E−05 | 1.610E−05 | −5.048E−07 |
| 7 | 0 | 7.153E−04 | 1.131E−05 | 6.331E−06 | −1.483E−06 |
| 9 | 0 | −3.685E−03 | −1.198E−04 | −3.954E−05 | −5.471E−06 |
| 10 | 0 | 8.412E−03 | −8.762E−04 | 1.886E−05 | 0 |
| 12 | 0 | −4.032E−03 | 3.707E−04 | 1.720E−03 | −5.972E−04 |
| 13 | 0 | 2.564E−03 | 0 | 0 | 0 |
| 14 | 0 | 1.201E−02 | −3.288E−04 | 3.939E−06 | 7.719E−06 |

Figure 10:
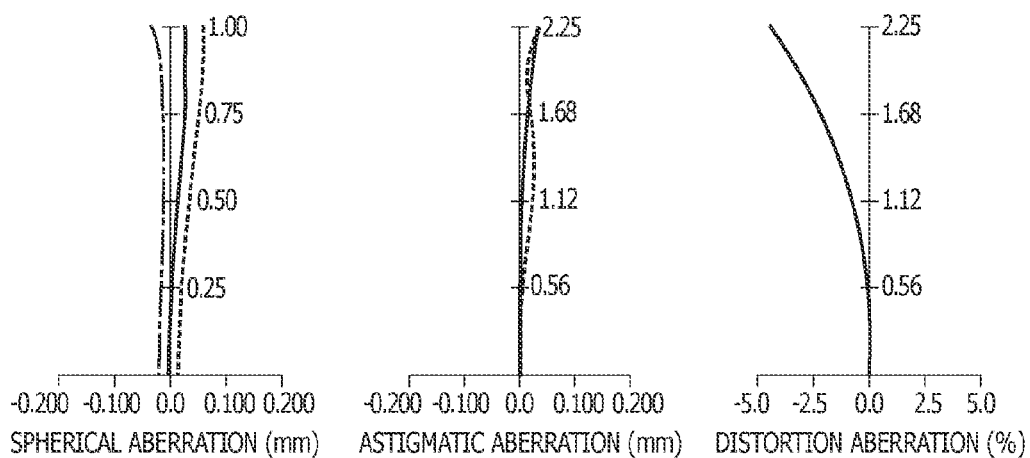
FIG. 10 is a graph showing, along with FIGS. 11 and 12, aberrations of a numeral example 3 obtained by applying specific numerical values to the third embodiment, FIG. 10 showing a spherical aberration, an astigmatic aberration, and a distortion aberration at the wide-angle position.
Figure 11:
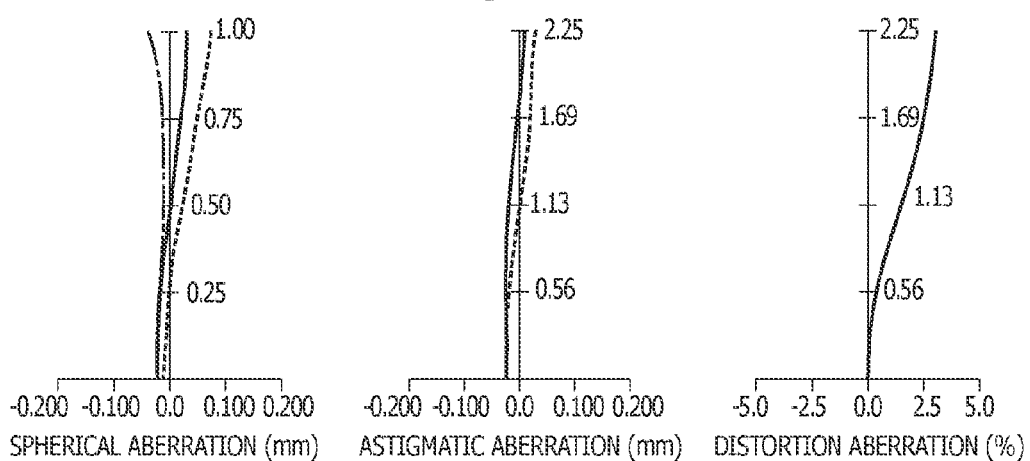
FIG. 11 is a graph showing a spherical aberration, an astigmatic aberration, and a distortion aberration at the intermediate focal length.
Figure 12:
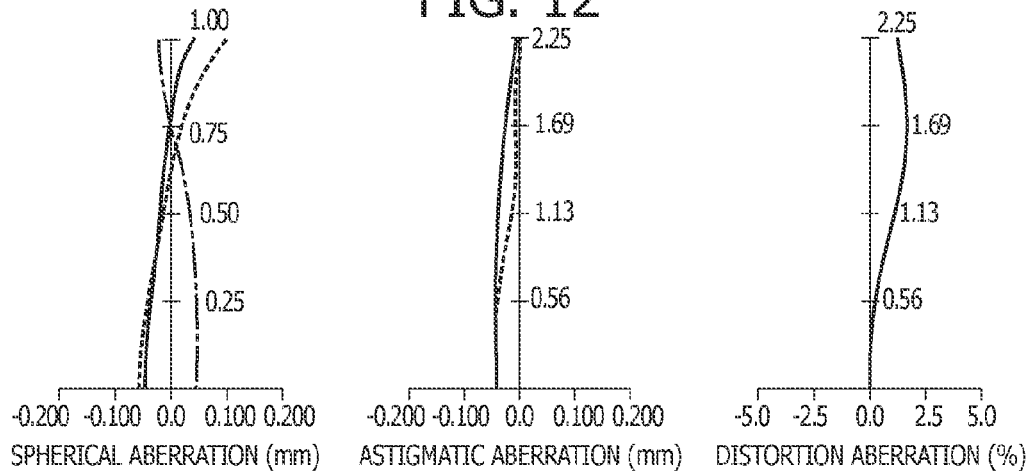
FIG. 12 is a graph showing a spherical aberration, an astigmatic aberration, and a distortion aberration at the telephoto position.

Each of FIGS. 10 to 12 shows a spherical aberration, an astigmatic aberration, and a distortion aberration in the numeral example 3 which is in focus at infinity. FIG. 10 shows the aberrations at the wide-angle position, FIG. 11 shows the aberrations at the intermediate focal length, and FIG. 12 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 13:
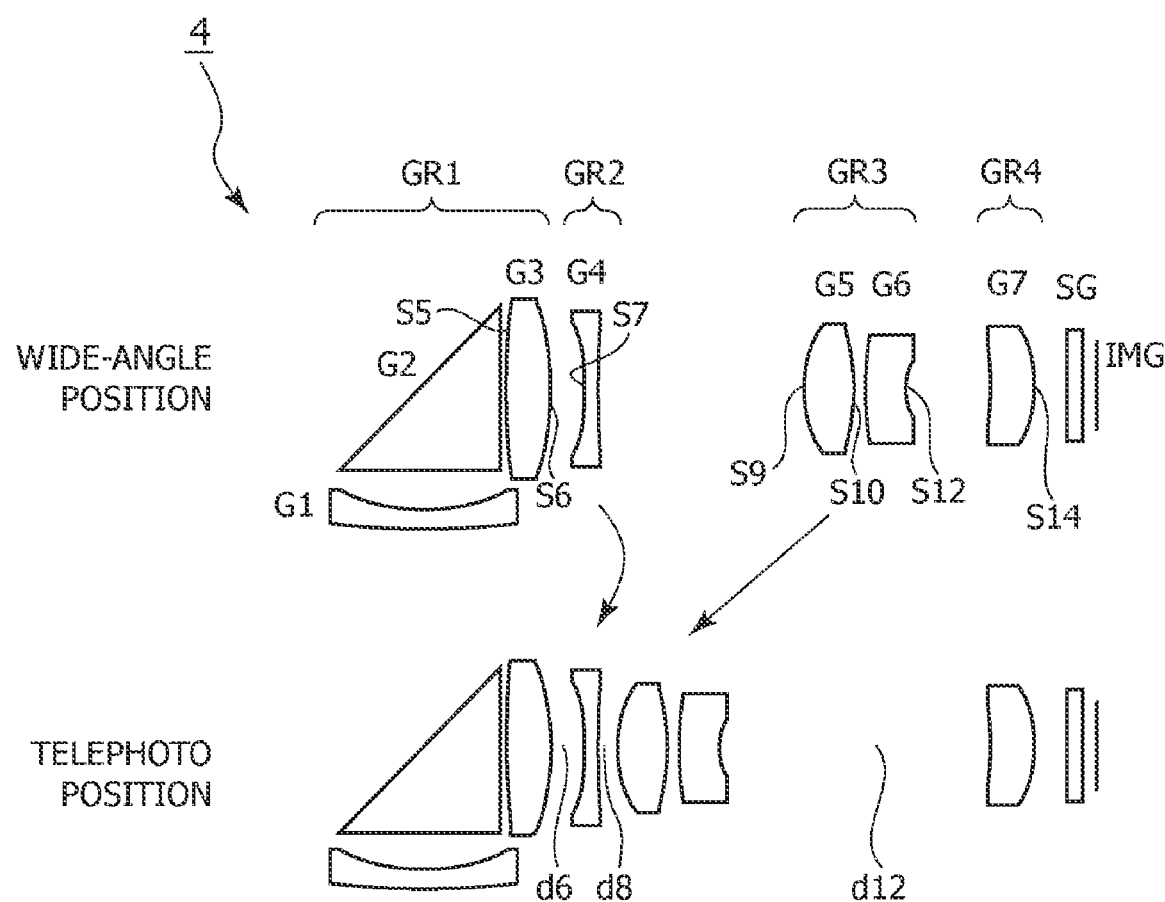
FIG. 13 is a diagram showing the lens construction of a fourth embodiment of the zoom lens according to the first invention.

FIG. 13 shows the lens construction of a fourth embodiment 4 of the zoom lens according to the first invention, with a wide-angle position state shown above and a telephoto position state shown below, and with moving loci along the optical axis shown with arrows in between.

A zoom lens 4 according to the fourth embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a negative meniscus lens G1 facing the convex surface toward the object side, a prism G2 for folding an optical path, and a positive lens G3 formed in a biconvex shape, both surfaces of which are aspheric. The negative meniscus lens G1 is made of a light-transmitting ceramic material, the prism G2 is made of a glass material, and the positive lens G3 is made of a resin material. The second lens group GR2 is composed of a negative single lens G4 formed in a biconcave shape, an object-side surface of which is aspheric, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus single lens G7 facing the concave surface toward the object side, the image-side surface of which is aspheric. The positive meniscus single lens G7 is made of a resin material. It is noted that a seal glass SG is positioned between the fourth lens group GR4 and an image capture plane IMG.

Table 10 shows lens data of a numeral example 4 in which specific numeral values are applied to the zoom lens 4 according to the fourth embodiment.

TABLE 10

| Si | Ri | ASPHERICAL SURFACE | di | ni | vi |
|---|---|---|---|---|---|
| 1 | 38.844 | | 0.60 | 2.082 | 30.1 |
| 2 | 6.904 | | 1.26 | | |
| 3 | ∞ | | 5.50 | 1.834 | 37.3 |
| 4 | ∞ | | 0.20 | | |
| 5 | 19.005 | ASP | 1.55 | 1.583 | 30.0 |
| 6 | −7.974 | ASP | variable | | |
| 7 | −5.572 | ASP | 0.50 | 1.530 | 55.8 |
| 8 | 36.961 | | variable | | |
| 9 | 3.088 | ASP | 1.71 | 1.583 | 59.5 |
| 10 | −4.841 | ASP | 0.40 | | |
| 11 | 13.115 | | 1.40 | 1.821 | 24.1 |
| 12 | 2.218 | ASP | variable | | |
| 13 | −8.473 | | 1.54 | 1.530 | 55.8 |
| 14 | −3.322 | ASP | 1.14 | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 4 at the wide-angle position (f=3.71), at the intermediate focal length (f=6.25) between the wide-angle position and the telephoto position, and at the telephoto position (f=10.57) are shown in Table 11 along with focal lengths f, F-Numbers Fno, and angles of view 2ω.

TABLE 11

| | WIDE-ANGLE POSITION | INTERMEDIATE FOCAL LENGTH | TELEPHOTO POSITION |
|---|---|---|---|
| f | 3.71 | 6.25 | 10.57 |
| Fno | 2.86 | 3.69 | 5.47 |
| 2ω | 64.9 | 38.5 | 24.0 |
| d6 | 1.10 | 2.97 | 1.25 |
| d8 | 7.17 | 3.26 | 0.60 |
| d12 | 2.93 | 4.98 | 9.36 |

Both surfaces (S5, S6) of the positive lens G3 of the first lens group GR1, the object-side surface (S7) of the negative single lens G4 of the second lens group GR2, both surfaces (S9, S10) of the positive lens G5 and the image-side surface (S12) of the negative meniscus lens G6, of the third lens group GR3, and the image-side surface (S14) of the positive meniscus single lens G7 of the fourth lens group GR4 are formed of aspherical surfaces. The 4th-, 6th-, 8th-, and 10th-order aspherical coefficients A, B, C, and D of these surfaces in the numeral example 4 are shown in Table 12 along with cone constants K.

TABLE 12

| Si | K | A | B | C | D |
|---|---|---|---|---|---|
| 5 | 0 | −4.528E−04 | −6.440E−05 | 3.741E−06 | 0 |
| 6 | 0 | −3.431E−04 | −5.939E−05 | 6.659E−06 | −2.066E−07 |
| 7 | 0 | 8.612E−04 | 1.061E−05 | 4.841E−06 | −1.473E−06 |
| 9 | 0 | −3.892E−03 | −1.514E−04 | −3.825E−05 | −8.622E−06 |
| 10 | 0 | 9.612E−03 | −1.028E−03 | 2.013E−05 | 0 |
| 12 | 0 | −4.481E−03 | 2.814E−05 | 2.471E−03 | −8.527E−04 |
| 14 | 0 | 8.001E−03 | −0.000789 | 0.00010624 | −3.293E−06 |

Figure 14:
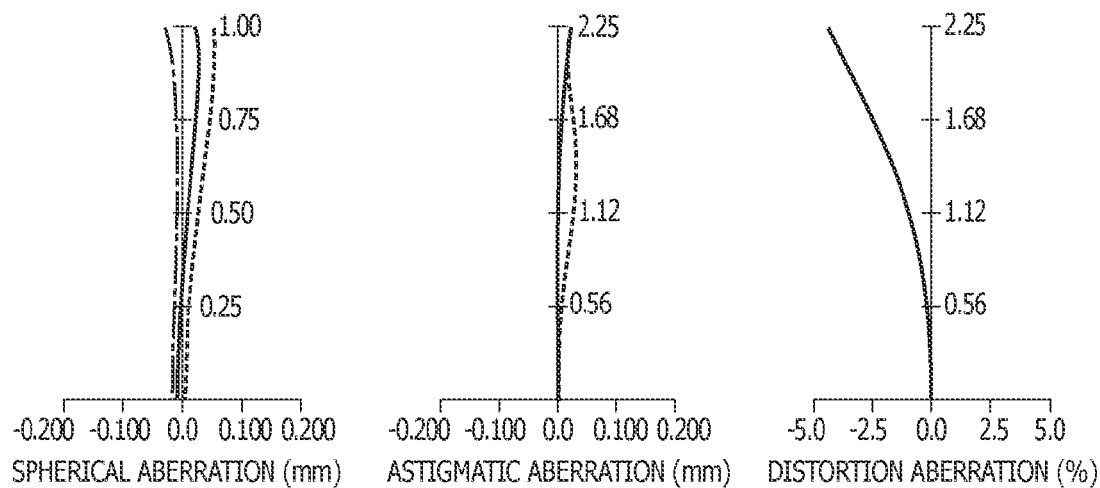
FIG. 14 is a graph showing, along with FIGS. 15 and 16, aberrations of a numeral example 4 obtained by applying specific numerical values to the fourth embodiment, FIG. 14 showing a spherical aberration, an astigmatic aberration, and a distortion aberration at the wide-angle position.
Figure 15:
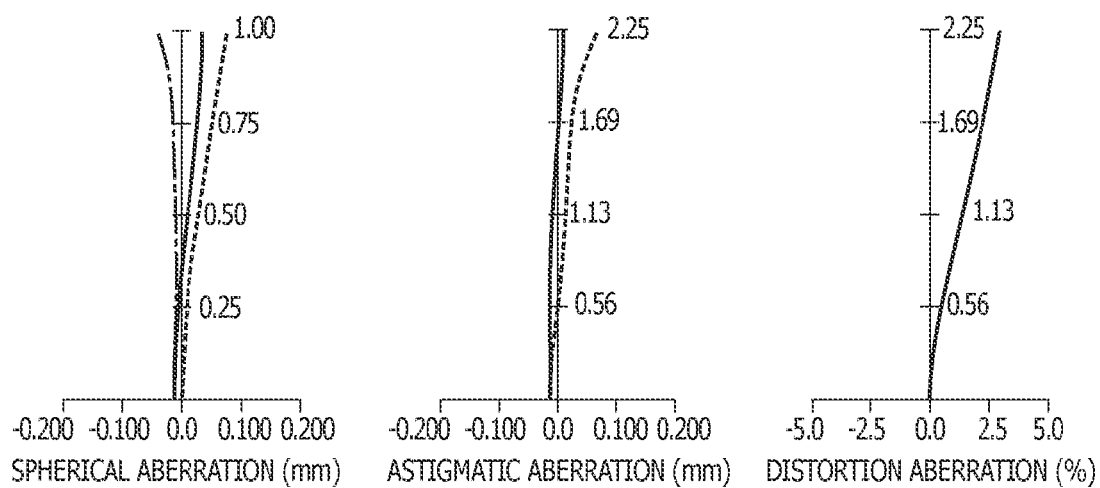
FIG. 15 is a graph showing a spherical aberration, an astigmatic aberration, and a distortion aberration at the intermediate focal length.
Figure 16:
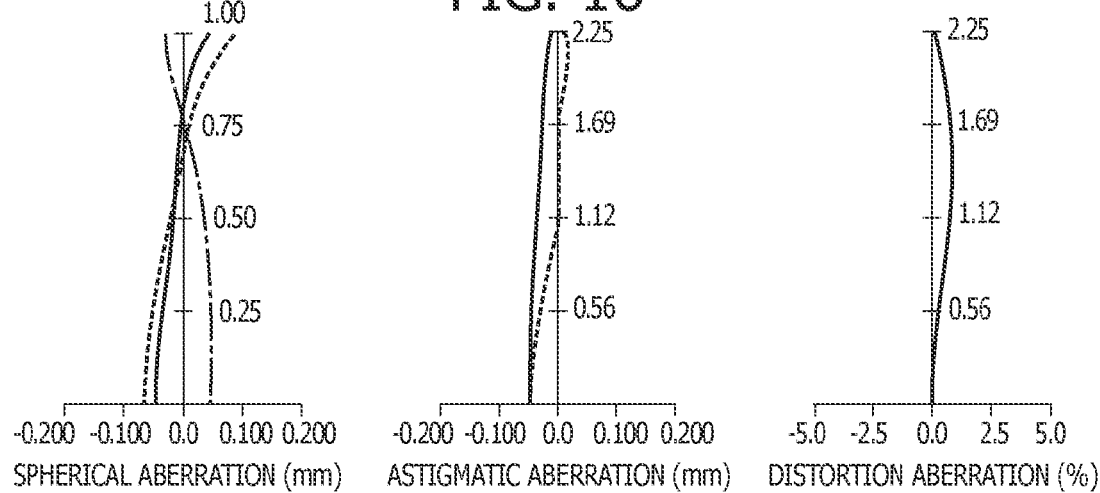
FIG. 16 is a graph showing a spherical aberration, an astigmatic aberration, and a distortion aberration at the telephoto position.

Each of FIGS. 14 to 16 shows a spherical aberration, an astigmatic aberration, and a distortion aberration in the numeral example 4 which is in focus at infinity. FIG. 14 shows the aberrations at the wide-angle position, FIG. 15 shows the aberrations at the intermediate focal length, and FIG. 16 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 17:
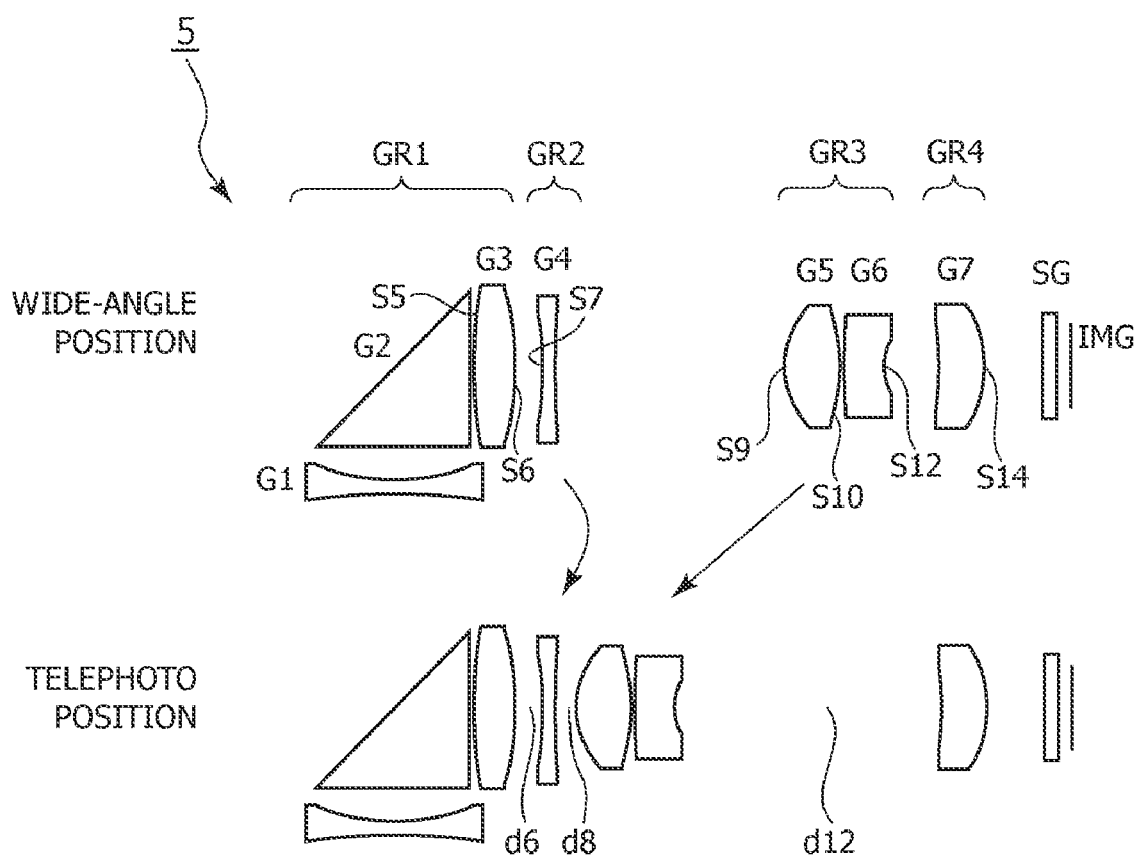
FIG. 17 is a diagram showing the lens construction of a fifth embodiment of the zoom lens according to the first invention.

FIG. 17 shows the lens construction of a fifth embodiment 5 of the zoom lens according to the first invention, with a maximum wide-angle state shown above and a maximum telephoto state shown below, and with moving loci along the optical axis shown with arrows in between.

A zoom lens 5 according to the fifth embodiment is composed by arranging, in the following order from the object side, a first lens group GR1 having a weak negative refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a negative lens G1 formed in a biconcave shape, a prism G2 for folding an optical path, and a positive lens G3 formed in a biconvex shape, both surfaces of which are aspheric. The negative lens G1 and the prism G2 each are made of a glass material, and the positive lens G3 is made of a resin material. The second lens group GR2 is composed of a negative single lens G4 formed in a biconcave shape, the object-side surface of which is aspheric, and the negative single lens G4 is made of a resin material. The third lens group GR3 is composed by arranging, in the following order from the object side, a positive lens G5 formed in a biconvex shape, both surfaces of which are aspheric, and a negative lens G6 formed in a biconcave shape, the image-side surface of which is aspheric. The positive lens G5 is made of a glass material, and the negative lens G6 is made of a light-transmitting ceramic material. The fourth lens group GR4 is composed of a positive meniscus single lens G7 facing a concave surface toward the object side, an image-side surface of which is aspheric. The positive meniscus single lens G7 is made of a resin material. It is noted that a seal glass SG is positioned between the fourth lens group GR4 and an image capture plane IMG.

Table 13 shows lens data of a numeral example 5 in which specific numeral values are applied to the zoom lens 5 according to the fifth embodiment.

TABLE 13

| Si | Ri | ASPHERICAL SURFACE | di | ni | vi |
|---|---|---|---|---|---|
| 1 | −40.154 | | 0.60 | 1.834 | 37.3 |
| 2 | 8.500 | | 1.14 | | |
| 3 | ∞ | | 5.50 | 1.834 | 37.3 |
| 4 | ∞ | | 0.20 | | |
| 5 | 43.204 | ASP | 1.33 | 1.583 | 30.0 |
| 6 | −11.849 | ASP | variable | | |
| 7 | −10.611 | ASP | 0.50 | 1.530 | 55.8 |
| 8 | 114.179 | | variable | | |
| 9 | 2.916 | ASP | 1.92 | 1.694 | 53.2 |
| 10 | −4.459 | ASP | 0.20 | | |
| 11 | −25.391 | | 1.40 | 2.082 | 30.1 |
| 12 | 2.638 | ASP | variable | | |
| 13 | −21.257 | | 1.65 | 1.530 | 55.8 |
| 14 | −3.915 | ASP | 2.18 | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 5 at the wide-angle position (f=3.71), at the intermediate focal length (f=6.26) between the wide-angle position and the telephoto position, and at the telephoto position (f=10.57) are shown in Table 14 along with focal lengths f, F-Numbers Fno, and angles of view 2ω.

TABLE 14

| | WIDE-ANGLE POSITION | INTERMEDIATE FOCAL LENGTH | TELEPHOTO POSITION |
|---|---|---|---|
| f | 3.71 | 6.26 | 10.57 |
| Fno | 2.88 | 3.94 | 5.59 |
| 2ω | 64.8 | 38.4 | 23.3 |
| d6 | 1.10 | 3.07 | 1.10 |
| d8 | 8.33 | 3.31 | 0.60 |
| d12 | 1.96 | 5.00 | 9.69 |

Both surfaces (S5, S6) of the positive lens G3 of the first lens group GR1, the object-side surface (S7) of the negative single lens G4 of the second lens group GR2, both surfaces (S9, S10) of the positive lens G5 and the image-side surface (S12) of the negative lens G6, of the third lens group GR3, and the image-side surface (S14) of the positive meniscus single lens G7 of the fourth lens group GR4 are formed of aspherical surfaces. The 4th-, 6th-, 8th-, and 10th-order aspherical coefficients A, B, C, and D of these surfaces in the numeral example 5 are shown in Table 15 along with cone constants K.

TABLE 15

| Si | K | A | B | C | D |
|---|---|---|---|---|---|
| 5 | 0 | 2.840E−04 | −1.004E−04 | 1.845E−05 | 0 |
| 6 | 0 | 7.315E−05 | −1.199E−04 | 2.429E−05 | −2.329E−07 |
| 7 | 0 | 4.250E−04 | −1.722E−04 | 4.469E−05 | −4.138E−06 |
| 9 | 0 | −2.521E−03 | −1.977E−04 | 2.599E−05 | −3.605E−05 |
| 10 | 0 | 1.596E−02 | −2.265E−03 | 2.361E−05 | 0 |
| 12 | 0 | −4.853E−03 | 3.677E−04 | 4.410E−03 | −1.352E−03 |
| 14 | 0 | 5.343E−03 | −0.0003445 | 3.5076E−05 | −9.083E−07 |

Each of FIGS. 18 to 20 shows a spherical aberration, an astigmatic aberration, and a distortion aberration in the numeral example 5 which is in focus at infinity. FIG. 18 shows the aberrations at the wide-angle position, FIG. 19 shows the aberrations at the intermediate focal length, and FIG. 20 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 21:
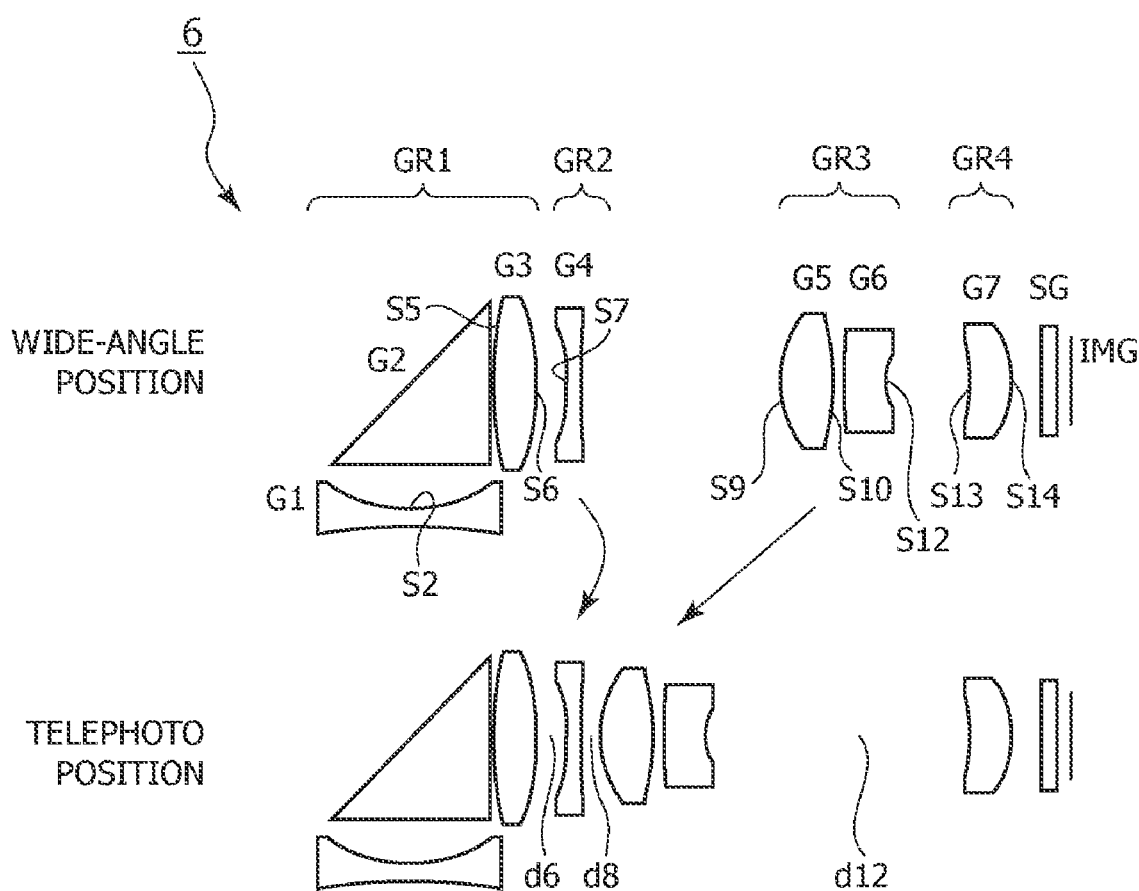
FIG. 21 is a diagram showing the lens construction of a sixth embodiment of the zoom lens according to the first invention.

FIG. 21 shows the lens construction of a sixth embodiment 6 of the zoom lens according to the first invention, with a maximum wide-angle state shown above and a maximum telephoto state shown below, and with moving loci along the optical axis shown with arrows in between.

A zoom lens 6 according to the sixth embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a negative lens G1 formed in a biconcave shape, the image-side surface of which is aspheric, a prism G2 for folding an optical path, and a positive lens G3 formed in a biconvex shape, both surfaces of which are aspheric. The negative lens G1, the prism G2, and the positive lens G3 each are made of a resin material. The second lens group GR2 is composed of a negative single lens G4 formed in a biconcave shape, the object-side surface of which is aspheric, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus single lens G7 facing the concave surface toward the object side, both surfaces of which are aspheric. The positive meniscus single lens G7 is made of a resin material. It is noted that a seal glass SG is positioned between the fourth lens group GR4 and an image capture plane IMG.

Table 16 shows lens data of a numeral example 6 in which specific numeral values are applied to the zoom lens 6 according to the sixth embodiment.

TABLE 16

| Si | Ri | ASPHERICAL SURFACE | di | ni | vi |
|---|---|---|---|---|---|
| 1 | −24.000 | | 0.60 | 1.583 | 30.0 |
| 2 | 5.544 | ASP | 1.26 | | |
| 3 | ∞ | | 5.50 | 1.583 | 30.0 |
| 4 | ∞ | | 0.20 | | |
| 5 | 13.990 | ASP | 1.55 | 1.583 | 30.0 |
| 6 | −9.471 | ASP | variable | | |
| 7 | −5.483 | ASP | 0.50 | 1.530 | 55.8 |
| 8 | 34.533 | | variable | | |
| 9 | 3.063 | ASP | 1.71 | 1.583 | 59.5 |
| 10 | −4.510 | ASP | 0.40 | | |
| 11 | 16.254 | | 1.40 | 1.821 | 24.1 |
| 12 | 2.197 | ASP | variable | | |
| 13 | −5.147 | ASP | 1.54 | 1.530 | 55.8 |
| 14 | −2.797 | ASP | 1.10 | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, and the distance d12 between the third lens group GR3 and the fourth lens group GR4 vary during zooming from the wide-angle position to the telephoto position. Values of the respective distances d6, d8, and d12 in the numeral example 6 at the wide-angle position (f=3.71), at the intermediate focal length (f=6.25) between the wide-angle position and the telephoto position, and at the telephoto position (f=10.58) are shown in Table 17 along with focal lengths f, F-Numbers Fno, and angles of view 2ω.

TABLE 17

| | WIDE-ANGLE POSITION | INTERMEDIATE FOCAL LENGTH | TELEPHOTO POSITION |
|---|---|---|---|
| f | 3.71 | 6.25 | 10.58 |
| Fno | 2.87 | 3.71 | 5.57 |
| 2ω | 64.8 | 38.5 | 24.0 |
| d6 | 1.10 | 2.90 | 1.10 |
| d8 | 6.99 | 3.19 | 0.60 |
| d12 | 2.99 | 4.98 | 9.38 |

The image-side surface (S2) of the negative lens G1 and both surfaces (S5, S6) of the positive lens G3, of the first lens group GR1, the object-side surface (S7) of the negative single lens G4 of the second lens group GR2, both surfaces (S9, S10) of the positive lens G5 and the image-side surface (S12) of the negative lens G6, of the third lens group GR3, and both surfaces (S13, S14) of the positive meniscus single lens G7 of the fourth lens group GR4 are formed of aspherical surfaces. The 4th-, 6th-, 8th-, and 10th-order aspherical coefficients A, B, C, and D of these surfaces in the numeral example 6 are shown in Table 18 along with cone constants K.

TABLE 18

| Si | K | A | B | C | D |
|---|---|---|---|---|---|
| 2 | 0 | −7.118E−04 | 6.405E−05 | −1.069E−05 | 2.888E−07 |
| 5 | 0 | −7.253E−04 | 1.883E−04 | −2.202E−05 | 0 |
| 6 | 0 | −6.277E−04 | 2.134E−04 | −2.779E−05 | 5.566E−07 |
| 7 | 0 | 8.119E−04 | 8.343E−05 | −1.373E−05 | 2.069E−07 |
| 9 | 0 | −3.782E−03 | −9.471E−05 | −5.345E−05 | −4.798E−06 |
| 10 | 0 | 1.174E−02 | −1.342E−03 | 6.133E−05 | 0 |
| 12 | 0 | −5.892E−03 | 3.595E−04 | 3.360E−03 | −1.280E−03 |
| 13 | 0 | 5.075E−03 | 0 | 0 | 0 |
| 14 | 0 | 1.205E−02 | 1.225E−03 | −3.371E−04 | 3.973E−05 |

Each of FIGS. 22 to 24 shows a spherical aberration, an astigmatic aberration, and a distortion aberration in the numeral example 6 which is in focus at infinity. FIG. 22 shows the aberrations at the wide-angle position, FIG. 23 shows the aberrations at the intermediate focal length, and FIG. 24 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Values corresponding to the conditional formulae (1) to (6) of the respective numeral examples 1 to 6 are shown in Table 19.

TABLE 19

| CONDITIONAL FORMULA | Example 1 | Example 2 | Example 3 | Example 4 | Example 5 | Example 6 |
|---|---|---|---|---|---|---|
| (1) t2/fw | 0.13 | 0.13 | 0.13 | 0.13 | 0.13 | 0.13 |
| (2) f2/fw | −3.19 | −4.17 | −2.93 | −2.46 | −4.93 | −2.40 |
| (3) f12/fw | 3.54 | 4.05 | 3.38 | 2.66 | 4.34 | 2.63 |
| (4) f12/f2 | −1.11 | −0.97 | −1.15 | −1.08 | −0.88 | −1.12 |
| (5) vd31 − vd32 | 35.40 | 34.10 | 35.40 | 35.40 | 23.14 | 35.40 |
| (6) β3W · β3T | 0.983 | 0.976 | 0.991 | 0.971 | 0.996 | 0.990 |

It is understood that the numeral examples 1 to 6 all satisfy the conditional formulae (1) to (6) even with simple constructions, and that, as shown in Tables 1 to 18 and the respective aberration graphs, the zoom lenses are constructed small in structure and have good optical performance for an imaging device having a large number of pixels.

A zoom lens according to a second invention in the present invention will be described next.

The zoom lens according to the second invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a single lens having a negative refractive power, a prism for folding an optical path, and a single lens having a positive refractive power. The second lens group is composed of one single lens having a negative refractive power, and satisfies the following conditional formula (1):

$$t2/fw<0.4 \qquad (1)$$

where t2 represents the center thickness of the single lens having a negative refractive power constituting the second lens group, and fw represents the focal length of the whole lens system at the wide-angle position. According to a construction as described above, the zoom lens according to the second invention in the present invention has a good optical performance for a large number of pixels imaging device even with its simple construction, and can also be constructed small and thin in structure.

Namely, by constituting the first lens group by arranging the single lens having a negative refractive power, the prism for folding the optical path, and the single lens having a positive refractive power, in order from the object side, a direction in which the second lens group, the third lens group, and the fourth lens group are moved for zooming equals an optical-axis direction of the single lens having a positive refractive power of the first lens group, so that the thickness is reduced in a direction of an incident light axis.

In addition, by constituting the second lens group of the one single lens having a negative refractive power and by setting the second lens group so as to satisfy the conditional formula (1), a miniaturization of the total length and a good optical performance are realized.

The conditional formula (1) is intended to define a ratio of the center thickness of the single lens having a negative refractive power constituting the second lens group to the focal length of the whole lens system at the wide-angle position, and limits the thickness of the single lens having a negative refractive power constituting the second lens group. In the event of outside the value specified in the conditional formula (1), the total length of the second lens group in the optical-axis direction increases, making it difficult to miniaturize the total length of the whole lens system. It becomes also difficult to correct a positive curvature of field.

In a zoom lens according to an embodiment of the second invention, at least the single lens having a negative refractive power constituting the second lens group is made of a resin material, and is desired to satisfy the following conditional formula (2), so that it is possible to realize the ensuring of optical performance and a reduction of the manufacturing cost.

$$f2/fw<-2.0 \qquad (2)$$

where f2 represents the focal length of the single lens having a negative refractive power constituting the second lens group.

The conditional formula (2) is intended to define a ratio of the focal length of the single lens having a negative refractive power constituting the second lens group to the focal length of the whole lens system at the wide-angle position, and limits the refractive power of the single lens having a negative refractive power constituting the second lens group. In the event of outside the value specified in the conditional formula (2), the refractive power of the lens made of the resin material increases, making it difficult to ensure good optical performance using the resin material which exhibits relatively large variations in optical properties (refractive index or Abbe number).

In the zoom lens according to an embodiment of the second invention, at least, the single lens having a positive refractive power constituting the first lens group is made of a resin material, and is desired to satisfy the following conditional formula (3), so that it is possible to realize the ensuring of optical performance and a reduction of the manufacturing cost.

$$f12/fw>2.0 \qquad (3)$$

where f12 represents the focal length of the single lens having a positive refractive power constituting the first lens group.

The conditional formula (3) is intended to define a ratio of the focal length of the single lens having a positive refractive power constituting the first lens group to the focal length of the whole lens system at the wide-angle position, and limits the refractive power of the single lens having a positive refractive power constituting the first lens group. In the event of outside the value specified in the conditional formula (3), the refractive power of the lens made of the resin material increases, making it difficult to ensure good optical performance using the resin material which exhibits relatively large variations in optical properties (refractive index and Abbe number).

In the zoom lens according to an embodiment of the second invention, in a case where the single lens having a positive refractive power constituting the first lens group and the single lens having a negative refractive power constituting the second lens group are made of the resin materials, it is desirable to satisfy the following conditional formula (4), so that fluctuations in optical characteristics with temperature change can be reduced.

$$-2.0 \leq f12/f2 \leq -0.5 \qquad (4)$$

The conditional formula (4) is intended to set a ratio of the focal length of the single lens having a positive refractive power constituting the first lens group to the focal length of the single lens having a negative refractive power constituting the second lens group, and limits the balance of refractive power. In the event of outside the values specified in the conditional formula (4), the balance of aberration correction during temperature change breaks to degrade the optical performance, making it difficult to maintain good optical performance for an imaging device having a large number of pixels.

In the zoom lens according to an embodiment of the second invention, the third lens group is composed by arranging, in the following order from the object side, two single lenses, i.e., a single lens having a positive refractive power and a single lens having a negative refractive power, and is desired to satisfy the following conditional formula (5):

$$vd31-vd32>20 \qquad (5)$$

where vd31 represents the Abbe number, relative to d-line, of the single lens having a positive refractive power constituting the third lens group, and vd32 represents the Abbe number, relative to d-line, of the single lens having a negative refractive power constituting the third lens group.

First, by constituting the third lens group of the two single lenses, i.e., the single lens having a positive refractive power and the single lens having a negative refractive power, arranged in order from the object side, the number of lenses can be reduced, thereby compatibly realizing a miniaturization and a reduction of the manufacturing cost. In addition, by satisfying the conditional formula (5), a zoom lens having a good optical performance for the imaging device having a large number of pixels can be realized.

The conditional formula (5) is intended to set a difference between the Abbe number, relative to d-line, of the single lens having a positive refractive power constituting the third lens group and the Abbe number, relative to d-line, of the single lens having a negative refractive power constituting the third lens group, and is a condition for satisfactorily correcting chromatic aberrations occurring in the third lens group. In the event of outside the value specified in the conditional formula (5), it becomes difficult to correct the chromatic aberrations.

In the zoom lens according to an embodiment of the second invention, a lens cell on an incident light surface side of the single lens having a positive refractive power constituting the third lens group also serves as an aperture stop, so that it is possible to reduce the number of parts for the aperture stop and to shorten the total length. It is noted that this is not all, but the aperture stop may be disposed separately ahead of or inside the third lens group.

In the zoom lens according to an embodiment of the second invention, by moving the second lens group or the fourth lens group in the optical-axis direction, it is possible to focus on an object at short-distance.

In the zoom lens according to an embodiment of the second invention, by moving a part or the whole of the lens groups in a direction not parallel to the optical axis, an image on an image plane can be moved. By using this effect, optical correction of camera shaking can also be realized.

Specific embodiments of the zoom lens according to the second invention in the present invention, and numeral examples obtained by applying specific numerical values to these embodiments will be described next with reference to the drawings and tables.

Figure 25:
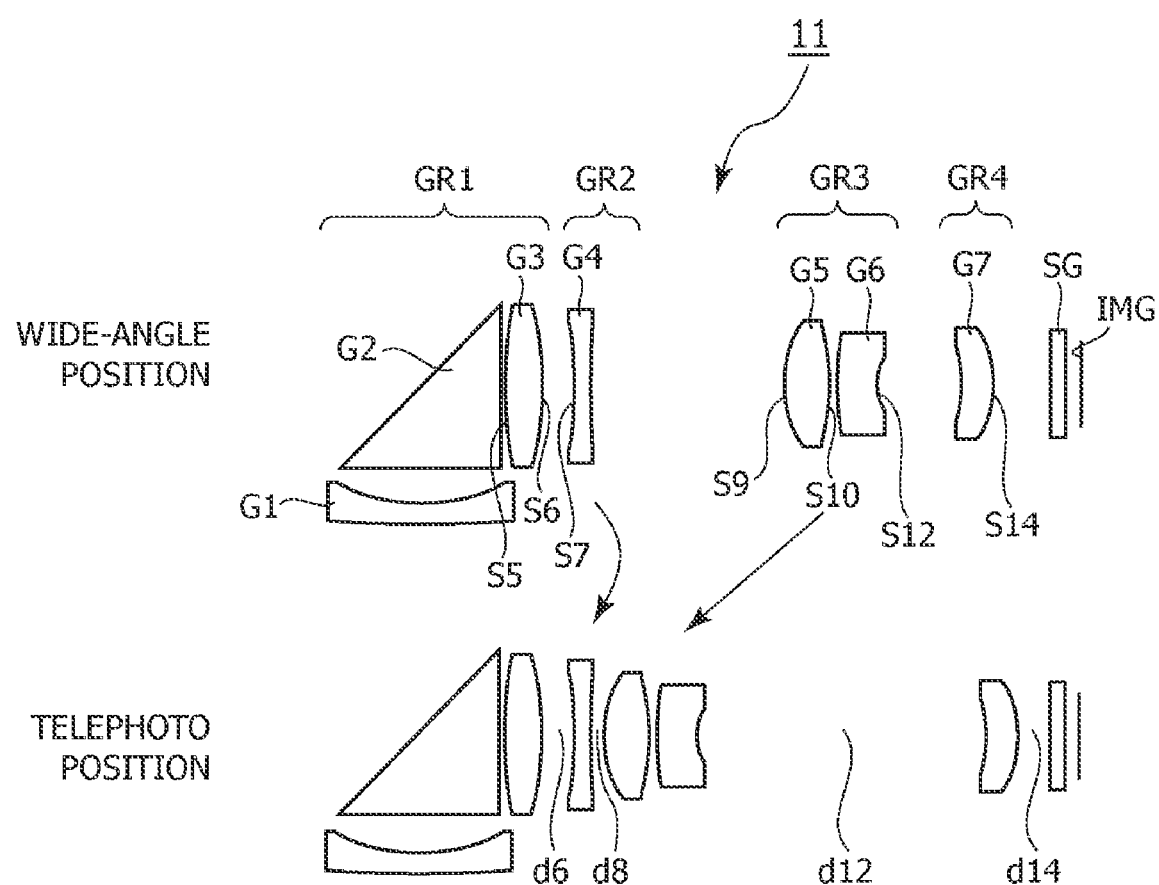
FIG. 25 is a diagram showing the lens construction of a first embodiment of a zoom lens according to a second invention in the present invention.

FIG. 25 shows the lens construction of a first embodiment 11 of the zoom lens according to the second invention, with a maximum wide-angle state shown above and a maximum telephoto state shown below, and with moving loci along the optical axis shown with arrows in between.

A zoom lens 11 according to the first embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward an image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a negative meniscus lens G1 facing the convex surface toward the object side, a prism G2 for folding an optical path, and a positive lens G3 formed in a biconvex shape, both surfaces of which are aspheric. The negative meniscus lens G1 and the prism G2 each are made of a glass material, and the positive lens G3 is made of a resin material. The second lens group GR2 is composed of a negative single lens G4 formed in a biconcave shape, the object-side surface of which is aspheric, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus-shaped single lens G7 facing the concave surface toward the object side, the image-side surface of which is aspheric. The positive meniscus-shaped single lens G7 is made of a resin material. It is noted that a seal glass SG is positioned between the fourth lens group GR4 and an image capture plane IMG.

Table 20 shows lens data of a numeral example 1 in which specific numeral values are applied to the zoom lens 11 according to the first embodiment.

TABLE 20

| Si | Ri | ASPHERICAL SURFACE | di | ni | vi |
|---|---|---|---|---|---|
| 1 | 110.437 | | 0.60 | 1.834 | 37.3 |
| 2 | 6.349 | | 1.31 | | |
| 3 | ∞ | | 5.50 | 1.834 | 37.3 |
| 4 | ∞ | | 0.20 | | |
| 5 | 14.351 | ASP | 1.30 | 1.583 | 30.0 |
| 6 | −12.075 | ASP | variable | | |
| 7 | −9.513 | ASP | 0.50 | 1.530 | 55.8 |
| 8 | 13.751 | | variable | | |
| 9 | 3.257 | ASP | 1.51 | 1.583 | 59.5 |
| 10 | −5.515 | ASP | 0.35 | | |
| 11 | 12.239 | | 1.40 | 1.821 | 24.1 |
| 12 | 2.636 | ASP | variable | | |
| 13 | −5.854 | | 1.16 | 1.530 | 55.8 |
| 14 | −3.167 | ASP | variable | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, the distance d12 between the third lens group GR3 and the fourth lens group GR4, and the distance d14 between the fourth lens group GR4 and the seal glass SG vary during zooming from the wide-angle position to the telephoto position. Values of the respective distances d6, d8, d12, and d14 in the numeral example 1 at the wide-angle position (f=3.71), at an intermediate focal length (f=6.25) between the wide-angle position and the telephoto position, and at the telephoto position (f=10.57) are shown in Table 21 along with focal lengths f, F-Numbers Fno, and angles of view 2ω.

TABLE 21

| | WIDE-ANGLE POSITION | INTERMEDIATE FOCAL LENGTH | TELEPHOTO POSITION |
|---|---|---|---|
| f | 3.71 | 6.25 | 10.57 |
| Fno | 2.87 | 3.86 | 5.54 |
| 2ω | 64.9 | 38.5 | 23.4 |
| d6 | 1.10 | 2.46 | 1.10 |
| d8 | 6.77 | 3.07 | 0.50 |
| d12 | 2.80 | 5.70 | 9.97 |
| d14 | 2.00 | 1.44 | 1.10 |

Both surfaces S5, S6 of the positive lens G3 of the first lens group GR1, the object-side surface S7 of the negative single lens G4 of the second lens group GR2, both surfaces S9, S10 of the positive lens G5 and the image-side surface S12 of the negative meniscus lens G6, of the third lens group GR3, and the image-side surface S14 of the positive meniscus-shaped single lens G7 of the fourth lens group GR4 are formed of aspherical surfaces. The 4th-, 6th-, 8th-, and 10th-order aspherical coefficients A, B, C, and D of these surfaces in the numeral example 1 are shown in Table 22 along with cone constants K.

TABLE 22

| Si | K | A | B | C | D |
|----|---|---|---|---|---|
| 5  | 0 | −5.811E−04 | 2.006E−05 | −8.461E−06 | 2.223E−07 |
| 6  | 0 | −6.149E−04 | 2.431E−05 | −8.550E−06 | 3.566E−07 |
| 7  | 0 | 4.607E−04  | 2.282E−05 | −6.149E−06 | 4.258E−07 |
| 9  | 0 | −3.080E−03 | −1.066E−04 | −5.394E−05 | −6.422E−06 |
| 10 | 0 | 7.688E−03  | −9.015E−04 | 6.406E−06 | 0 |
| 12 | 0 | −3.686E−03 | 1.314E−03 | 6.780E−04 | −2.684E−04 |
| 14 | 0 | 7.702E−03  | −1.335E−05 | −3.161E−06 | 2.825E−06 |

Figure 26:
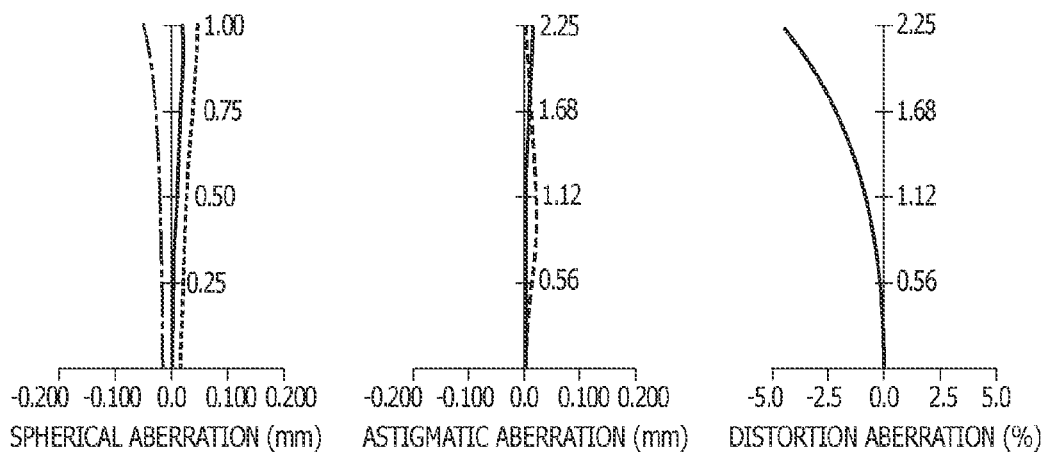
FIG. 26 is a graph showing, along with FIGS. 27 and 28, aberrations of a numeral example 1 obtained by applying specific numerical values to the first embodiment, FIG. 26 showing a spherical aberration, an astigmatic aberration, and a distortion aberration at the wide-angle position.
Figure 27:
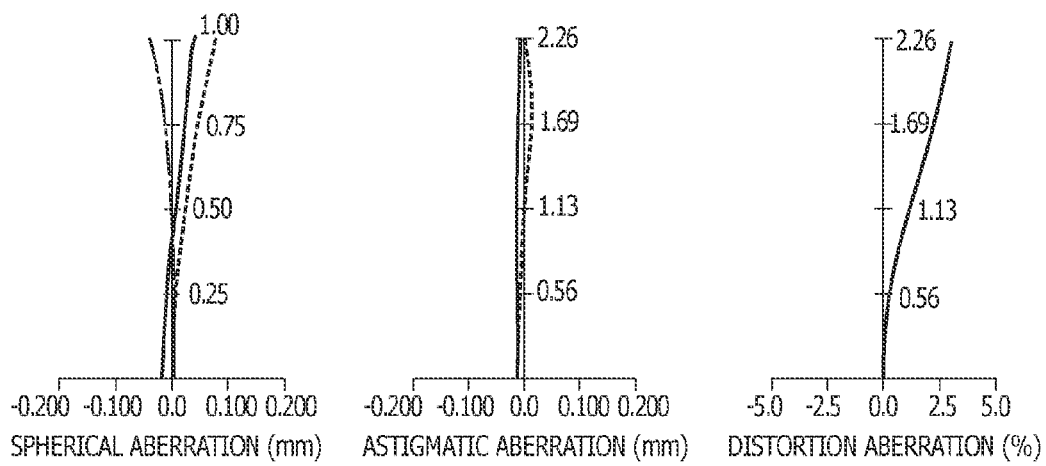
FIG. 27 is a graph showing a spherical aberration, an astigmatic aberration, and a distortion aberration at the intermediate focal length.
Figure 28:
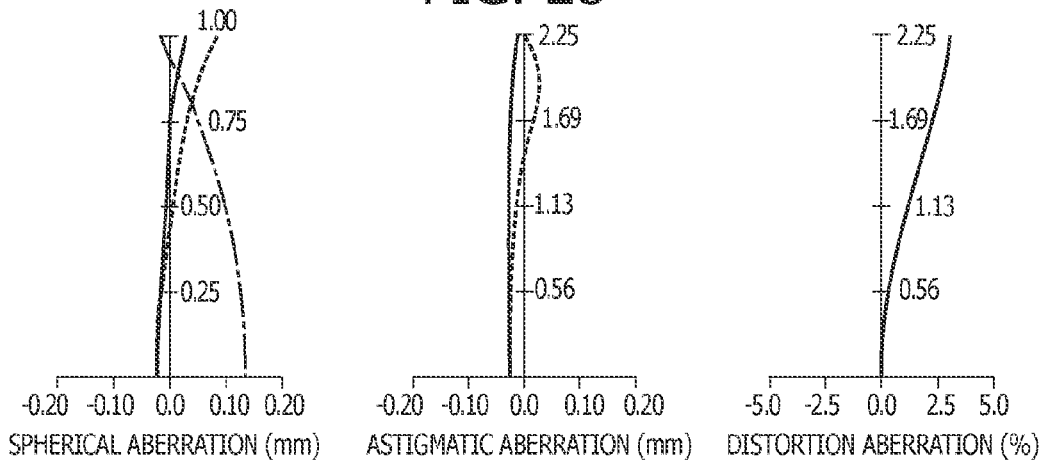
FIG. 28 is a graph showing a spherical aberration, an astigmatic aberration, and a distortion aberration at the telephoto position.

Each of FIGS. 26 to 28 shows a spherical aberration, an astigmatic aberration, and a distortion aberration in the numeral example 1 which is in focus at infinity. FIG. 26 shows the aberrations at the wide-angle position, FIG. 27 shows the aberrations at the intermediate focal length, and FIG. 28 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 29:
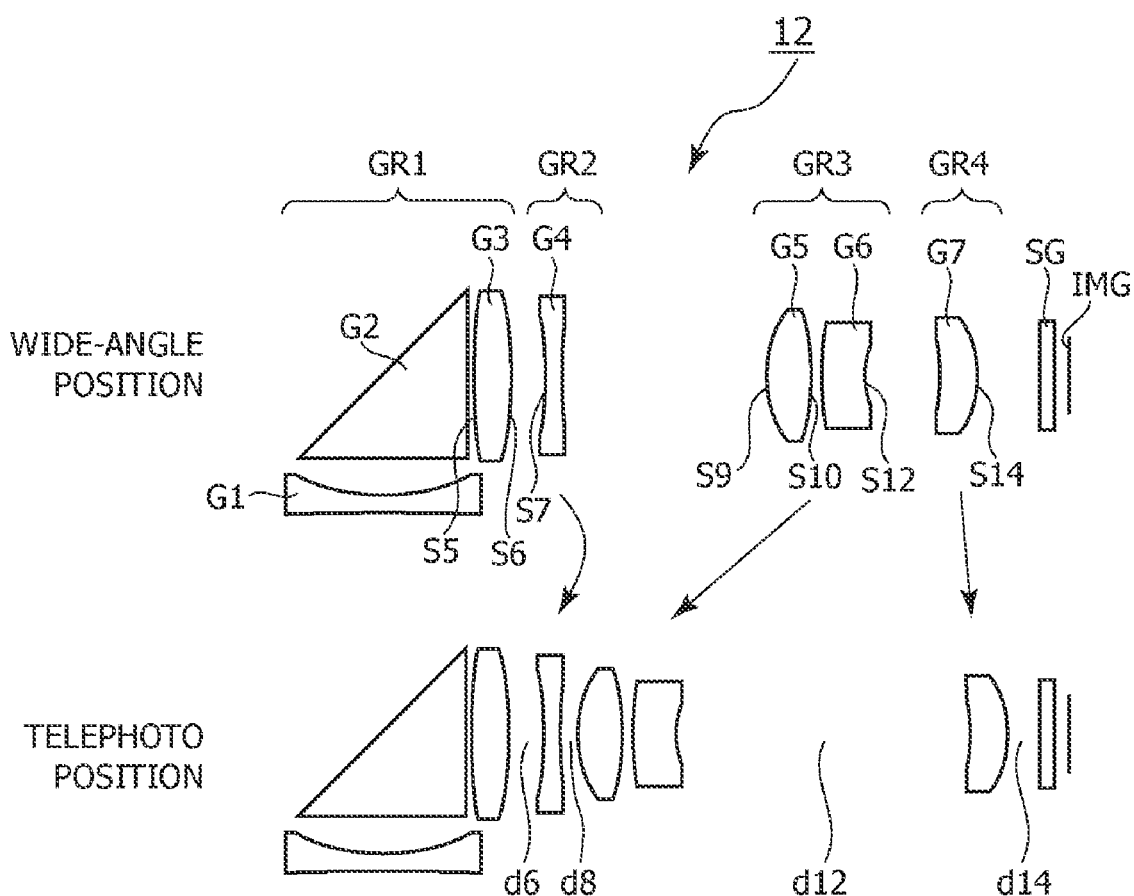
FIG. 29 is a diagram showing the lens construction of a second embodiment of the zoom lens according to the second invention.

FIG. 29 shows the lens construction of a second embodiment 12 of the zoom lens according to the second invention, with a maximum wide-angle state shown above and a maximum telephoto state shown below, and with moving loci along the optical axis shown with arrows in between.

A zoom lens 12 according to the second embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a negative lens G1 having a biconcave shape, a prism G2 for folding an optical path, and a positive lens G3 formed in a biconvex shape, both surfaces of which are aspheric. The negative lens G1 and the prism G2 each are made of a glass material, and the positive lens G3 is made of a resin material. The second lens group GR2 is composed of a negative single lens G4 formed in a biconcave shape, the object-side surface of which is aspherical, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus-shaped single lens G7 facing the concave surface toward the object side, the image-side surface of which is aspheric. The positive meniscus-shaped single lens G7 is made of a resin material. It is noted that a seal glass SG is positioned between the fourth lens group GR4 and an image capture plane IMG.

Table 23 shows lens data of a numeral example 2 in which specific numeral values are applied to the zoom lens 12 according to the second embodiment.

TABLE 23

| Si | Ri | ASPHERICAL SURFACE | di | ni | vi |
|----|-----|---------|----------|-------|------|
| 1  | −135.455 |      | 0.60     | 1.834 | 37.3 |
| 2  | 7.251    |      | 1.21     |       |      |
| 3  | ∞        |      | 5.50     | 1.834 | 37.3 |
| 4  | ∞        |      | 0.20     |       |      |
| 5  | 17.820   | ASP  | 1.30     | 1.583 | 30.0 |
| 6  | −10.811  | ASP  | variable |       |      |
| 7  | −8.952   | ASP  | 0.50     | 1.530 | 55.8 |
| 8  | 17.473   |      | variable |       |      |
| 9  | 3.182    | ASP  | 1.51     | 1.583 | 59.5 |
| 10 | −5.478   | ASP  | 0.38     |       |      |
| 11 | 11.833   |      | 1.40     | 1.821 | 24.1 |
| 12 | 2.424    | ASP  | variable |       |      |
| 13 | −7.537   |      | 1.20     | 1.530 | 55.8 |
| 14 | −3.384   | ASP  | variable |       |      |
| 15 | ∞        |      | 0.50     | 1.517 | 64.2 |
| 16 | ∞        |      | 0.50     |       |      |
| 17 | IMG      |      |          |       |      |

The distance d6 between the first lens group GR1 and the second lens group GR2, the distance d8 between the second lens group GR2 and the third lens group GR3, the distance d12 between the third lens group GR3 and the fourth lens group GR4, and the distance d14 between the fourth lens group GR4 and the seal glass SG vary during zooming from the wide-angle position to the telephoto position. Values of the respective distances d6, d8, d12, and d14 in the numeral example 2 at the wide-angle position (f=3.71), at the intermediate focal length (f=6.25) between the wide-angle position and the telephoto position, and at the telephoto position (f=10.57) are shown in Table 24 along with focal lengths f, F-Numbers Fno, and angles of view 2ω.

TABLE 24

|      | WIDE-ANGLE POSITION | INTERMEDIATE FOCAL LENGTH | TELEPHOTO POSITION |
|------|------|------|-------|
| f    | 3.71 | 6.25 | 10.57 |
| Fno  | 2.86 | 3.88 | 5.61  |
| 2ω   | 64.9 | 38.5 | 23.5  |
| d6   | 1.10 | 2.38 | 1.10  |
| d8   | 6.85 | 3.15 | 0.60  |
| d12  | 2.50 | 5.50 | 9.80  |
| d14  | 2.05 | 1.47 | 1.00  |

Both surfaces S5, S6 of the positive lens G3 of the first lens group GR1, the object-side surface S7 of the negative single lens G4 of the second lens group GR2, both surfaces S9, S10 of the positive lens G5 and the image-side surface S12 of the negative meniscus lens G6, of the third lens group GR3, and the image-side surface S14 of the positive meniscus-shaped single lens G7 of the fourth lens group GR4 are formed of aspherical surfaces. The 4th-, 6th-, 8th-, and 10th-order aspherical coefficients A, B, C, and D of these surfaces in the numeral example 2 are shown in Table 25 along with cone constants K.

TABLE 25

| Si | K | A | B | C | D |
|---|---|---|---|---|---|
| 5 | 0 | −5.337E−04 | −1.094E−06 | 1.1716E−07 | 0 |
| 6 | 0 | −5.016E−04 | −1.391E−05 | 5.084E−06 | −3.015E−07 |
| 7 | 0 | 4.775E−04 | 5.5507E−06 | 8.7853E−07 | −3.371E−07 |
| 9 | 0 | −3.421E−03 | −1.053E−04 | −5.187E−05 | −6.734E−06 |
| 10 | 0 | 7.981E−03 | −8.935E−04 | 8.400E−06 | 0 |
| 12 | 0 | −4.742E−03 | 1.034E−03 | 8.935E−04 | −3.400E−04 |
| 14 | 0 | 6.353E−03 | 2.295E−04 | −5.449E−05 | 4.857E−06 |

Figure 30:
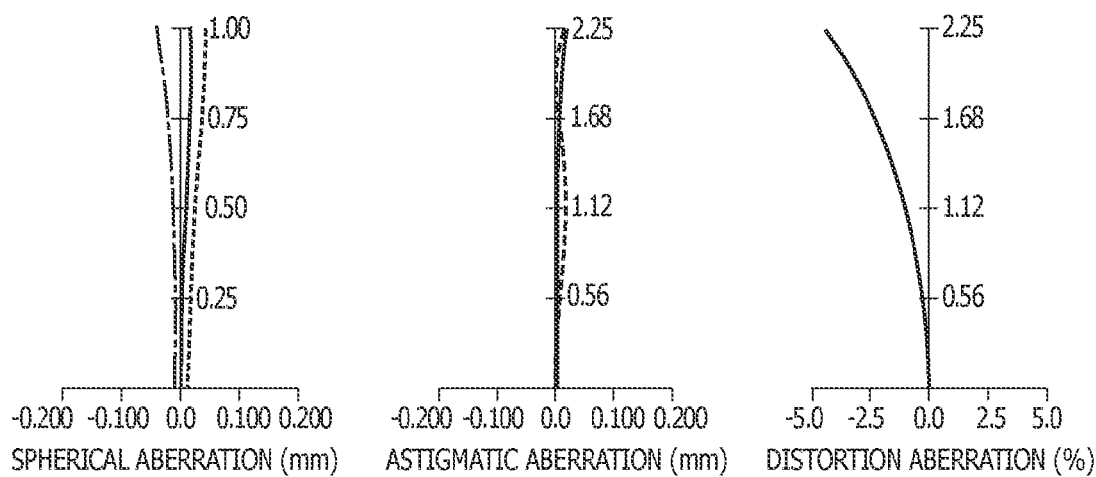
FIG. 30 is a graph showing, along with FIGS. 31 and 32, aberrations of a numeral example 2 obtained by applying specific numerical values to the second embodiment, FIG. 30 showing a spherical aberration, an astigmatic aberration, and a distortion aberration at the wide-angle position.
Figure 31:
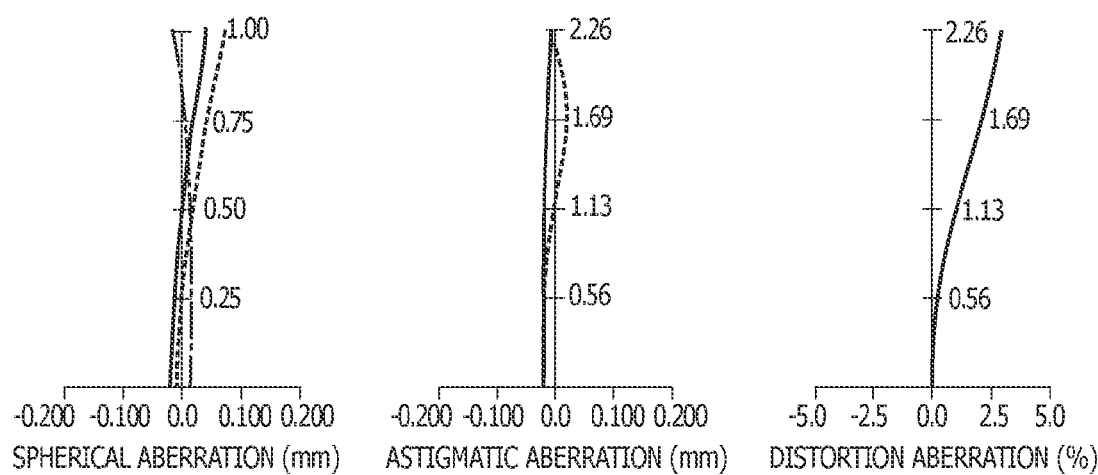
FIG. 31 is a graph showing a spherical aberration, an astigmatic aberration, and a distortion aberration at the intermediate focal length.
Figure 32:
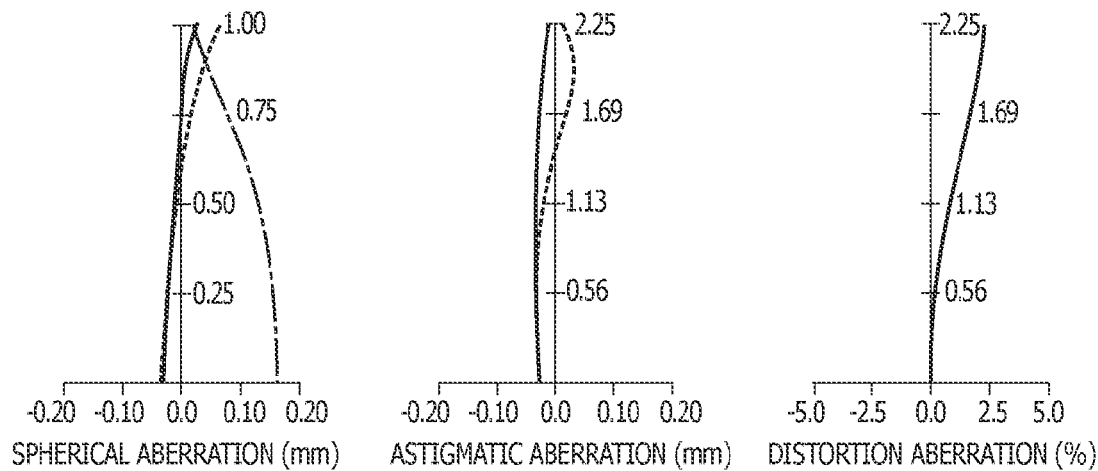
FIG. 32 is a graph showing a spherical aberration, an astigmatic aberration, and a distortion aberration at the telephoto position.

Each of FIGS. 30 to 32 shows a spherical aberration, an astigmatic aberration, and a distortion aberration in the numeral example 2 which is in focus at infinity. FIG. 30 shows the aberrations at the wide-angle position, FIG. 31 shows the aberrations at the intermediate focal length, and FIG. 32 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 33:
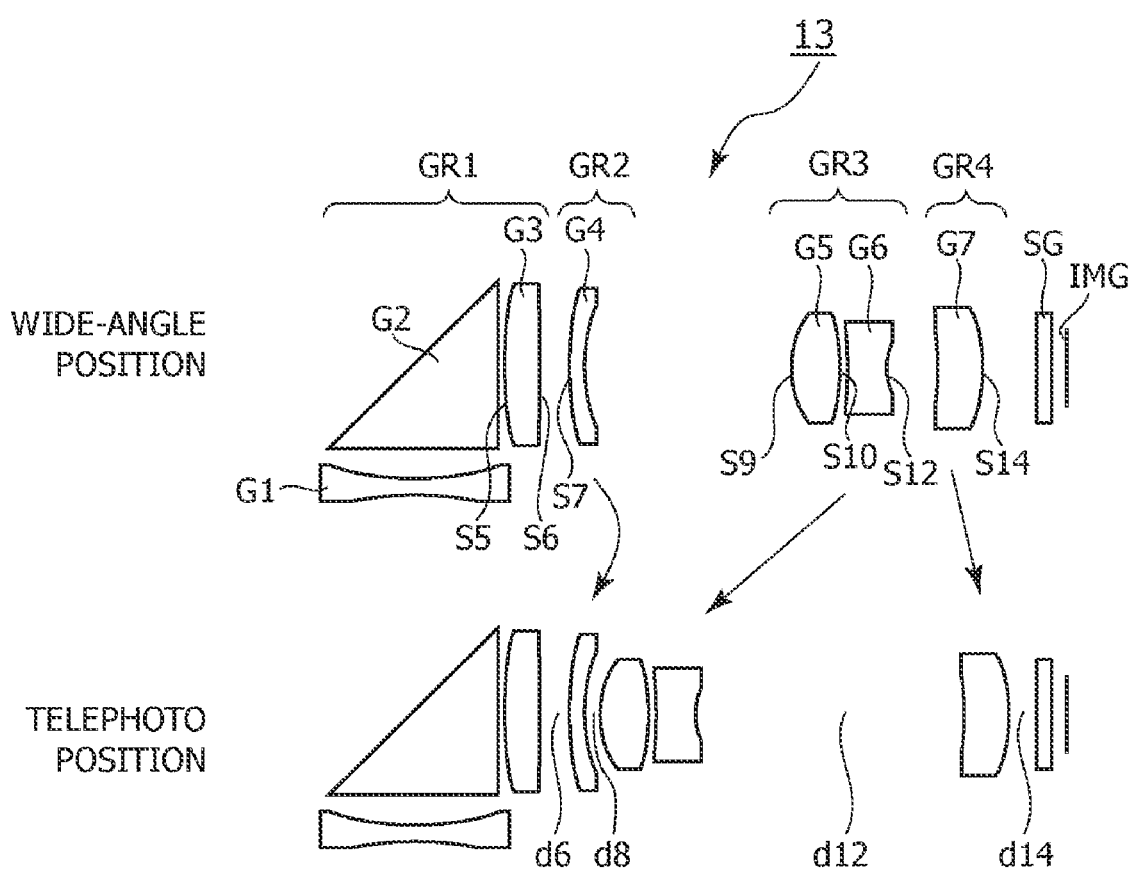
FIG. 33 is a diagram showing the lens construction of a third embodiment of the zoom lens according to the second invention.

FIG. 33 shows the lens construction of a third embodiment 13 of the zoom lens according to the second invention, with a wide-angle position state shown above and a telephoto position state shown below, and with moving loci along the optical axis shown with arrows in between.

A zoom lens 13 according to the third embodiment is composed by arranging, in the following order from the object side, a first lens group GR1 having a weak negative refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a negative lens G1 having a biconcave shape, a prism G2 for folding an optical path, and a positive lens G3 formed in a biconvex shape, both surfaces of which are aspheric. The negative lens G1 and the prism G2 each are made of a glass material, and the positive lens G3 is made of a resin material. The second lens group GR2 is composed of a negative meniscus-shaped single lens G4 facing the convex surface toward the image side, the object-side surface of which is aspheric, and the negative meniscus-shaped single lens G4 is made of a resin material. The third lens group GR3 is composed by arranging, in the following order from the object side, a positive lens G5 formed in a biconvex shape, both surfaces of which are aspheric, and a negative lens G6 formed in a biconcave shape, the image-side surface of which is aspheric. The positive lens G5 is made of a glass material, and the negative lens G6 is made of a light-transmitting ceramic material. The fourth lens group GR4 is composed of a positive meniscus-shaped single lens G7 facing the concave surface toward the object side, the image-side surface of which is aspheric. The positive meniscus-shaped single lens G7 is made of a resin material. It is noted that a seal glass SG is positioned between the fourth lens group GR4 and an image capture plane IMG.

Table 26 shows lens data of a numeral example 3 in which specific numeral values are applied to the zoom lens 13 according to the third embodiment.

TABLE 26

| Si | Ri | ASPHERICAL SURFACE | di | ni | vi |
|---|---|---|---|---|---|
| 1 | −22.972 | | 0.60 | 1.834 | 37.3 |
| 2 | 10.299 | | 1.02 | | |
| 3 | ∞ | | 5.80 | 1.834 | 37.3 |
| 4 | ∞ | | 0.20 | | |
| 5 | 10.513 | ASP | 1.26 | 1.583 | 30.0 |
| 6 | −43.696 | ASP | variable | | |
| 7 | 12.985 | ASP | 0.50 | 1.530 | 55.8 |
| 8 | 5.577 | | variable | | |
| 9 | 2.797 | ASP | 1.76 | 1.694 | 53.2 |
| 10 | −4.325 | ASP | 0.20 | | |
| 11 | −16.473 | | 1.40 | 2.082 | 30.1 |
| 12 | 2.684 | ASP | variable | | |
| 13 | −118.303 | | 1.69 | 1.530 | 55.8 |
| 14 | −3.450 | ASP | variable | | |
| 15 | ∞ | | 0.50 | 1.517 | 64.2 |
| 16 | ∞ | | 0.50 | | |
| 17 | IMG | | | | |

The distance d6 between the first lens group GR1 and the second lens group GR2, the distance d8 between the second lens group GR2 and the third lens group GR3, the distance d12 between the third lens group GR3 and the fourth lens group GR4, and the distance d14 between the fourth lens group GR4 and the seal glass SG vary during zooming from the wide-angle position to the telephoto position. Values of the respective distances d6, d8, d12, and d14 in the numeral example 3 at the wide-angle position (f=3.71), at the intermediate focal length (f=6.26) between the wide-angle position and the telephoto position, and at the telephoto position (f=10.56) are shown in Table 27 along with focal lengths f, F-Numbers Fno, and angles of view 2ω.

TABLE 27

| | WIDE-ANGLE POSITION | INTERMEDIATE FOCAL LENGTH | TELEPHOTO POSITION |
|---|---|---|---|
| f | 3.71 | 6.26 | 10.56 |
| Fno | 2.87 | 4.10 | 5.85 |
| 2ω | 64.8 | 38.5 | 23.3 |
| d6 | 1.10 | 2.01 | 1.10 |
| d8 | 7.37 | 3.56 | 0.60 |
| d12 | 1.80 | 5.29 | 9.47 |
| d14 | 1.90 | 1.30 | 1.00 |

Both surfaces S5, S6 of the positive lens G3 of the first lens group GR1, the object-side surface S7 of the negative meniscus-shaped single lens G4 of the second lens group GR2, both surfaces S9, S10 of the positive lens G5 and the image-side surface S12 of the negative lens G6, of the third lens group GR3, and the image-side surface S14 of the positive meniscus-shaped single lens G7 of the fourth lens group GR4 are formed of aspherical surfaces. The 4th-, 6th-, 8th-, and 10th-order aspherical coefficients A, B, C, and D of these surfaces in the numeral example 3 are shown in Table 28 along with cone constants K.

TABLE 28

| Si | K | A | B | C | D |
|----|---|---|---|---|---|
| 5  | 0 | −7.921E−04 | −4.164E−05 | 8.401E−06 | 0 |
| 6  | 0 | −3.607E−04 | −1.050E−04 | 2.260E−05 | −6.997E−07 |
| 7  | 0 | 1.597E−03 | −2.319E−04 | 5.337E−05 | −3.922E−06 |
| 9  | 0 | −2.935E−03 | −3.240E−04 | 1.419E−06 | −7.652E−05 |
| 10 | 0 | 1.661E−02 | −3.115E−03 | −2.867E−05 | 0 |
| 12 | 0 | −5.934E−03 | 2.337E−03 | 4.133E−03 | −1.409E−03 |
| 14 | 0 | 9.945E−03 | −5.724E−04 | 4.373E−05 | 5.696E−08 |

Figure 34:
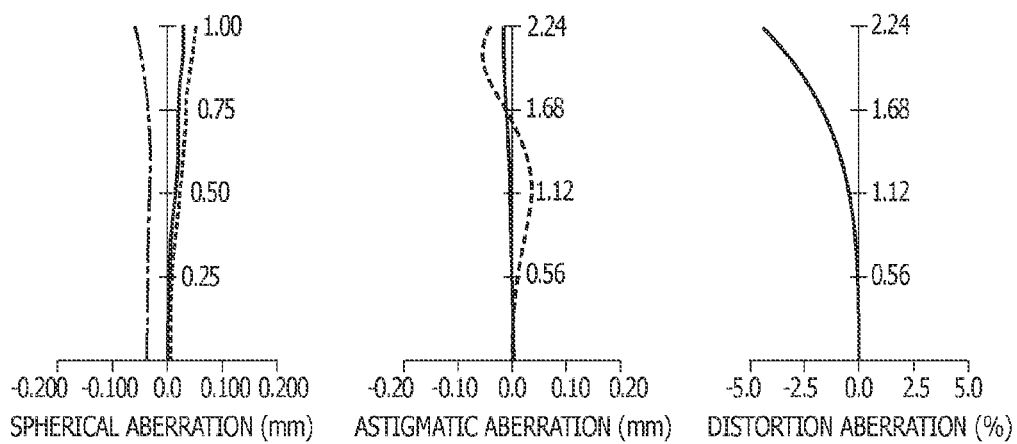
FIG. 34 is a graph showing, along with FIGS. 35 and 36, aberrations of a numeral example 3 obtained by applying specific numerical values to the third embodiment, FIG. 34 showing a spherical aberration, an astigmatic aberration, and a distortion aberration at the wide-angle position.
Figure 35:
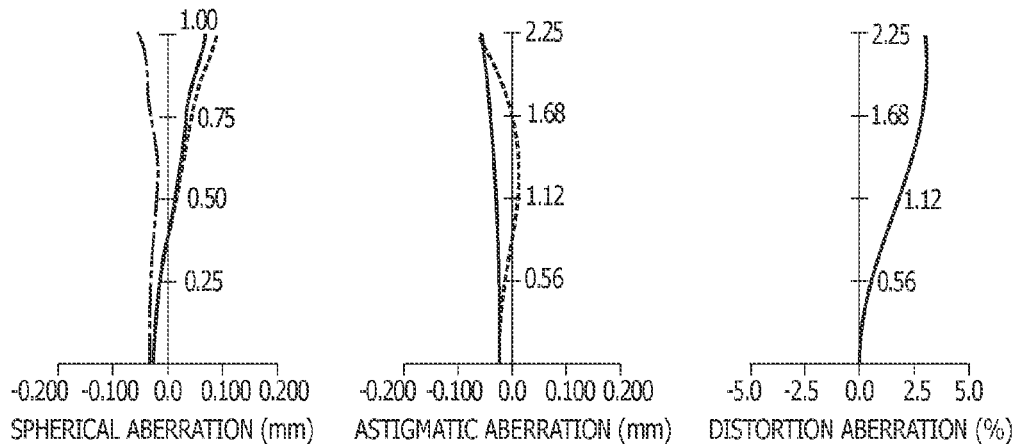
FIG. 35 is a graph showing a spherical aberration, an astigmatic aberration, and a distortion aberration at the intermediate focal length.
Figure 36:
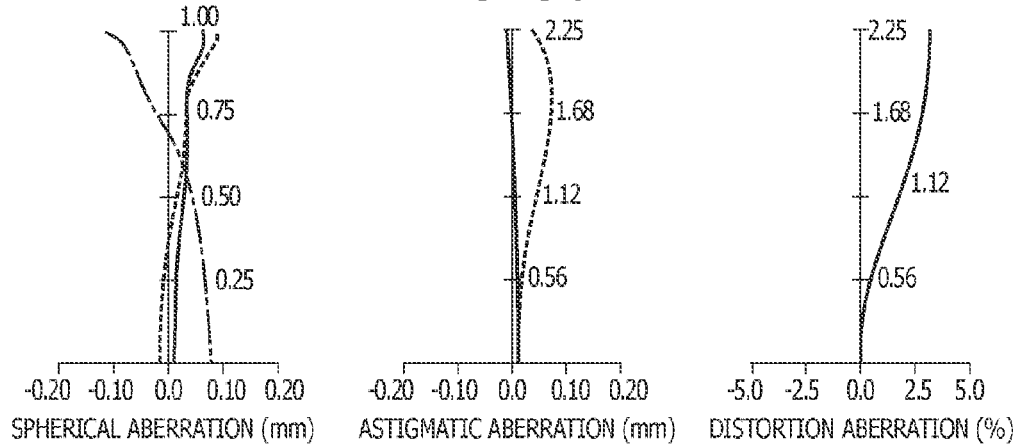
FIG. 36 is a graph showing a spherical aberration, an astigmatic aberration, and a distortion aberration at the telephoto position.

Each of FIGS. 34 to 36 shows a spherical aberration, an astigmatic aberration, and a distortion aberration in the numeral example 3 which is in focus at infinity. FIG. 34 shows the aberrations measured at the wide-angle position, FIG. 35 shows the aberrations at the intermediate focal length, and FIG. 36 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 37:
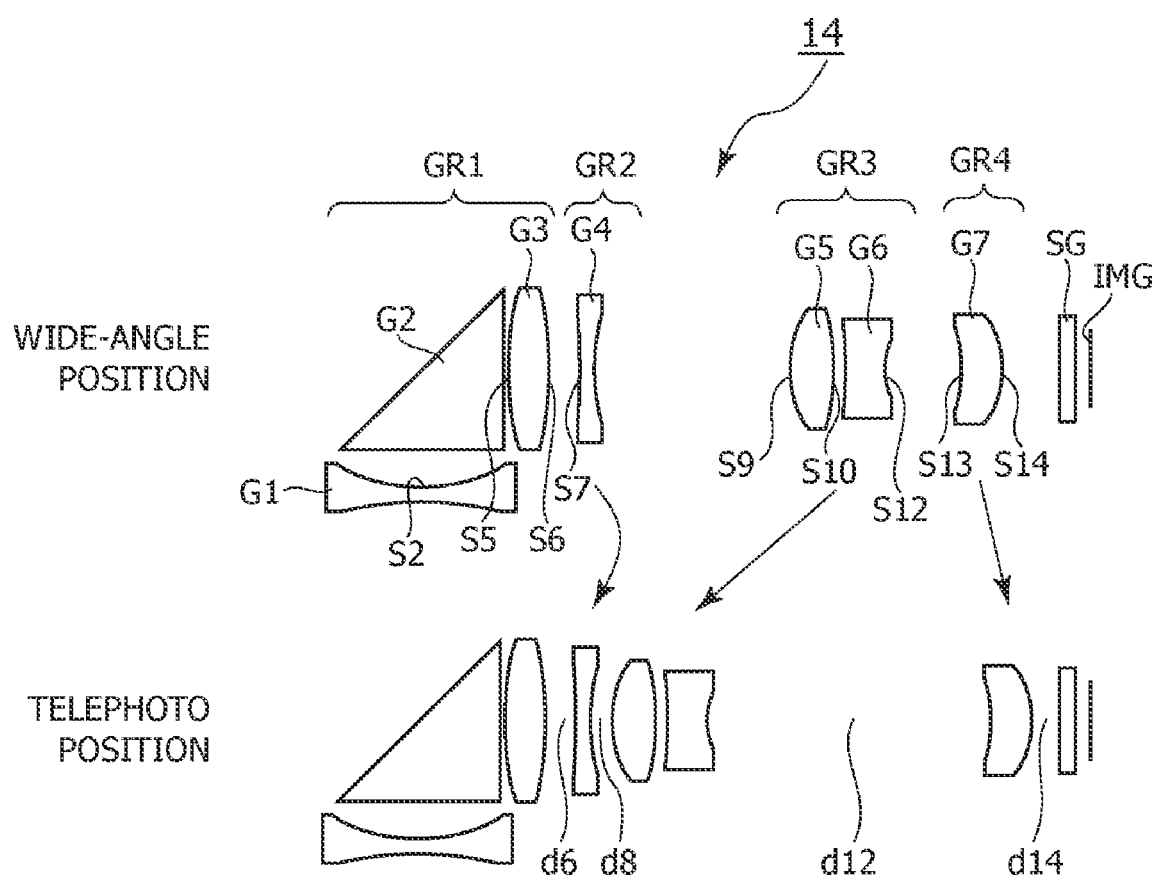
FIG. 37 is a diagram showing the lens construction of a fourth embodiment of the zoom lens according to the second invention.

FIG. 37 shows the lens construction of a fourth embodiment 14 of the zoom lens according to the second invention, with a maximum wide-angle state shown above and a maximum telephoto state shown below, and with moving loci along the optical axis shown with arrows in between.

A zoom lens 14 according to the fourth embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a negative lens G1 formed in a biconcave shape, the image-side surface of which is aspheric, a prism G2 for folding an optical path, and a positive lens G3 formed in a biconvex shape, both surfaces of which are aspheric. The negative lens G1, the prism G2, and the positive lens G3 each are made of a resin material. The second lens group GR2 is composed of a negative single lens G4 formed in a biconcave shape, the object-side surface of which is aspheric, and the negative single lens G4 is made of a resin material. The third lens group GR3 is composed by arranging, in the following order from the object side, a positive lens G5 formed in a biconvex shape, both surfaces of which are aspheric, and a negative meniscus lens G6 facing the convex surface toward the object side, the image-side surface of which is aspheric. The positive lens G5 and the negative meniscus lens G6 each are made of a glass material. The fourth lens group GR4 is composed of a positive meniscus-shaped single lens G7 facing the concave surface toward the object side, both surfaces of which are aspheric. The positive meniscus single lens G7 is made of a resin material. It is noted that a seal glass SG is positioned between the fourth lens group GR4 and an image capture plane IMG.

Table 29 shows lens data of a numeral example 4 in which specific numeral values are applied to the zoom lens 14 according to the fourth embodiment.

TABLE 29

| Si | Ri | ASPHERICAL SURFACE | di | ni | vi |
|----|-----|---|----|----|----|
| 1  | −18.017 |  | 0.60 | 1.583 | 30.0 |
| 2  | 5.949 | ASP | 1.32 |  |  |
| 3  | ∞ |  | 5.50 | 1.607 | 27.0 |
| 4  | ∞ |  | 0.20 |  |  |
| 5  | 8.876 | ASP | 1.37 | 1.607 | 27.0 |
| 6  | −18.969 | ASP | variable |  |  |
| 7  | −15.671 | ASP | 0.50 | 1.530 | 55.8 |
| 8  | 8.080 |  | variable |  |  |
| 9  | 3.089 | ASP | 1.55 | 1.583 | 59.5 |
| 10 | −5.031 | ASP | 0.40 |  |  |
| 11 | 25.163 |  | 1.40 | 1.821 | 24.1 |
| 12 | 2.595 | ASP | variable |  |  |
| 13 | −5.362 | ASP | 1.43 | 1.530 | 55.8 |
| 14 | −2.736 | ASP | variable |  |  |
| 15 | ∞ |  | 0.50 | 1.517 | 64.2 |
| 16 | ∞ |  | 0.50 |  |  |
| 17 | IMG |  |  |  |  |

The distance d6 between the first lens group GR1 and the second lens group GR2, the distance d8 between the second lens group GR2 and the third lens group GR3, the distance d12 between the third lens group GR3 and the fourth lens group GR4, and the distance d14 between the fourth lens group GR4 and the seal glass SG vary during zooming from the wide-angle position to the telephoto position. Values of the respective distances d6, d8, d12, and d14 in the numeral example 4 at the wide-angle position (f=3.70), at the intermediate focal length (f=6.25) between the wide-angle position and the telephoto position, and at the telephoto position (f=10.57) are shown in Table 30 along with focal lengths f, F-Numbers Fno, and angles of view 2ω.

TABLE 30

|  | WIDE-ANGLE POSITION | INTERMEDIATE FOCAL LENGTH | TELEPHOTO POSITION |
|---|---|---|---|
| f   | 3.70 | 6.25 | 10.57 |
| Fno | 2.86 | 3.89 | 5.68 |
| 2ω  | 64.9 | 38.5 | 23.4 |
| d6  | 1.10 | 2.30 | 1.10 |
| d8  | 6.72 | 3.31 | 0.60 |
| d12 | 2.60 | 5.55 | 9.82 |
| d14 | 2.01 | 1.27 | 0.90 |

The image-side surface S2 of the negative lens G1 and both surfaces S5, S6 of the positive lens G3, of the first lens group GR1, the object-side surface S7 of the negative single lens G4 of the second lens group GR2, both surfaces S9, S10 of the positive lens G5 and the image-side surface S12 of the negative meniscus lens G6, of the third lens group GR3, and both surfaces S13, S14 of the positive meniscus-shaped single lens G7 of the fourth lens group GR4 are formed of aspherical surfaces. The 4th-, 6th-, 8th-, and 10th-order aspherical coefficients A, B, C, and D of these surfaces in the numeral example 4 are shown in Table 31 along with cone constants K.

TABLE 31

| Si | K | A | B | C | D |
|----|---|---|---|---|---|
| 2 | 0 | −7.045E−04 | −9.237E−06 | −1.730E−06 | 6.905E−08 |
| 5 | 0 | −1.192E−03 | 1.486E−05 | −1.052E−05 | 0 |
| 6 | 0 | −1.036E−03 | 5.400E−05 | −1.485E−05 | 4.273E−07 |

TABLE 31-continued

| Si | K | A | B | C | D |
|---|---|---|---|---|---|
| 7 | 0 | 4.200E−04 | 7.773E−05 | −1.508E−05 | 9.323E−07 |
| 9 | 0 | −3.199E−03 | −1.340E−04 | −4.464E−05 | −1.287E−05 |
| 10 | 0 | 9.729E−03 | −1.112E−03 | 4.705E−06 | 0 |
| 12 | 0 | −4.979E−03 | 1.216E−03 | 1.622E−03 | −6.223E−04 |
| 13 | 0 | −6.854E−03 | 0 | 0 | 0 |
| 14 | 0 | 3.363E−03 | 1.632E−03 | −3.694E−04 | 4.360E−05 |

Each of FIGS. 38 to 40 shows a spherical aberration, an astigmatic aberration, and a distortion aberration in the numeral example 4 which is in focus at infinity. FIG. 38 shows the aberrations at the wide-angle position, FIG. 39 shows the aberrations at the intermediate focal length, and FIG. 40 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Values corresponding to the conditional formulae (1) to (5) of the respective numeral examples 1 to 4 are shown in Table 32.

TABLE 32

| CONDITIONAL FORMULA | | Example 1 | Example 2 | Example 3 | Example 4 |
|---|---|---|---|---|---|
| (1) | t2/fw | 0.13 | 0.13 | 0.13 | 0.13 |
| (2) | f2/fw | −2.84 | −2.99 | −5.09 | −2.70 |
| (3) | f12/fw | 3.09 | 3.17 | 3.95 | 2.74 |
| (4) | f12/f2 | −1.09 | −1.06 | −0.78 | −1.02 |
| (5) | vd31 − vd32 | 35.40 | 35.40 | 23.10 | 35.40 |

It is understood that the numeral examples 1 to 4 all satisfy the conditional formulae (1) to (5) even with simple constructions, and that, as shown in Tables 21 to 31 and the respective aberration graphs, the zoom lenses are constructed small in structure and have a good optical performance for an imaging device with a large number of pixels.

A zoom lens according to a third invention in the present invention will be described next.

The zoom lens according to the third invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group and the third lens group. The first lens group is composed by arranging, in the following order from the object side, a lens prism having a negative refractive power for folding an optical path, and a single lens having a positive refractive power. The second lens group is composed of one single lens having a negative refractive power, and satisfies the following conditional formula (1):

$$t2/fw < 0.4 \quad (1)$$

where t2 represents the center thickness of the single lens having a negative refractive power constituting the second lens group, and fw represents the focal length of the whole lens system at the wide-angle position.

As thus constructed, the zoom lens according to the third invention in the present invention has a good optical performance for imaging device having a large number of pixels even with its simple construction, and can also be constructed small and thin in structure.

Namely, by constituting the first lens group by arranging the lens prism having a negative refractive power for folding the optical path, and the single lens having a positive refractive power, in order from the object side, a direction in which the second lens group and the third lens group are moved for zooming equals an optical-axis direction of the single lens having a positive refractive power of the first lens group, so that the thickness is reduced in a direction of an incident light axis. In addition, by providing a negative refractive power to the prism for folding the optical path, a further thickness reduction can be achieved.

Furthermore, by constituting the second lens group of the one single lens having a negative refractive power and by setting the second lens group so as to satisfy the conditional formula (1), a miniaturization of the total length and a good optical performance are realized.

The conditional formula (1) is intended to define a ratio of the center thickness of the single lens having a negative refractive power constituting the second lens group to the focal length of the whole lens system at the wide-angle position, and limits the thickness of the single lens having a negative refractive power constituting the second lens group. In the event of outside the value specified in the conditional formula (1), the total length of the second lens group in the optical-axis direction increases, making it difficult to miniaturize the total length of the whole lens system. It becomes also difficult to correct a positive curvature of field.

In a zoom lens according to an embodiment of the third invention, at least the single lens having a negative refractive power constituting the second lens group is made of a resin material, and is desired to satisfy the following conditional formula (2):

$$f2/fw < -2.0 \quad (2)$$

where f2 represents the focal length of the single lens having a negative refractive power constituting the second lens group.

As a result, it is possible to realize the ensuring of optical performance and a reduction of the manufacturing cost.

The conditional formula (2) is intended to define a ratio of the focal length of the single lens having a negative refractive power constituting the second lens group to the focal length of the whole lens system at the wide-angle position, and limits the refractive power of the single lens having a negative refractive power constituting the second lens group. In the event of outside the value specified in the conditional formula (2), the refractive power of the lens made of the resin material increases, making it difficult to ensure good optical performance using the resin material which exhibits relatively large variations in optical properties (refractive index or Abbe number).

In the zoom lens according to an embodiment of the third invention, at least the single lens having a positive refractive power constituting the first lens group is made of a resin material, and is desired to satisfy the following conditional formula (3):

$$f12/fw > 2.0 \quad (3)$$

where f12 represents the focal length of the single lens having a positive refractive power constituting the first lens group.

As a result, it is possible to realize the ensuring of optical performance and a reduction of the manufacturing cost.

The conditional formula (3) is intended to define a ratio of the focal length of the single lens having a positive refractive power constituting the first lens group to the focal length of the whole lens system at the wide-angle position, and limits the refractive power of the single lens having a positive refractive power constituting the first lens group. In the event of outside the value specified in the conditional formula (3), the refractive power of the lens made of the resin material increases, making it difficult to ensure good optical performance using the resin material which exhibits relatively large variations in optical properties (refractive index and Abbe number).

In the zoom lens according to an embodiment of the third invention, in a case where the single lens having a positive refractive power constituting the first lens group and the single lens having a negative refractive power constituting the second lens group are made of the resin materials, it is desirable to satisfy the following conditional formula (4). As a result, fluctuations in optical characteristics with temperature change can be reduced.

$$-2.0 \leq f12/f2 \leq -0.5 \quad (4)$$

The conditional formula (4) is intended to set a ratio of the focal length of the single lens having a positive refractive power constituting the first lens group to the focal length of the single lens having a negative refractive power constituting the second lens group, and limits the balance of refractive power. In the event of outside the values specified in the conditional formula (4), the balance of aberration correction during temperature change breaks to degrade the optical performance, making it difficult to maintain good optical performance for an imaging device with a large number of pixels.

In the zoom lens according to an embodiment of the third invention, the third lens group is composed by arranging, in the following order from the object side, a single lens having a positive refractive power and a single lens having a negative refractive power, and is desired to satisfy the following conditional formulae (5) and (6):

$$vd31 - vd32 > 20, \text{ and} \quad (5)$$

$$0.9 < \beta 3w \cdot \beta 3t < 1.1 \quad (6)$$

where vd31 represents the Abbe number, relative to d-line, of the single lens having a positive refractive power constituting the third lens group, vd32 represents the Abbe number, relative to d-line, of the single lens having a negative refractive power constituting the third lens group, $\beta 3w$ represents the transverse magnification at the wide-angle position of the third lens group with respect to an infinity object, and $\beta 3t$ represents the transverse magnification at the telephoto position of the third lens group with respect to the infinity object.

First, by constituting the third lens group of the two single lenses, i.e., the single lens having a positive refractive power and the single lens having a negative refractive power, arranged in order from the object side, the third lens group can be composed by using a small number of lenses, thereby compatibly realizing a miniaturization and a reduction of the manufacturing cost.

In addition, by satisfying the conditional formulae (5) and (6), a small-sized zoom lens having a good optical performance for an imaging device with a large number of pixels can be realized.

The conditional formula (5) is intended to set a difference between the Abbe number, relative to d-line, of the single lens having a positive refractive power constituting the third lens group and the Abbe number, relative to d-line, of the single lens having a negative refractive power constituting the third lens group, and is a condition for satisfactorily correcting chromatic aberrations occurring in the third lens group. In the event of outside the value specified in the conditional formula (5), it becomes difficult to correct the chromatic aberrations.

The conditional formula (6) is intended to set a product of the transverse magnification at the wide-angle position and the transverse magnification at the telephoto position, of the third lens group with respect to an infinity object, and limits the magnification of the third lens group. In the event of outside the values specified in the conditional formula (6), the total length of the optical system increases, making it difficult to achieve the miniaturization. Namely, by using the transverse magnification of the third group at an intermediate focal position between the wide-angle position and the telephoto position, in the vicinity of minus one (-1) times, the total length of the optical system is prevented from increasing, thereby realizing the miniaturization.

In the zoom lens according to an embodiment of the third invention, a lens cell on an incident light surface side of the single lens having a positive refractive power constituting the third lens group also serves as an aperture stop, so that it is possible to reduce the number of parts for the aperture stop and to shorten the total length. It is noted that this is not all, but the aperture stop may be disposed separately ahead of or inside the third lens group.

In the zoom lens according to an embodiment of the third invention, it is configured to move the second lens group in the optical-axis direction for focusing on an object at short-distance, and thus to arrange the fourth lens group as a fixed group, thereby suppressing infiltration of dust into the imaging device. However, the fourth lens group may alternatively be moved along an optical axis for focusing on the nearby object.

In the zoom lens according to an embodiment of the third invention, by moving a part or the whole of the lens groups in a direction not parallel to the optical axis, an image on an image plane can be moved. By using this effect, optical correction of camera shaking can be realized.

Specific embodiments of the zoom lens according to the third invention in the present invention, and numeral examples obtained by applying specific numerical values to these embodiments will be described next with reference to the drawings and tables.

Figure 41:
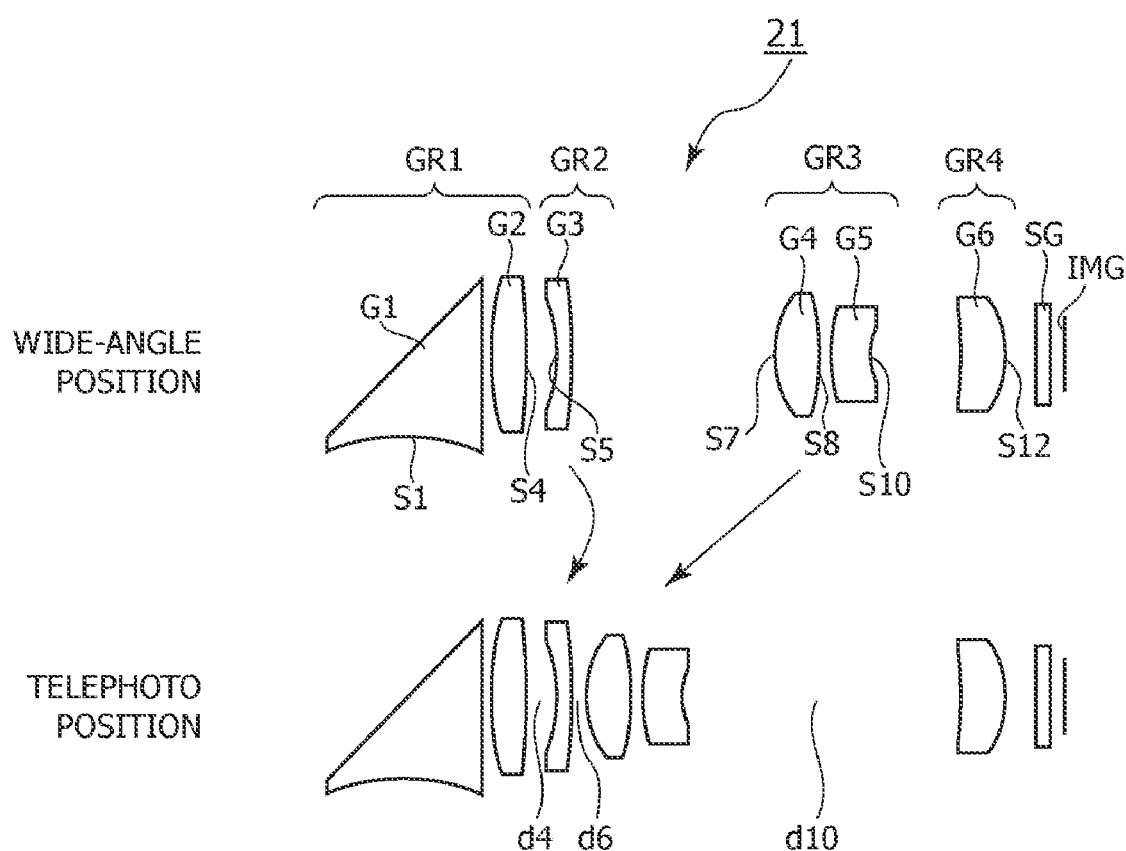
FIG. 41 is a diagram showing the lens construction of a first embodiment of a zoom lens according to a third invention in the present invention.

FIG. 41 shows the lens construction of a first embodiment 21 of the zoom lens according to the third invention, with a maximum wide-angle state shown above and a maximum telephoto state shown below, and with moving loci along the optical axis shown with arrows in between.

A zoom lens 21 according to the first embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward an image side while depicting a convex locus, and the third lens group GR3 moves monotonously toward the object side, to perform zooming.

The first lens group GR1 is composed by arranging, in the following order from the object side, a lens prism G1 having a negative refractive power, the object side of which is formed in an aspherical shape that faces the concave surface toward the object side, and a positive lens G2 formed in a biconvex shape, the image-side surface of which is aspheric. The lens prism G1 is made of a glass material, and the positive lens G2 is made of a resin material. The second lens group GR2 is composed of a negative meniscus-shaped single lens G3 facing the convex surface toward the object side, the object side of which is aspheric, and the negative meniscus-shaped single lens G3 is made of a resin material. The third lens group GR3 is composed by arranging, in the following order from the object side, a positive lens G4 formed in a biconvex shape, both surfaces of which are aspheric, and a negative meniscus lens G5 facing the convex surface toward the object side, the image-side surface of which is aspheric. The positive lens G4 and the negative meniscus lens G5 each are made of a glass material. The fourth lens group GR4 is composed of a positive meniscus-shaped single lens G6 facing the concave surface toward the object side, the image side surface of which is aspheric. The positive meniscus-shaped single lens G6 is made of a resin material. It is noted that a seal glass SG is positioned between the fourth lens group GR4 and an image capture plane IMG.

Table 33 shows lens data of a numeral example 1 in which specific numeral values are applied to the zoom lens 21 according to the first embodiment.

TABLE 33

| Si | Ri | ASPHERICAL SURFACE | di | ni | vi |
|---|---|---|---|---|---|
| 1 | −6.181 | ASP | 5.70 | 1.834 | 37.3 |
| 2 | ∞ | | 0.20 | | |
| 3 | 9.818 | | 1.36 | 1.583 | 30.0 |
| 4 | −16.846 | ASP | variable | | |
| 5 | −4.911 | ASP | 0.50 | 1.530 | 55.8 |
| 6 | −21.318 | | variable | | |
| 7 | 3.307 | ASP | 1.66 | 1.583 | 59.5 |
| 8 | −5.118 | ASP | 0.40 | | |
| 9 | 8.392 | | 1.40 | 1.821 | 24.1 |
| 10 | 2.052 | ASP | variable | | |
| 11 | −8.646 | | 1.64 | 1.530 | 55.8 |
| 12 | −2.915 | ASP | 1.10 | | |
| 13 | ∞ | | 0.50 | 1.517 | 64.2 |
| 14 | ∞ | | 0.50 | | |
| 15 | IMG | | | | |

The distance d4 between the first lens group GR1 and the second lens group GR2, the distance d6 between the second lens group GR2 and the third lens group GR3, and the distance d10 between the third lens group GR3 and the fourth lens group GR4 vary during zooming from the wide-angle position to the telephoto position. Values of the respective distances d4, d6, and d10 in the numeral example 1 at the wide-angle position (f=4.00), at the intermediate focal length (f=6.76) between the wide-angle position and the telephoto position, and at the telephoto position (f=11.43) are shown in Table 34 along with focal lengths f, F-Numbers Fno, and angles of view 2ω.

TABLE 34

| | WIDE-ANGLE POSITION | INTERMEDIATE FOCAL LENGTH | TELEPHOTO POSITION |
|---|---|---|---|
| f | 4.00 | 6.76 | 11.43 |
| Fno | 2.87 | 3.84 | 5.51 |
| 2ω | 61.4 | 35.8 | 21.9 |
| d4 | 1.10 | 2.85 | 1.10 |
| d6 | 7.37 | 3.08 | 0.50 |
| d10 | 3.27 | 5.81 | 10.14 |

The object-side surface S1 of the lens prism G1 and the image-side surface S4 of the positive lens G2, of the first lens group GR1, the object-side surface S5 of the negative meniscus-shaped single lens G3 of the second lens group GR2, both surfaces S7, S8 of the positive lens G4 and the image-side surface S10 of the negative meniscus lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 1 are shown in Table 35 along with cone constants K.

TABLE 35

| Si | K | A | B | C | D |
|---|---|---|---|---|---|
| 1 | 0 | 2.039E−03 | −8.887E−07 | −3.715E−07 | 2.088E−08 |
| 4 | 0 | 1.239E−03 | −3.430E−05 | 6.164E−06 | −2.354E−07 |
| 5 | 0 | 9.231E−04 | −1.546E−05 | 7.963E−06 | −8.595E−07 |
| 7 | 0 | −3.313E−03 | 1.181E−05 | −8.270E−05 | 6.114E−06 |
| 8 | 0 | 9.738E−03 | −1.240E−03 | 9.281E−05 | 0 |
| 10 | 0 | −1.049E−02 | 1.307E−03 | 7.891E−04 | −5.764E−04 |
| 12 | 0 | 1.012E−02 | 3.173E−04 | −1.230E−04 | 1.883E−05 |

Figure 42:
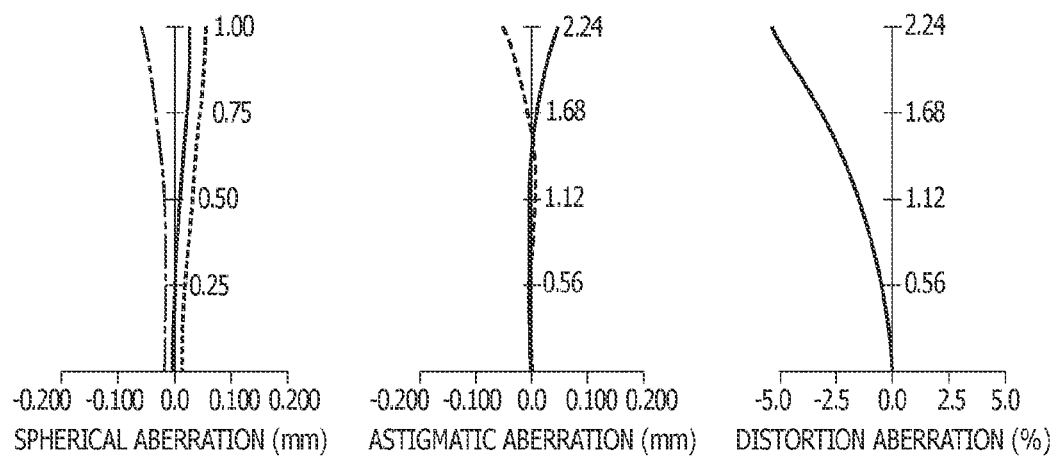
FIG. 42 is a graph showing, along with FIGS. 43 and 44, aberrations of a numeral example 1 obtained by applying specific numerical values to the first embodiment, FIG. 42 showing a spherical aberration, an astigmatic aberration, and a distortion aberration at the wide-angle position.
Figure 43:
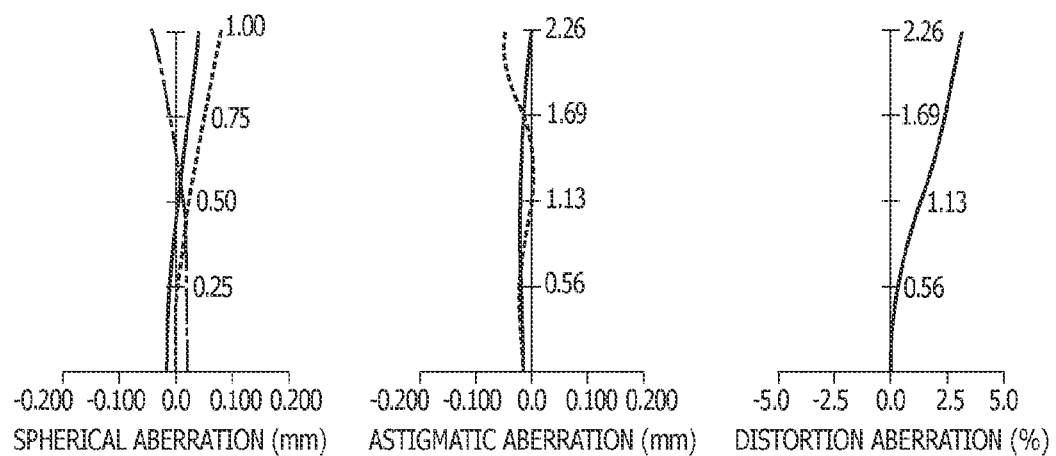
FIG. 43 is a graph showing a spherical aberration, an astigmatic aberration, and a distortion aberration at the intermediate focal length.
Figure 44:
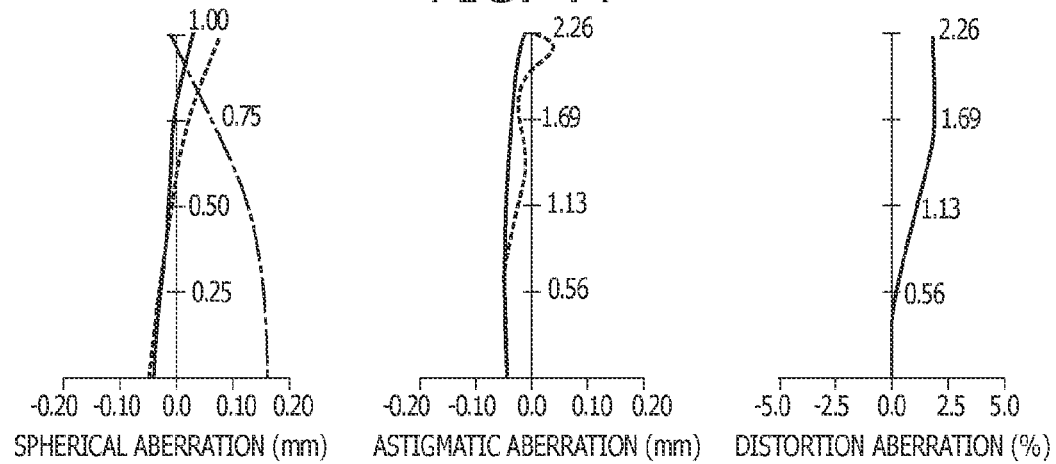
FIG. 44 is a graph showing a spherical aberration, an astigmatic aberration, and a distortion aberration at the telephoto position.

Each of FIGS. 42 to 44 shows a spherical aberration, an astigmatic aberration, and a distortion aberration in the numeral example 1 which is in focus at infinity. FIG. 42 shows the aberrations measured at the wide-angle position, FIG. 43 shows the aberrations at the intermediate focal length, and FIG. 44 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 45:
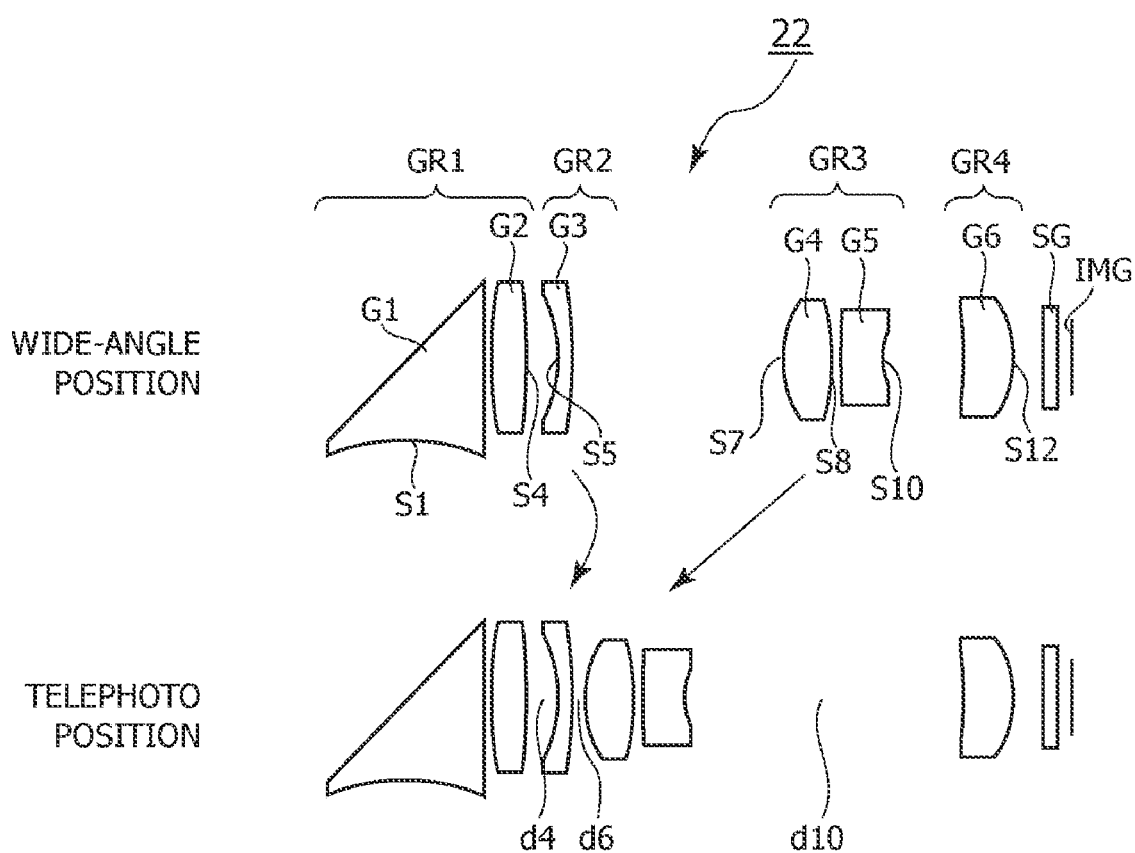
FIG. 45 is a diagram showing the lens construction of a second embodiment of the zoom lens according to the third invention.

FIG. 45 shows the lens construction of a second embodiment 22 of the zoom lens according to the third invention, with a maximum wide-angle state shown above and a maximum telephoto state shown below, and with moving loci along the optical axis shown with arrows in between.

A zoom lens 22 according to the second embodiment is composed by arranging, in the following order from the object side, a first lens group GR1 having a weak negative refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a lens prism G1 having a negative refractive power, the object side of which is formed in an aspherical shape that faces the concave surface toward the object side, and a positive lens G2 formed in a biconvex shape, the image-side surface of which is aspheric. The lens prism G1 is made of a glass material, and the positive lens G2 is made of a resin material. The second lens group GR2 is composed of a a negative meniscus shaped single lens G3 facing the convex surface toward the image-side, the object side surface of which is aspheric, and the negative meniscus-shaped single lens G3 is made of a resin material. The third lens group GR3 is composed by arranging, in the following order from the object side, a positive lens G4 formed in a convex shape, both surfaces of which are aspheric, and a negative lens G5 formed in a biconvex shape, the image-side surface of which is aspheric. The positive lens G4 and the negative lens G5 each are made of a glass material. The fourth lens group GR4 is composed of a a positive meniscus shape single lens G6 facing the concave surface toward the object side, the image-side surface of which is aspheric. The positive meniscus-shaped single lens G6 is made of a resin material. It is noted that a seal glass SG is positioned between the fourth lens group GR4 and an image capture plane IMG.

Table 36 shows lens data of a numeral example 2 in which specific numeral values are applied to the zoom lens 22 according to the second embodiment.

TABLE 36

| Si | Ri | ASPHERICAL SURFACE | di | ni | vi |
|---|---|---|---|---|---|
| 1 | −6.700 | ASP | 5.70 | 1.834 | 37.3 |
| 2 | ∞ | | 0.20 | | |
| 3 | 15.381 | | 1.28 | 1.583 | 30.0 |
| 4 | −14.529 | ASP | variable | | |
| 5 | −5.426 | ASP | 0.50 | 1.530 | 55.8 |
| 6 | −17.386 | | variable | | |
| 7 | 3.407 | ASP | 1.72 | 1.743 | 49.3 |
| 8 | −6.164 | ASP | 0.39 | | |
| 9 | −760.084 | | 1.40 | 1.821 | 24.1 |
| 10 | 2.202 | ASP | variable | | |
| 11 | −18.250 | | 1.80 | 1.530 | 55.8 |
| 12 | −3.069 | ASP | 1.10 | | |
| 13 | ∞ | | 0.50 | 1.517 | 64.2 |
| 14 | ∞ | | 0.50 | | |
| 15 | IMG | | | | |

The distance d4 between the first lens group GR1 and the second lens group GR2, the distance d6 between the second lens group GR2 and the third lens group GR3, and the distance d10 between the third lens group GR3 and the fourth lens group GR4 vary during zooming from the wide-angle position to the telephoto position. Values of the respective distances d4, d6, and d10 in the numeral example 2 measured at the wide-angle position (f=4.00), at the intermediate focal length (f=6.76) between the wide-angle position and the telephoto position, and at the telephoto position (f=11.44) are shown in Table 37 along with focal lengths f, F-Numbers Fno, and angles of view 2ω.

TABLE 37

| | WIDE-ANGLE POSITION | INTERMEDIATE FOCAL LENGTH | TELEPHOTO POSITION |
|---|---|---|---|
| f | 4.00 | 6.76 | 11.44 |
| Fno | 2.87 | 3.90 | 5.57 |
| 2ω | 61.4 | 35.8 | 21.9 |
| d4 | 1.10 | 2.92 | 1.10 |
| d6 | 7.59 | 3.04 | 0.50 |
| d10 | 2.92 | 5.65 | 10.01 |

The object-side surface S1 of the lens prism G1 and the image-side surface S4 of the positive lens G2, of the first lens group GR1, the object-side surface S5 of the negative meniscus-shaped single lens G3 of the second lens group GR2, both surfaces S7, S8 of the positive lens G4 and the image-side surface S10 of the negative lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 2 are shown in Table 38 along with cone constants K.

TABLE 38

| Si | K | A | B | C | D |
|---|---|---|---|---|---|
| 1 | 0 | 1.375E−03 | 1.819E−05 | −1.026E−06 | 3.149E−08 |
| 4 | 0 | 6.924E−04 | −1.330E−05 | 6.783E−06 | −3.354E−07 |
| 5 | 0 | 5.779E−04 | −2.706E−06 | 7.164E−06 | −9.649E−07 |
| 7 | 0 | −2.315E−03 | −1.005E−04 | −2.705E−05 | −7.607E−06 |
| 8 | 0 | 7.246E−03 | −8.240E−04 | −4.576E−06 | 0 |
| 10 | 0 | −4.549E−03 | 2.868E−04 | 2.083E−03 | −7.688E−04 |
| 12 | 0 | 9.774E−03 | 1.915E−04 | −9.031E−05 | 1.242E−05 |

Each of FIGS. 46 to 48 shows a spherical aberration, an astigmatic aberration, and a distortion aberration in the numeral example 2 which is in focus at infinity. FIG. 46 shows the aberrations at the wide-angle position, FIG. 47 shows the aberrations at the intermediate focal length, and FIG. 48 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 49:
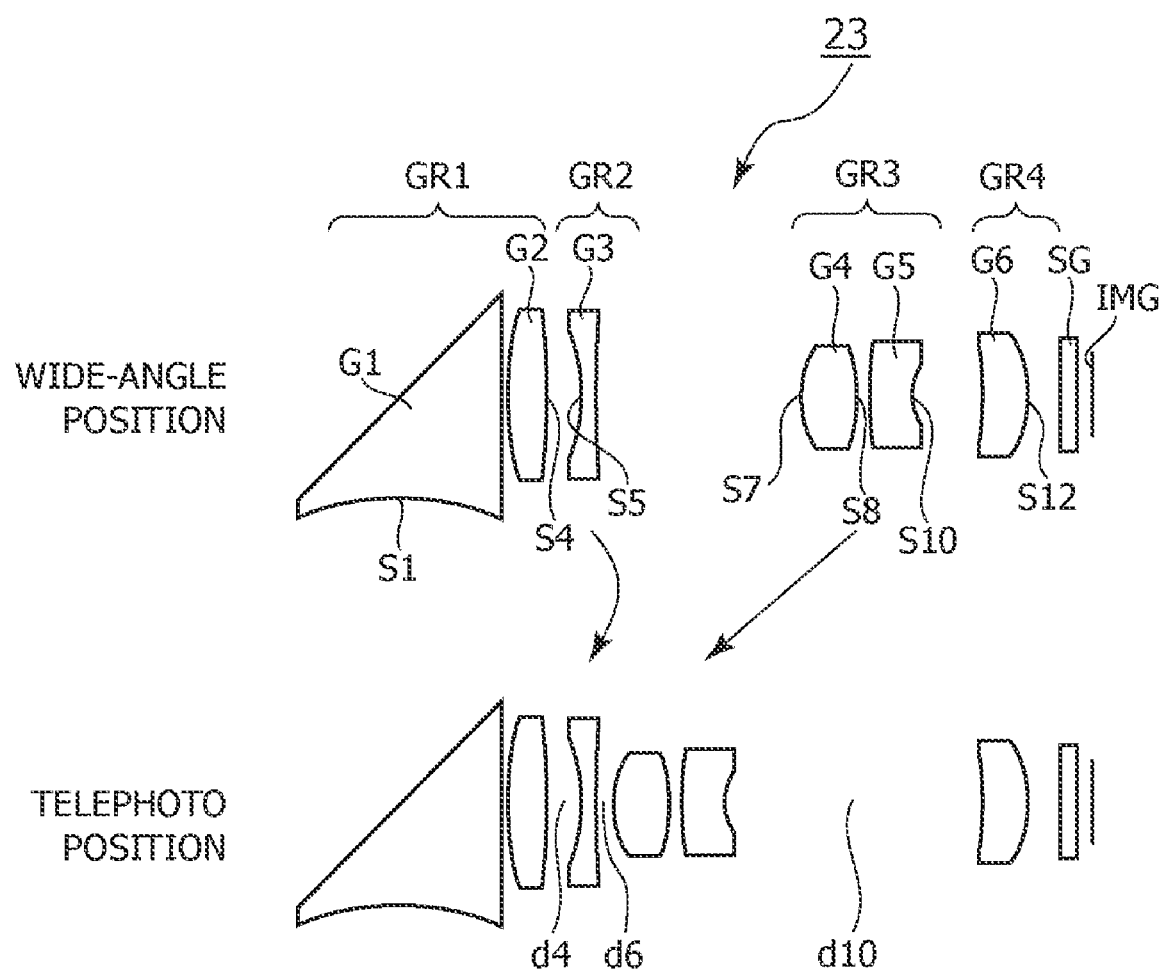
FIG. 49 is a diagram showing the lens construction of a third embodiment of the zoom lens according to the third invention.

FIG. 49 shows the lens construction of a third embodiment 23 of the zoom lens according to the second invention, with a wide-angle position state shown above and a telephoto position state shown below, and with moving loci along the optical axis shown with arrows in between.

A zoom lens 23 according to the third embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, and the third lens group GR3 moves monotonously toward the object side, to perform zooming.

The first lens group GR1 is composed by arranging, in the following order from the object side, a lens prism G1 having a negative refractive power, the object side of which is formed in an aspherical shape that faces the convex surface toward the object side, and a positive lens G2 having formed in a biconvex shape, the image-side surface of which is aspheric. The lens prism G1 and the positive lens G2 each are made of a resin material. The second lens group GR2 is composed of a negative single lens G3 formed in a biconcave shape, the object side surface of which is aspheric, and the negative single lens G3 is made of a resin material. The third lens group GR3 is composed by arranging, in the following order from the object side, a positive lens G4 formed in a biconvex shape, both surfaces of which is aspheric, and a negative meniscus lens G5 facing the convex shape toward the object side, the image-side surface of which is aspheric. The positive lens G4 and the negative meniscus lens G5 each are made of a glass material. The fourth lens group GR4 is composed of a a positive meniscus-shaped single lens G6 facing the concave surface toward the object side, the image side surface of which is aspheric. The positive meniscus-shaped single lens G6 is made of a resin material. It is noted that a seal glass SG is positioned between the fourth lens group GR4 and an image capture plane IMG.

Table 39 shows lens data of a numeral example 3 in which specific numeral values are applied to the zoom lens 23 according to the third embodiment.

TABLE 39

| Si | Ri | ASPHERICAL SURFACE | di | ni | vi |
|---|---|---|---|---|---|
| 1 | −7.565 | ASP | 6.50 | 1.607 | 27.0 |
| 2 | ∞ | | 0.20 | | |
| 3 | 10.113 | | 1.23 | 1.607 | 27.0 |
| 4 | −26.073 | ASP | variable | | |
| 5 | −5.600 | ASP | 0.50 | 1.530 | 55.8 |
| 6 | 31.040 | | variable | | |
| 7 | 2.929 | ASP | 1.79 | 1.583 | 59.5 |
| 8 | −4.572 | ASP | 0.40 | | |
| 9 | 10.744 | | 1.40 | 1.821 | 24.1 |
| 10 | 1.915 | ASP | variable | | |
| 11 | −12.918 | | 1.49 | 1.530 | 55.8 |
| 12 | −3.194 | ASP | 1.00 | | |
| 13 | ∞ | | 0.50 | 1.517 | 64.2 |
| 14 | ∞ | | 0.50 | | |
| 15 | IMG | | | | |

The distance d4 between the first lens group GR1 and the second lens group GR2, the distance d6 between the second lens group GR2 and the third lens group GR3, and the distance d10 between the third lens group GR3 and the fourth lens group GR4 vary during zooming from the wide-angle position to the telephoto position. Values of the respective distances d4, d6, and d10 in the numeral example 3 measured at the wide-angle position (f=4.11), at the intermediate focal length (f=6.93) between the wide-angle position and the telephoto position, and at the telephoto position (f=11.72) are shown in Table 40 along with focal lengths f, F-Numbers Fno, and angles of view 2ω.

TABLE 40

| | WIDE-ANGLE POSITION | INTERMEDIATE FOCAL LENGTH | TELEPHOTO POSITION |
|---|---|---|---|
| f | 4.11 | 6.93 | 11.72 |
| Fno | 2.85 | 3.72 | 5.54 |
| 2ω | 60.2 | 35.0 | 21.8 |
| d4 | 1.10 | 2.75 | 1.10 |
| d6 | 6.63 | 3.02 | 0.60 |
| d10 | 2.25 | 4.22 | 8.28 |

The object-side surface S1 of the lens prism G1 and the image-side surface S4 of the positive lens G2, of the first lens group GR1, the object-side surface S5 of the negative single lens G3 of the second lens group GR2, both surfaces S7, S8 of the positive lens G4 and the image-side surface S10 of the negative meniscus lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 3 are shown in Table 41 along with cone constants K.

TABLE 41

| Si | K | A | B | C | D |
|---|---|---|---|---|---|
| 1 | 0 | 1.110E−03 | −2.487E−06 | 1.419E−07 | 0 |
| 4 | 0 | 5.569E−04 | 2.232E−06 | 1.494E−06 | −5.968E−08 |
| 5 | 0 | 8.231E−04 | 8.251E−05 | −1.808E−05 | 7.477E−07 |
| 7 | 0 | −2.222E−03 | 2.113E−04 | −2.060E−05 | 3.938E−05 |
| 8 | 0 | 1.892E−02 | −2.412E−03 | 7.053E−04 | 0 |
| 10 | 0 | −2.014E−02 | 5.164E−03 | −1.905E−03 | 1.342E−04 |
| 12 | 0 | 9.603E−03 | −6.825E−04 | 4.693E−05 | 3.043E−06 |

Figure 50:
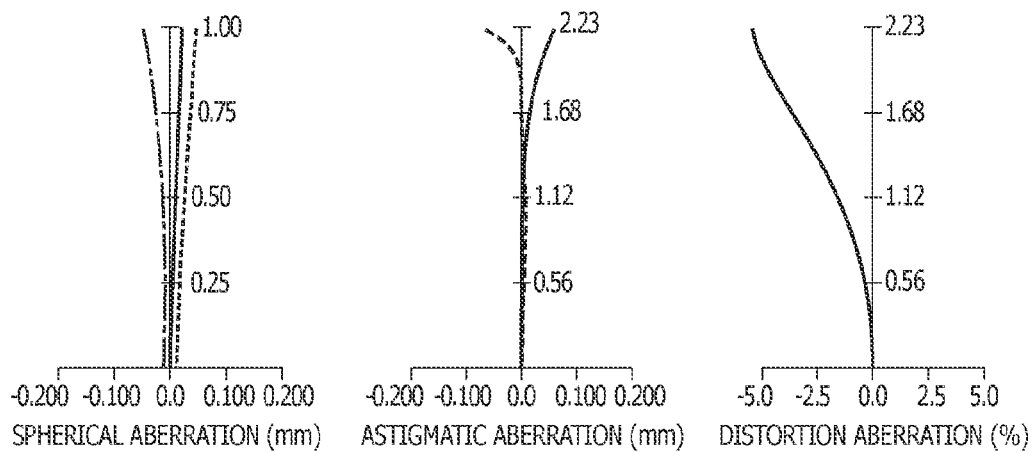
FIG. 50 is a graph showing, along with FIGS. 51 and 52, aberrations of a numeral example 3 obtained by applying specific numerical values to the third embodiment, FIG. 50 showing a spherical aberration, an astigmatic aberration, and a distortion aberration at the wide-angle position.
Figure 51:
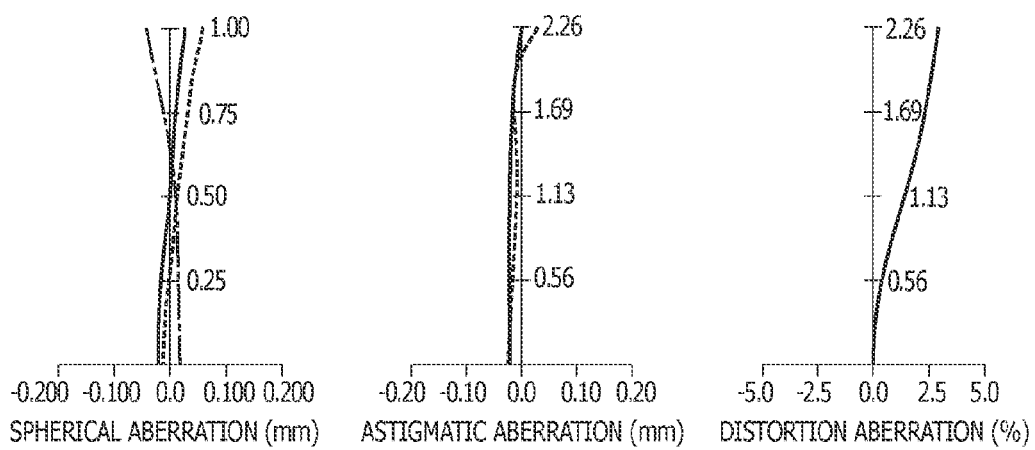
FIG. 51 is a graph showing a spherical aberration, an astigmatic aberration, and a distortion aberration at the intermediate focal length.
Figure 52:
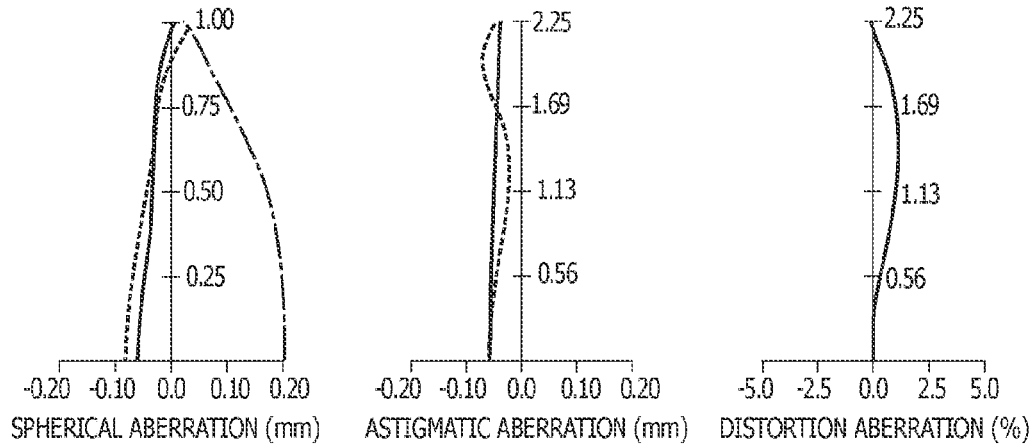
FIG. 52 is a graph showing a spherical aberration, an astigmatic aberration, and a distortion aberration at the telephoto position.

Each of FIGS. 50 to 52 shows a spherical aberration, an astigmatic aberration, and a distortion aberration in the numeral example 3 which is in focus at infinity. FIG. 50 shows the aberrations at the wide-angle position, FIG. 51 shows the aberrations at the intermediate focal length, and FIG. 52 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Values corresponding to the conditional formulae (1) to (6) of the respective numeral examples 1 to 3 are shown in Table 42.

TABLE 42

| | CONDITIONAL FORMULA | Example 1 | Example 2 | Example 3 |
|---|---|---|---|---|
| (1) | t2/fw | 0.12 | 0.12 | 0.12 |
| (2) | f2/fw | −3.04 | −3.77 | −2.17 |
| (3) | f12/fw | 2.71 | 3.25 | 2.96 |
| (4) | f12/f2 | −0.89 | −0.86 | −1.36 |
| (5) | νd31 − νd32 | 35.40 | 25.27 | 35.40 |
| (6) | β3W · β3T | 0.991 | 0.989 | 0.986 |

It is understood that the numeral examples 1 to 3 all satisfy the conditional formulae (1) to (6) even with simple constructions, and that, as shown in Tables 33 to 41 and the respective aberration graphs, the zoom lenses are composed small in structure and have a good optical performance for the imaging device having a large number of pixels.

A zoom lens according to a fourth invention in the present invention will be described next.

The zoom lens according to the fourth invention in the present invention is composed by arranging, in the following order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group. The first lens group is composed by arranging, in the following order from the object side, a lens prism having a negative refractive power for folding an optical path, and a single lens having a positive refractive power. The second lens group is composed of one single lens having a negative refractive power, and satisfies the following conditional formula (1):

$$t2/fw < 0.4 \quad (1)$$

where t2 represents the center thickness of the single lens having a negative refractive power constituting the second lens group, and fw represents the focal length of the whole lens system at the wide-angle position.

As thus constructed, the zoom lens according to the fourth invention in the present invention has good optical performance for imaging device having a large number of pixels even with its simple construction, and can also be composed small and thin in structure.

Namely, by constituting the first lens group by arranging the lens prism having a negative refractive power for folding the optical path, and the single lens having a positive refractive power, in order from the object side, a direction in which the second lens group, the third lens group, and the fourth lens group are moved for zooming equals an optical-axis direction of the single lens having a positive refractive power of the first lens group, so that the thickness is reduced in a direction of an incident light axis. In addition, by providing a negative refractive power to the prism for folding the optical path, a further thickness reduction is achieved.

Furthermore, by constituting the second lens group of the one single lens having a negative refractive power and by setting the second lens group so as to satisfy the conditional formula (1), a miniaturization of the total length and good optical performance are realized.

The conditional formula (1) is intended to define a ratio of the center thickness of the single lens having a negative refractive power constituting the second lens group to the focal length of the whole lens system at the wide-angle position, and limits the thickness of the single lens having a negative refractive power constituting the second lens group. In the event of outside the value specified in the conditional formula (1), the total length of the second lens group in the optical-axis direction increases, making it difficult to miniaturize the total length of the whole lens system. It becomes also difficult to correct a positive curvature of field.

In a zoom lens according to an embodiment of the fourth invention, at least, the single lens having a negative refractive power constituting the second lens group is made of a resin material, and is desired to satisfy the following conditional formula (2):

$$f2/fw < -2.0 \qquad (2)$$

where f2 represents the focal length of the single lens having a negative refractive power constituting the second lens group.

As a result, it is possible to realize the ensuring of optical performance and a reduction of the manufacturing cost.

The conditional formula (2) is intended to define a ratio of the focal length of the single lens having a negative refractive power constituting the second lens group to the focal length of the whole lens system at the wide-angle position, and limits the refractive power of the single lens having a negative refractive power constituting the second lens group. In the event of outside the value specified in the conditional formula (2), the refractive power of the lens made of the resin material increases, making it difficult to ensure a good optical performance using the resin material which exhibits relatively large variations in optical properties (refractive index or Abbe number).

In the zoom lens according to an embodiment of the fourth invention, at least the single lens having a positive refractive power constituting the first lens group is made of a resin material, and is desired to satisfy the following conditional formula (3):

$$f12/fw > 2.0 \qquad (3)$$

where f12 represents the focal length of the single lens having a positive refractive power constituting the first lens group.

As a result, it is possible to realize the ensuring of optical performance and a reduction of the manufacturing cost.

The conditional formula (3) is intended to define a ratio of the focal length of the single lens having a positive refractive power constituting the first lens group to the focal length of the whole lens system at the wide-angle position, and limits the refractive power of the single lens having a positive refractive power constituting the first lens group. In the event of outside the value specified in the conditional formula (3), the refractive power of the lens made of the resin material increases, making it difficult to ensure good optical performance using the resin material which exhibits relatively large variations in optical properties (refractive index and Abbe number).

In the zoom lens according to an embodiment of the fourth invention, in a case where the single lens having a positive refractive power constituting the first lens group and the single lens having a negative refractive power constituting the second lens group are made of the resin materials, it is desirable to satisfy the following conditional formula (4):

$$-2.0 \leq f12/f2 \leq -0.5. \qquad (4)$$

As a result, fluctuations in optical characteristics with temperature change can be reduced.

The conditional formula (4) is intended to set a ratio of the focal length of the single lens having a positive refractive power constituting the first lens group to the focal length of the single lens having a negative refractive power constituting the second lens group, and limits the balance of refractive power. In the event of outside the values specified in the conditional formula (4), the balance of aberration correction during temperature change breaks to degrade the optical performance, making it difficult to maintain a good optical performance for the imaging device having a large number of pixels.

In the zoom lens according to an embodiment of the fourth invention, the third lens group is composed by arranging, in the following order from the object side, a single lens having a positive refractive power and a single lens having a negative refractive power, and is desired to satisfy the following conditional formula (5):

$$vd31 - vd32 > 20 \qquad (5)$$

where vd31 represents the Abbe number, relative to d-line, of the single lens having a positive refractive power constituting the third lens group, and vd32 represents the Abbe number, relative to d-line, of the single lens having a negative refractive power constituting the third lens group.

First, by constituting the third lens group of the two single lenses, i.e., the single lens having a positive refractive power and the single lens having a negative refractive power, arranged in order from the object side, the number of lenses can be reduced, thereby compatibly realizing a miniaturization and a reduction of the manufacturing cost. In addition, by causing the third lens group to satisfy the conditional formula (5), a zoom lens is provided which has a good optical performance for the imaging device having a large number of pixels.

The conditional formula (5) is intended to set a difference between the Abbe number, relative to d-line, of the single lens having a positive refractive power constituting the third lens group and the Abbe number, relative to d-line, of the single lens having a negative refractive power constituting the third lens group, and is a condition for satisfactorily correcting chromatic aberrations occurring in the third lens group. In the event outside the value specified in the conditional formula (5), it becomes difficult to correct the chromatic aberrations.

In the zoom lens according to an embodiment of the fourth invention, a lens cell on an incident light surface side of the single lens having a positive refractive power constituting the third lens group also serves as an aperture stop, so that it is possible to reduce the number of parts for the aperture stop and to shorten the total length. It is noted that the aperture stop may otherwise be disposed separately ahead of or inside the third lens group.

In the zoom lens according to an embodiment of the fourth invention, by moving the second lens group or the fourth lens group in the optical-axis direction, it is possible to focus on an object at a short distance.

In the zoom lens according to an embodiment of the fourth invention, by moving a part or the whole of the lens groups in a direction not parallel to the optical axis, an image on an image plane can be moved. By using this effect, optical correction of camera shaking can also be realized.

Specific embodiments of the zoom lens according to the fourth invention in the present invention, and numeral examples obtained by applying specific numerical values to these embodiments will be described next with reference to the drawings and tables.

Figure 53:
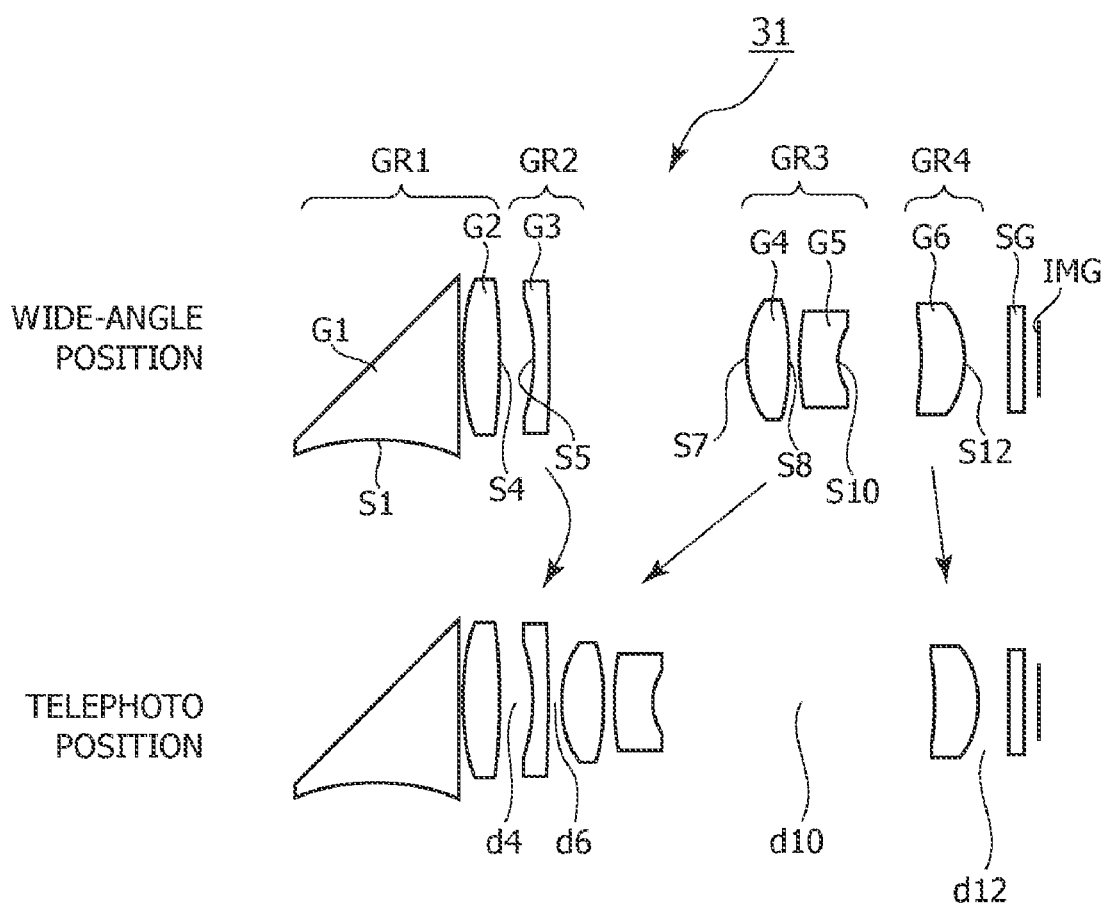
FIG. 53 is a diagram showing the lens construction of a first embodiment of a zoom lens according to a fourth invention in the present invention.

FIG. 53 shows the lens construction of a first embodiment 31 of the zoom lens according to the fourth invention, with a maximum wide-angle position shown above and a maximum telephoto position shown below, and with moving loci along the optical axis shown with arrows in between.

A zoom lens 31 according to the first embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward an image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a lens prism G1 having a negative refractive power, the object side surface of which is formed in an aspherical shape that faces the concave surface toward the object side, and a positive lens G2 formed in a biconvex shape, the image-side surface of which is aspheric. The lens prism G1 is made of a glass material, and the positive lens G2 is made of a resin material. The second lens group GR2 is composed of a negative meniscus-shaped single lens G3 facing the convex surface toward the image-side, the object side surface of which is aspheric, and the negative meniscus-shaped single lens G3 is made of a resin material. The third lens group GR3 is composed by arranging, in the following order from the object side, a positive lens G4 having a biconvex shape, both surfaces of which are aspheric, and a negative meniscus lens G5 facing the convex surface toward the object side, the image-side surface of which is aspheric. The positive lens G4 and the negative meniscus lens G5 each are made of a glass material. The fourth lens group GR4 is composed of a a positive meniscus-shaped single lens G6 facing the concave surface toward the object side, the image side surface of which is aspheric. The positive meniscus-shaped single lens G6 is made of a resin material. It is noted that a seal glass SG is positioned between the fourth lens group GR4 and an image capture plane IMG.

Table 43 shows lens data of a numeral example 1 in which specific numerical values are applied to the zoom lens 31 according to the first embodiment.

TABLE 43

| Si | Ri | ASPHERICAL SURFACE | di | ni | vi |
|---|---|---|---|---|---|
| 1 | −6.375 | ASP | 5.70 | 1.834 | 37.3 |
| 2 | ∞ | | 0.20 | | |
| 3 | 10.751 | | 1.30 | 1.583 | 30.0 |
| 4 | −14.899 | ASP | variable | | |
| 5 | −6.014 | ASP | 0.50 | 1.530 | 55.8 |
| 6 | −80.168 | | variable | | |
| 7 | 3.309 | ASP | 1.50 | 1.583 | 59.5 |
| 8 | −5.511 | ASP | 0.40 | | |
| 9 | 8.413 | | 1.40 | 1.821 | 24.1 |

TABLE 43-continued

| Si | Ri | ASPHERICAL SURFACE | di | ni | vi |
|---|---|---|---|---|---|
| 10 | 2.153 | ASP | variable | | |
| 11 | −7.699 | | 1.47 | 1.530 | 55.8 |
| 12 | −2.972 | ASP | variable | | |
| 13 | ∞ | | 0.50 | 1.517 | 64.2 |
| 14 | ∞ | | 0.50 | | |
| 15 | IMG | | | | |

The distance d4 between the first lens group GR1 and the second lens group GR2, the distance d6 between the second lens group GR2 and the third lens group GR3, the distance d10 between the third lens group GR3 and the fourth lens group GR4, and the distance d12 between the fourth lens group GR4 and the seal glass SG vary during zooming from the wide-angle position to the telephoto position. Values of the respective distances d4, d6, d10, and d12 in the numeral example 1 at the wide-angle position (f=4.00), at the intermediate focal length (f=6.76) between the wide-angle position and the telephoto position, and at the telephoto position (f=11.43) are shown in Table 44 along with focal lengths f, F-Numbers Fno, and angles of view 2ω.

TABLE 44

| | WIDE-ANGLE POSITION | INTERMEDIATE FOCAL LENGTH | TELEPHOTO POSITION |
|---|---|---|---|
| f | 4.00 | 6.76 | 11.43 |
| Fno | 2.87 | 3.88 | 5.60 |
| 2ω | 61.4 | 35.8 | 21.9 |
| d4 | 1.20 | 2.71 | 1.20 |
| d6 | 7.07 | 3.01 | 0.50 |
| d10 | 2.91 | 5.69 | 10.03 |
| d12 | 1.65 | 1.42 | 1.10 |

The object-side surface S1 of the lens prism G1 and the image-side surface S4 of the positive lens G2, of the first lens group GR1, the object-side surface S5 of the negative meniscus-shaped single lens G3 of the second lens group GR2, both surfaces S7, S8 of the positive lens G4 and the image-side surface S10 of the negative meniscus lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 1 are shown in Table 45 along with cone constants K.

TABLE 45

| Si | K | A | B | C | D |
|---|---|---|---|---|---|
| 1 | 0 | 1.591E−03 | 2.435E−05 | −2.102E−06 | 6.452E−08 |
| 4 | 0 | 1.004E−03 | −2.383E−05 | 6.268E−06 | −3.380E−07 |
| 5 | 0 | 6.955E−04 | −3.026E−05 | 1.231E−05 | −1.212E−06 |
| 7 | 0 | −3.196E−03 | −2.774E−05 | −7.875E−05 | 5.035E−06 |
| 8 | 0 | 8.604E−03 | −1.117E−03 | 7.686E−05 | 0 |
| 10 | 0 | −8.872E−03 | 1.420E−03 | 4.231E−04 | −3.738E−04 |
| 12 | 0 | 8.084E−03 | 5.831E−04 | −1.224E−04 | 1.494E−05 |

Figure 54:
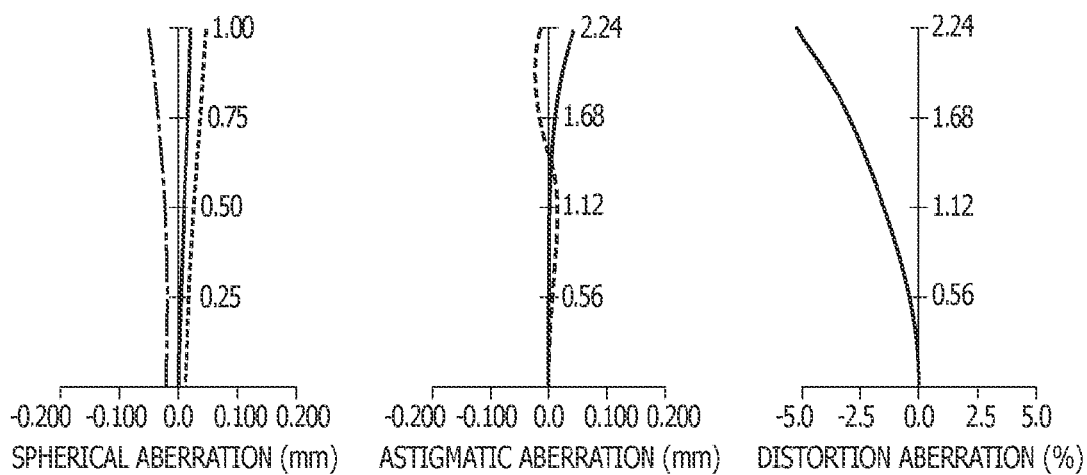
FIG. 54 is a graph showing, along with FIGS. 55 and 56, aberrations of a numeral example 1 obtained by applying specific numerical values to the first embodiment, FIG. 54 showing a spherical aberration, an astigmatic aberration, and a distortion aberration at the wide-angle position.
Figure 55:
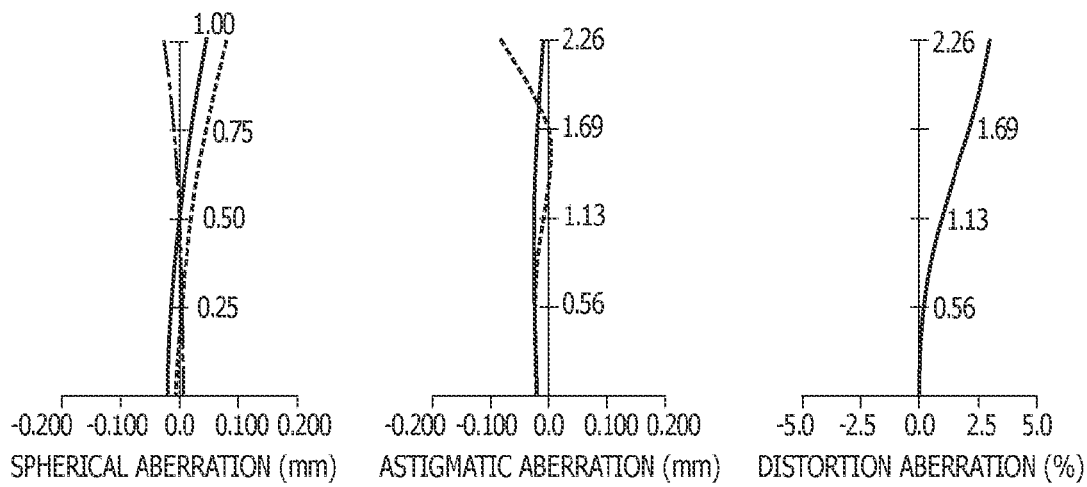
FIG. 55 is a graph showing a spherical aberration, an astigmatic aberration, and a distortion aberration at the intermediate focal length.
Figure 56:
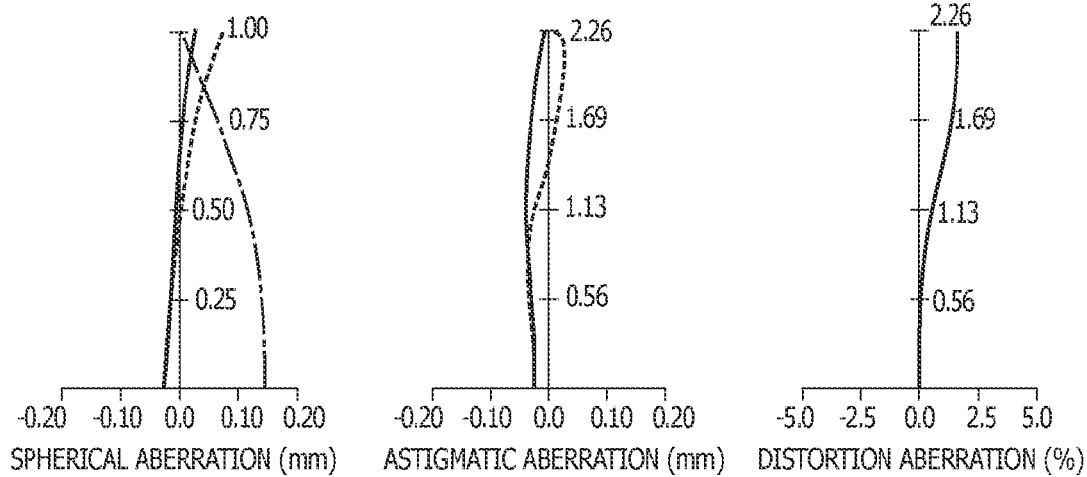
FIG. 56 is a graph showing a spherical aberration, an astigmatic aberration, and a distortion aberration at the telephoto position.

Each of FIGS. 54 to 56 shows a spherical aberration, an astigmatic aberration, and a distortion aberration in the numeral example 1 which is in focus at infinity. FIG. 54 shows the aberrations measured at the wide-angle position, FIG. 55 shows the aberrations measured at the intermediate focal length, and FIG. 56 shows the aberrations measured at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 57:
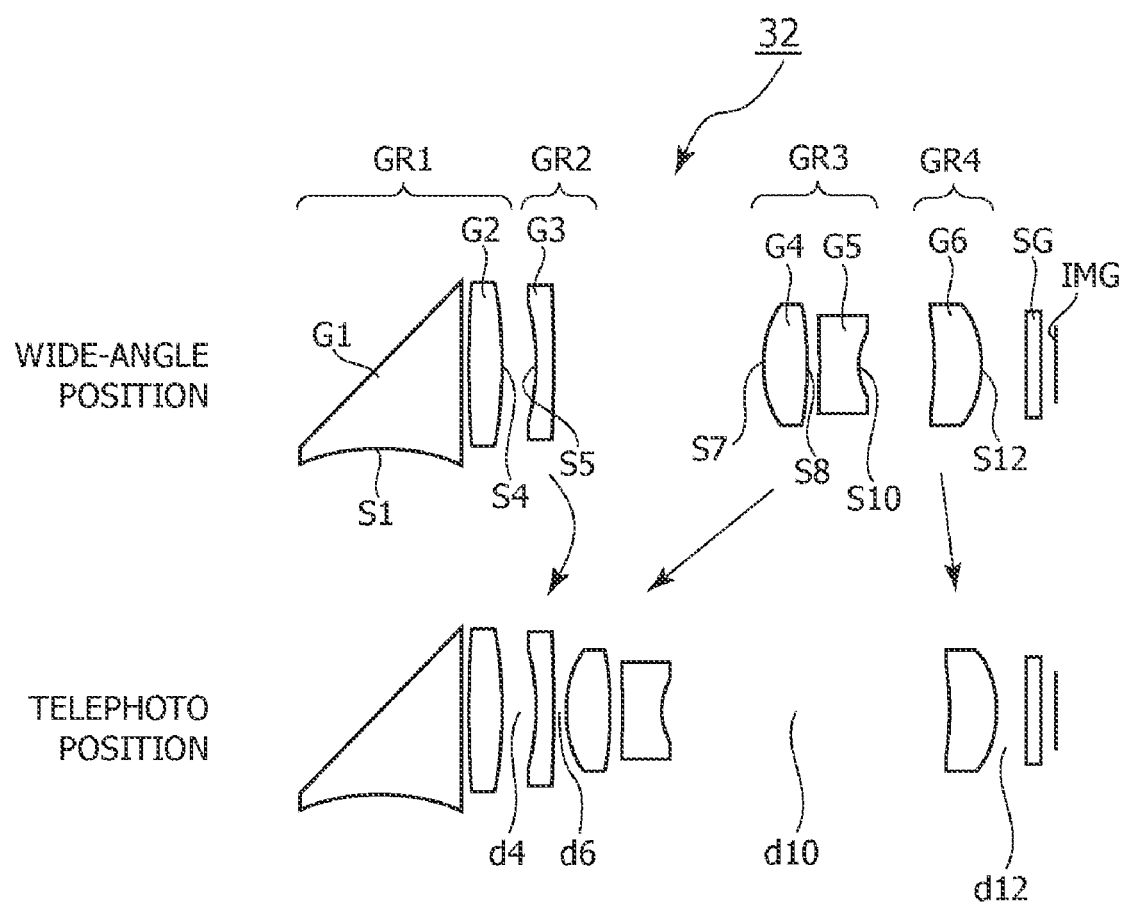
FIG. 57 is a diagram showing the lens construction of a second embodiment of the zoom lens according to the fourth invention.

FIG. 57 shows the lens construction of a second embodiment 32 of the zoom lens according to the fourth invention, with a maximum wide-angle state shown above and a maximum telephoto state shown below, and with moving loci along the optical axis shown with arrows in between.

A zoom lens 32 according to the second embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a lens prism G1 having a negative refractive power, the object side surface of which is formed in an aspherical shape that faces the concave surface toward the object side, and a positive lens G2 formed in a biconvex shape, the image-side surface of which is aspheric. The lens prism G1 is made of a glass material, and the positive lens G2 is made of a resin material. The second lens group GR2 is composed of a a negative meniscus-shaped single lens G3 facing the convex surface toward the image-side, the object side surface of which is aspheric, and the negative meniscus-shaped single lens G3 is made of a resin material. The third lens group GR3 is composed by arranging, in the following order from the object side, a positive lens G4 formed in a biconvex shape, both surfaces of which are aspheric, and a negative meniscus lens G5 facing a convex surface toward object side, the image-side surface of which is aspheric. The positive lens G4 and the negative meniscus-shaped single lens G3 each are made of a glass material. The fourth lens group GR4 is composed of a single lens G6 formed in a positive meniscus shaped facing the concave surface toward the object side, the image side surface of which is aspheric. The positive meniscus-shaped single lens G6 is made of a resin material. It is noted that a seal glass SG is positioned between the fourth lens group GR4 and an image capture plane IMG.

Table 46 shows lens data of a numeral example 2 in which specific numeral values are applied to the zoom lens 32 according to the second embodiment.

TABLE 46

| Si | Ri | ASPHERICAL SURFACE | di | ni | vi |
|---|---|---|---|---|---|
| 1 | −6.936 | ASP | 5.70 | 1.834 | 37.3 |
| 2 | ∞ |  | 0.20 |  |  |
| 3 | 24.198 |  | 1.25 | 1.583 | 30.0 |
| 4 | −10.741 | ASP | variable |  |  |
| 5 | −7.530 | ASP | 0.50 | 1.530 | 55.8 |
| 6 | −92.513 |  | variable |  |  |
| 7 | 3.452 | ASP | 1.60 | 1.743 | 49.3 |
| 8 | −6.674 | ASP | 0.38 |  |  |
| 9 | 97.096 |  | 1.40 | 1.821 | 24.1 |

TABLE 46-continued

| Si | Ri | ASPHERICAL SURFACE | di | ni | vi |
|---|---|---|---|---|---|
| 10 | 2.247 | ASP | variable |  |  |
| 11 | −17.293 |  | 1.64 | 1.530 | 55.8 |
| 12 | −3.147 | ASP | variable |  |  |
| 13 | ∞ |  | 0.50 | 1.517 | 64.2 |
| 14 | ∞ |  | 0.50 |  |  |
| 15 | IMG |  |  |  |  |

The distance d4 between the first lens group GR1 and the second lens group GR2, the distance d6 between the second lens group GR2 and the third lens group GR3, the distance d10 between the third lens group GR3 and the fourth lens group GR4, and the distance d12 between the fourth lens group GR4 and the seal glass SG vary during zooming from the wide-angle position to the telephoto position. Values of the respective distances d4, d6, d10, and d12 in the numeral example 2 at the wide-angle position (f=4.01), at the intermediate focal length (f=6.76) between the wide-angle position and the telephoto position, and at the telephoto position (f=11.43) are shown in Table 47 along with focal lengths f, F-Numbers Fno, and angles of view 2ω.

TABLE 47

|  | WIDE-ANGLE POSITION | INTERMEDIATE FOCAL LENGTH | TELEPHOTO POSITION |
|---|---|---|---|
| f | 4.01 | 6.76 | 11.43 |
| Fno | 2.86 | 3.97 | 5.69 |
| 2ω | 61.4 | 35.8 | 21.8 |
| d4 | 1.20 | 2.65 | 1.20 |
| d6 | 7.40 | 3.19 | 0.50 |
| d10 | 2.60 | 5.67 | 10.03 |
| d12 | 1.63 | 1.32 | 1.10 |

The object-side surface S1 of the lens prism G1 and the image-side surface S4 of the positive lens G2, of the first lens group GR1, the object-side surface S5 of the negative meniscus-shaped single lens G3 of the second lens group GR2, both surfaces S7, S8 of the positive lens G4 and the image-side surface S10 of the negative meniscus lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 1 are shown in Table 48 along with cone constants K.

TABLE 48

| Si | K | A | B | C | D |
|---|---|---|---|---|---|
| 1 | 0 | 8.682E−04 | 3.877E−05 | −2.590E−06 | 7.857E−08 |
| 4 | 0 | 5.137E−04 | −8.325E−06 | 5.725E−06 | −2.963E−07 |
| 5 | 0 | 5.465E−04 | −4.948E−05 | 1.700E−05 | −1.474E−06 |
| 7 | 0 | −2.209E−03 | −8.327E−05 | −4.006E−05 | −4.903E−06 |
| 8 | 0 | 6.770E−03 | −8.545E−04 | 1.082E−05 | 0 |
| 10 | 0 | −5.877E−03 | 7.520E−04 | 1.198E−03 | −4.978E−04 |
| 12 | 0 | 8.163E−03 | 4.527E−04 | −1.015E−04 | 1.039E−05 |

Figure 58:
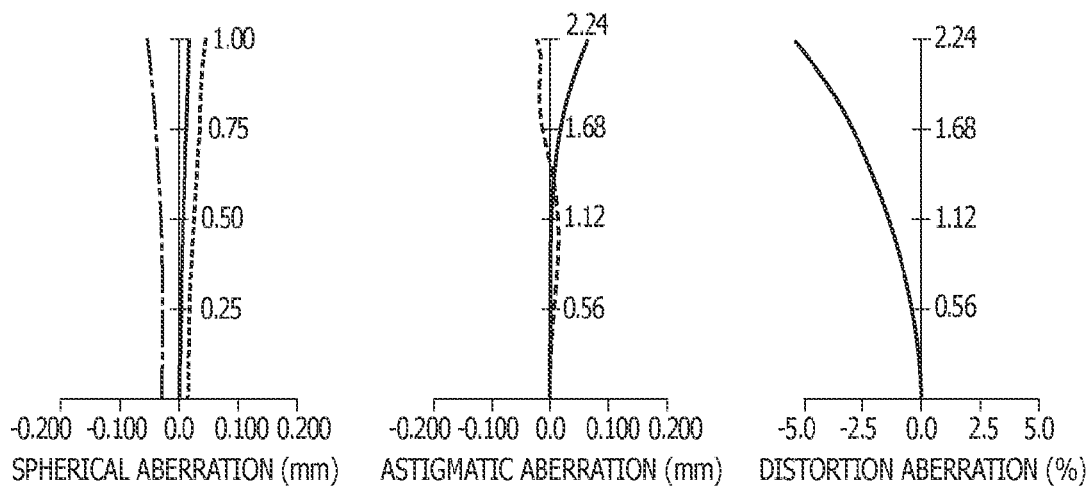
FIG. 58 is a graph showing, along with FIGS. 59 and 60, aberrations of a numeral example 2 obtained by applying specific numerical values to the second embodiment, FIG. 58 showing a spherical aberration, an astigmatic aberration, and a distortion aberration at the wide-angle position.
Figure 59:
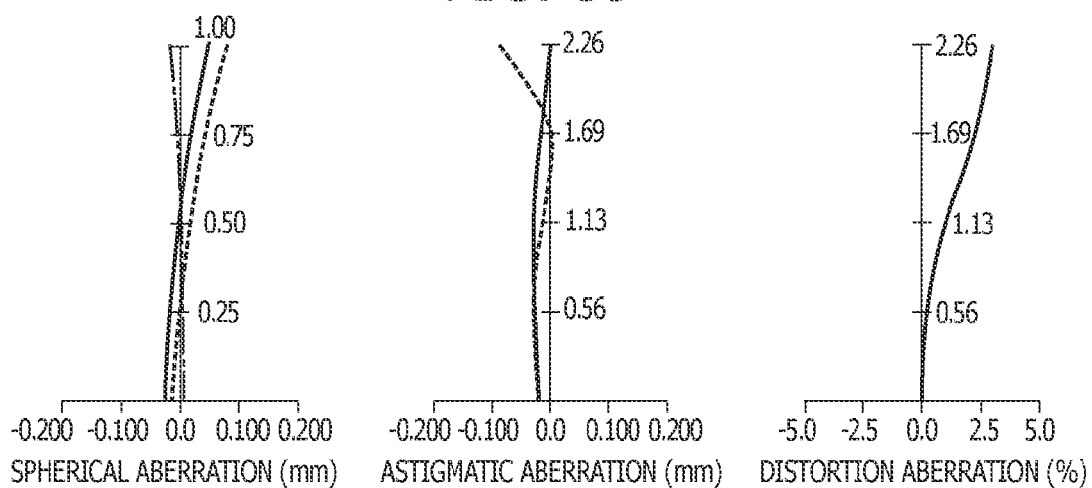
FIG. 59 is a graph showing a spherical aberration, an astigmatic aberration, and a distortion aberration at the intermediate focal length.
Figure 60:
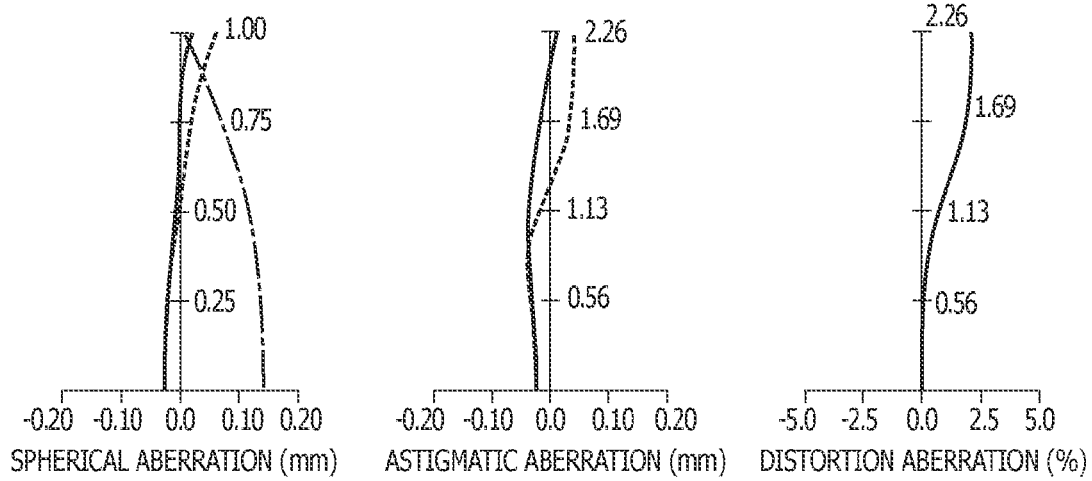
FIG. 60 is a graph showing a spherical aberration, an astigmatic aberration, and a distortion aberration at the telephoto position.

Each of FIGS. 58 to 60 shows a spherical aberration, an astigmatic aberration, and a distortion aberration in the numeral example 2 which is in focus at infinity. FIG. 58 shows the aberrations at the wide-angle position, FIG. 59 shows the aberrations at the intermediate focal length, and FIG. 60 shows the aberrations at the telephoto position. It is noted that in each of the spherical-aberration graphs, a solid line represents a spherical aberration at d-line, a dashed line represents a spherical aberration at C-line, and an alternate-long-and-short-dashed line represents a spherical aberration at g-line. In each of the astigmatic aberration graphs, a solid line represents a sagittal image plane and a dashed line represents a meridional image plane.

Figure 61:
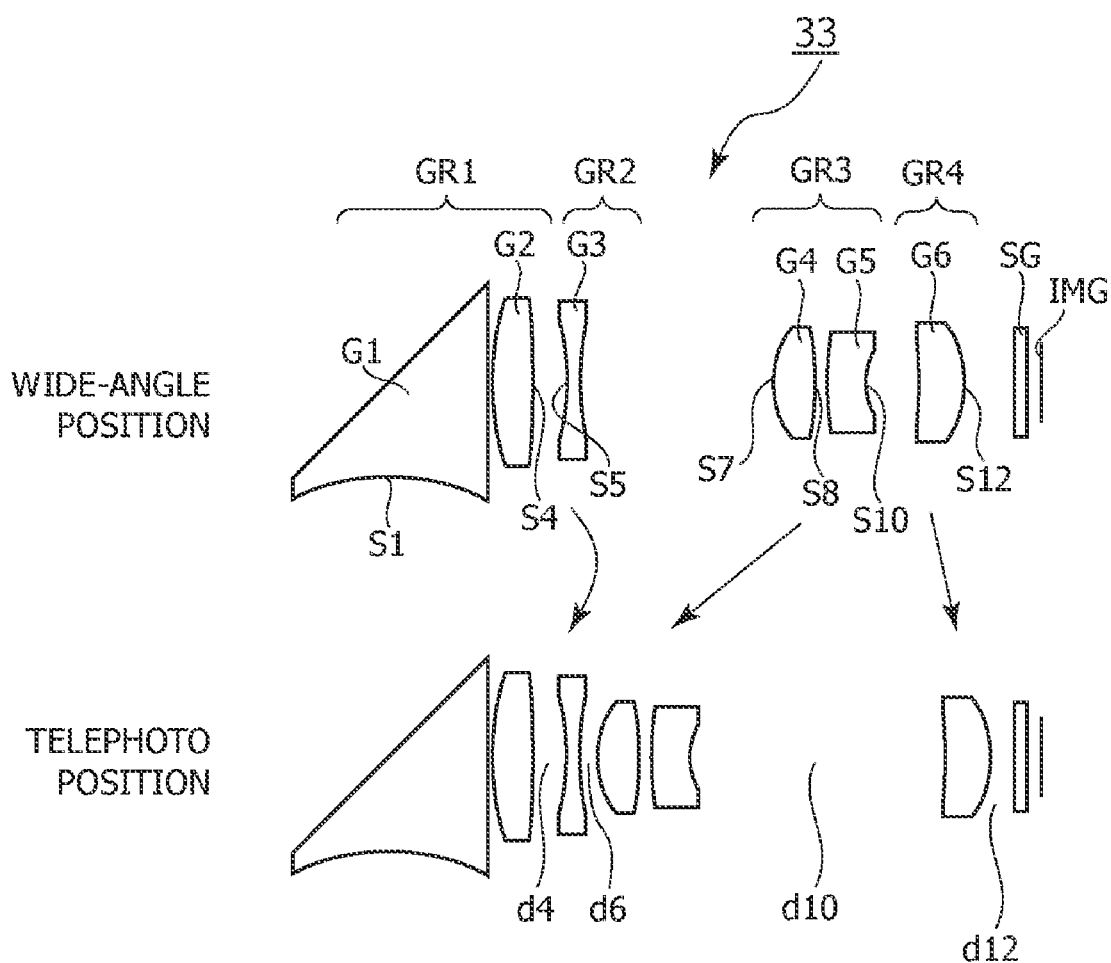
FIG. 61 is a diagram showing the lens construction of a third embodiment of the zoom lens according to the fourth invention.

FIG. 61 shows the lens construction of a third embodiment 33 of the zoom lens according to the fourth invention, with a maximum wide-angle state shown above and a maximum telephoto state shown below, and with moving loci along the optical axis shown with arrows in between.

A zoom lens 33 according to the third embodiment is composed by arranging, in the following order from the object side, a first lens group GR1 having a weak positive refractive power, a second lens group GR2 having a negative refractive power, a third lens group GR3 having a positive refractive power, and a fourth lens group GR4 having a positive refractive power. During zooming from the wide-angle position to the telephoto position, it is configured such that the second lens group GR2 moves toward the image side while depicting a convex locus, the third lens group GR3 moves monotonously toward the object side, and the fourth lens group GR4 moves monotonously toward the image side, to perform zooming.

The first lens group GR1 is composed by arranging, in the following order from the object side, a lens prism G1 having a negative refractive power, the object side surface of which is formed in an aspherical shape that faces the concave surface toward the object side, and a positive lens G2 formed in a biconvex shape, the image-side surface of which is aspheric. The lens prism G1 and the positive lens G2 each are made of a resin material. The second lens group GR2 is composed of a negative single lens G3 formed in a biconcave shape, the object-side surface of which is aspheric, and the negative single lens G3 is made of a resin material. The third lens group GR3 is composed by arranging, in the following order from the object side, a positive lens G4 formed in a biconvex shape, both surfaces of which are aspheric, and a negative meniscus lens G5 facing a convex surface toward the object side, the image-side surface of which is aspheric. The positive lens G4 and the negative meniscus lens G5 each are made of a glass material. The fourth lens group GR4 is composed of a a positive meniscus-shaped single lens G6 facing the concave surface toward the object side, the image side surface of which is aspheric. The positive meniscus-shaped single lens G6 is made of a resin material. It is noted that a seal glass SG is positioned between the fourth lens group GR4 and an image capture plane IMG.

Table 49 shows lens data of a numeral example 3 in which specific numeral values are applied to the zoom lens 33 according to the third embodiment.

TABLE 49

| Si | Ri | ASPHERICAL SURFACE | di | ni | vi |
|---|---|---|---|---|---|
| 1 | −7.593 | ASP | 6.60 | 1.607 | 27.0 |
| 2 | ∞ | | 0.20 | | |
| 3 | 10.709 | | 1.36 | 1.607 | 27.0 |
| 4 | −20.138 | ASP | variable | | |
| 5 | −8.544 | ASP | 0.50 | 1.530 | 55.8 |
| 6 | 12.851 | | variable | | |
| 7 | 2.942 | ASP | 1.40 | 1.583 | 59.5 |
| 8 | −5.284 | ASP | 0.40 | | |
| 9 | 8.138 | | 1.32 | 1.821 | 24.1 |
| 10 | 1.853 | ASP | variable | | |
| 11 | −27.494 | | 1.51 | 1.530 | 55.8 |
| 12 | −3.489 | ASP | variable | | |

TABLE 49-continued

| Si | Ri | ASPHERICAL SURFACE | di | ni | vi |
|---|---|---|---|---|---|
| 13 | ∞ | | 0.50 | 1.517 | 64.2 |
| 14 | ∞ | | 0.50 | | |
| 15 | IMG | | | | |

The distance d4 between the first lens group GR1 and the second lens group GR2, the distance d6 between the second lens group GR2 and the third lens group GR3, the distance d10 between the third lens group GR3 and the fourth lens group GR4, and the distance d12 between the fourth lens group GR4 and the seal glass SG vary during zooming from the wide-angle position to the telephoto position. Values of the respective distances d4, d6, d10, and d12 in the numeral example 3 at the wide-angle position (f=4.11), at the intermediate focal length (f=6.93) between the wide-angle position and the telephoto position, and at the telephoto position (f=11.72) are shown in Table 50 along with focal lengths f, F-Numbers Fno, and angles of view 2ω.

TABLE 50

| | WIDE-ANGLE POSITION | INTERMEDIATE FOCAL LENGTH | TELEPHOTO POSITION |
|---|---|---|---|
| f | 4.11 | 6.93 | 11.72 |
| Fno | 2.86 | 3.84 | 5.76 |
| 2ω | 60.2 | 35.0 | 21.7 |
| d4 | 1.10 | 2.37 | 1.10 |
| d6 | 6.60 | 3.11 | 0.60 |
| d19 | 1.80 | 4.43 | 8.70 |
| d12 | 1.70 | 1.28 | 0.80 |

The object-side surface S1 of the lens prism G1 and the image-side surface S4 of the positive lens G2, of the first lens group GR1, the object-side surface S5 of the negative single lens G3 of the second lens group GR2, both surfaces S7, S8 of the positive lens G4 and the image-side surface S10 of the negative meniscus lens G5, of the third lens group GR3, and the image-side surface S12 of the positive meniscus-shaped single lens G6 of the fourth lens group GR4 are formed of aspherical surfaces. The 4th-, 6th-, 8th-, and 10th-order aspherical coefficients A, B, C, and D of these surfaces in the numeral example 1 are shown in Table 51 along with cone constants K.

TABLE 51

| Si | K | A | B | C | D |
|---|---|---|---|---|---|
| 1 | 0 | 8.363E−04 | 3.453E−07 | 7.367E−08 | 0 |
| 4 | 0 | 5.488E−04 | −3.692E−05 | 7.064E−06 | −3.573E−07 |
| 5 | 0 | 8.772E−04 | −5.950E−05 | 1.730E−05 | −1.696E−06 |
| 7 | 0 | −2.744E−03 | 3.004E−04 | −6.634E−05 | 6.312E−05 |
| 8 | 0 | 1.534E−02 | −2.012E−03 | 6.211E−04 | 0 |
| 10 | 0 | −1.993E−02 | 2.943E−03 | −1.475E−03 | 4.886E−05 |
| 12 | 0 | 6.813E−03 | 7.423E−05 | −5.449E−05 | 5.454E−06 |

Figure 62:
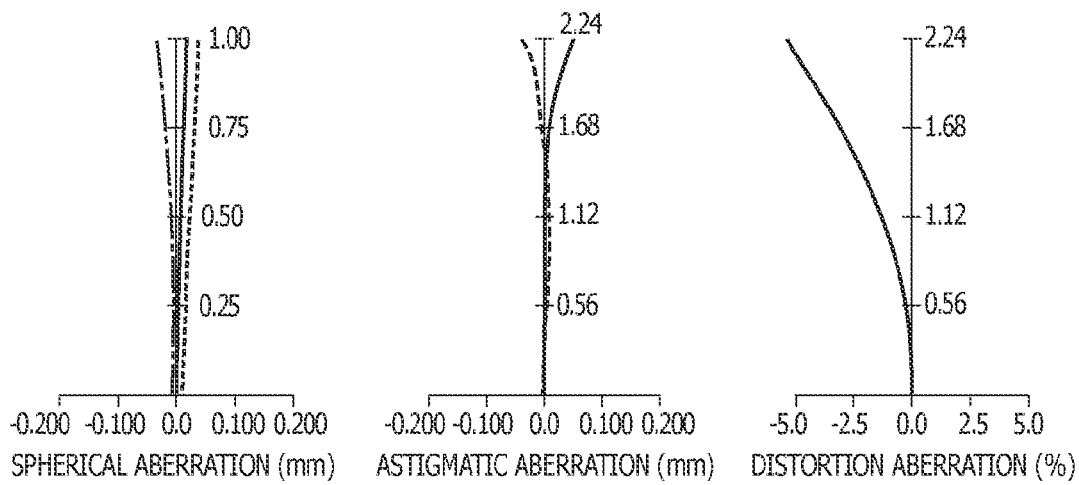
FIG. 62 is a graph showing, along with FIGS. 63 and 64, aberrations of a numeral example 3 obtained by applying specific numerical values to the third embodiment, FIG. 62 showing a spherical aberration, an astigmatic aberration, and a distortion aberration at the wide-angle position.
Figure 63:
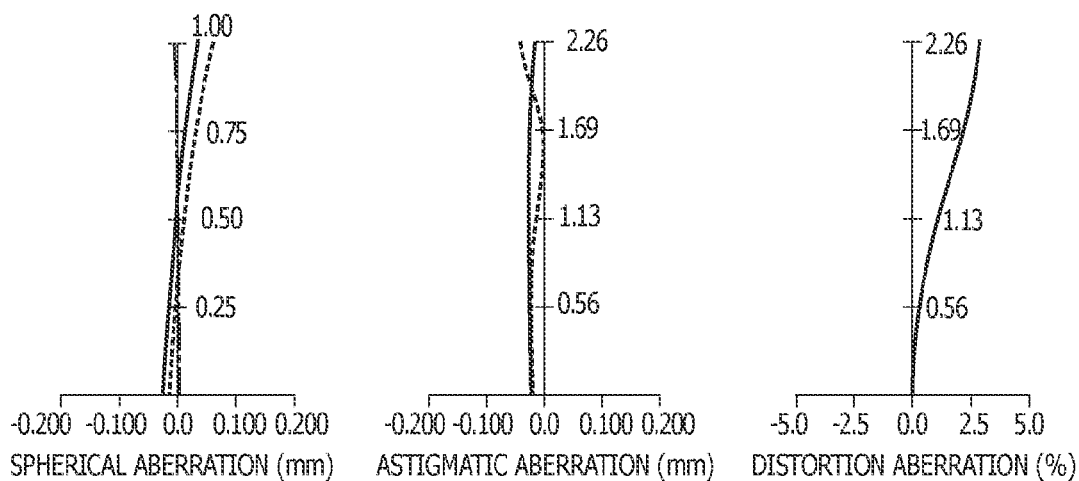
FIG. 63 is a graph showing a spherical aberration, an astigmatic aberration, and a distortion aberration at the intermediate focal length.
Figure 64:
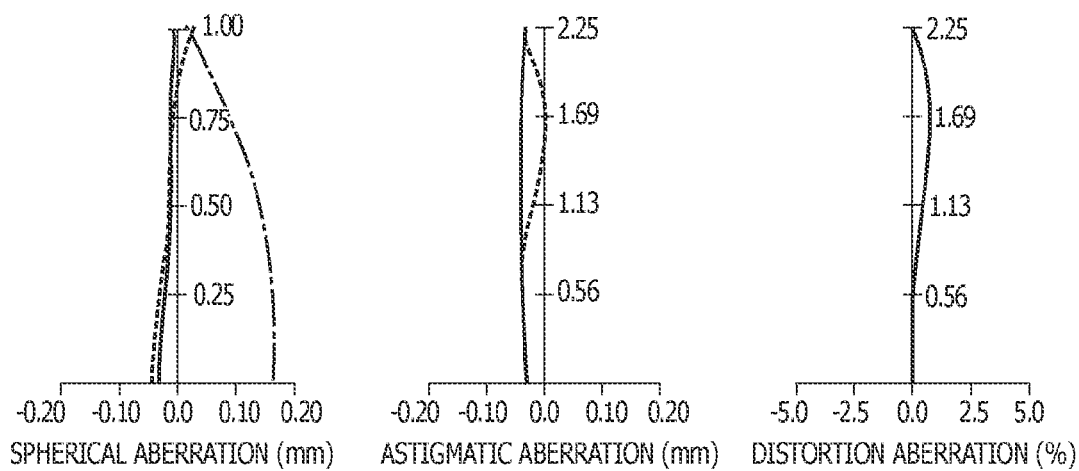
FIG. 64 is a graph showing a spherical aberration, an astigmatic aberration, and a distortion aberration at the telephoto position.

Each of FIGS. 62 to 64 shows a spherical aberration, an astigmatic aberration, and a distortion aberration in the numeral example 3 which is in focus at infinity. FIG. 62 shows the aberrations measured at the wide-angle position, FIG. 63 shows the aberrations at the intermediate focal length, and FIG. 64 shows the aberrations at the telephoto position. It is noted that in each of the spherical-aberration graphs, a solid line represents a spherical aberration at d-line, a dashed line represents a spherical aberration at C-line, and an alternatelong-and-short-dashed line represents a spherical aberration at g-line. In each of the astigmatic aberration graphs, a solid line represents a sagittal image plane and a dashed line represents a meridional image plane.

Values corresponding to the conditional formulae (1) to (5) of the respective numeral examples 1 to 3 are shown in Table 52.

TABLE 52

| CONDITIONAL FORMULA | | Example 1 | Example 2 | Example 3 |
|---|---|---|---|---|
| (1) | t2/fw | 0.12 | 0.12 | 0.12 |
| (2) | f2/fw | −3.07 | −3.87 | −2.34 |
| (3) | f12/fw | 2.73 | 3.23 | 2.85 |
| (4) | f12/f2 | −0.89 | −0.83 | −1.22 |
| (5) | vd31 − vd32 | 35.40 | 25.27 | 35.40 |

It is understood that the numeral examples 1 to 3 all satisfy the conditional formulae (1) to (5) even with simple constructions, and that, as shown in Tables 43 to 51 and the respective aberration graphs, the zoom lenses are composed small in structure and have a good optical performance for the imaging device having a large number of pixels.

An imaging apparatus according to the present invention will be described next.

The imaging apparatus according to the present invention includes a zoom lens, and an imaging device for converting an optical image formed by the zoom lens into an electrical signal. Any of the zoom lenses according to the above-described first to fourth inventions in the present invention can be applied to the zoom lens.

Figure 65:
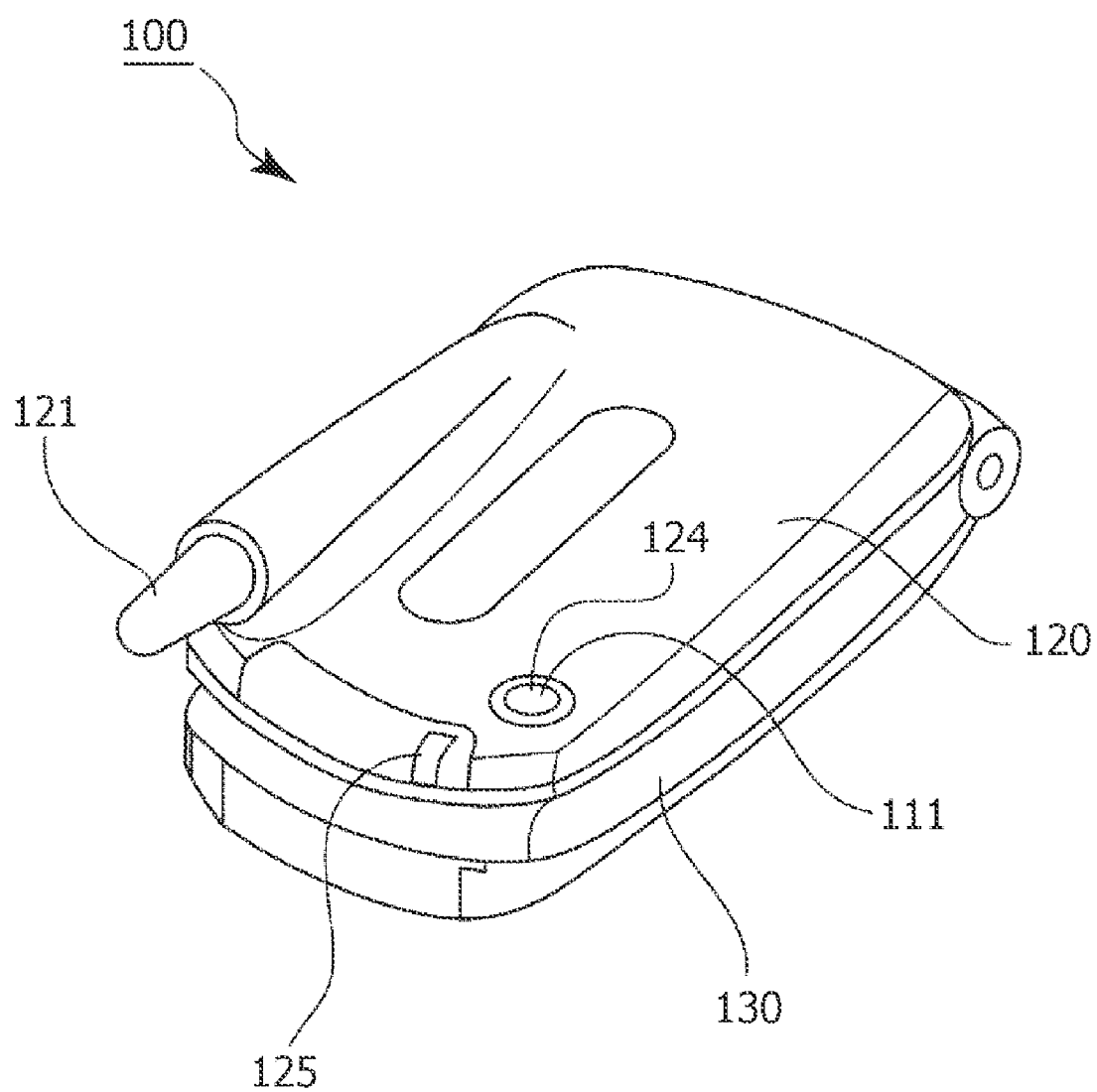
FIG. 65 is a diagram showing, along with FIGS. 66 and 67, an embodiment in which an imaging apparatus according to the present invention is applied to a camera section of a cellular phone, FIG. 65 being a perspective view showing a state of non-use or a standby state.
Figure 66:
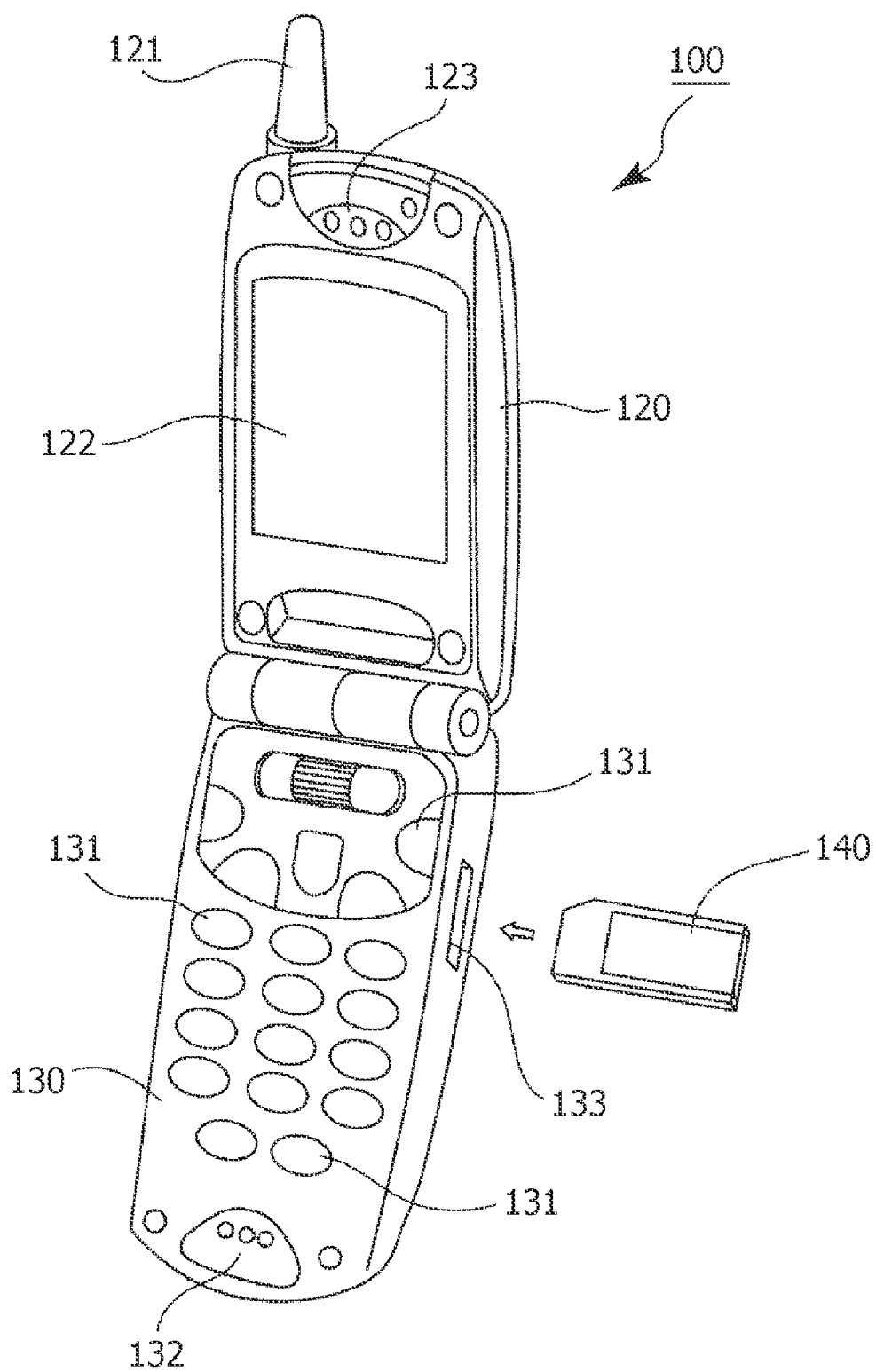
FIG. 66 is a perspective view showing a state of use.

An embodiment in which the imaging apparatus according to the present invention is applied to a camera section of a cellular phone is shown in FIGS. 65 to 67.

FIGS. 65 and 66 show the appearance of a cellular phone 100.

The cellular phone 100 is composed by connecting a display section 120 and a body section 130 foldably at a hinge section in the middle, and is in a folded state such as shown in FIG. 65 during carrying and is in a state in which the display section 120 and the body section 130 are unfolded such as shown in FIG. 66 during use such as during telephone conversation.

At a position closer to one side of a back surface of the display section 120, an antenna 121 for transmitting/receiving electric waves to and from a base station is retractably provided. On an inner side surface of the display section 120, a liquid crystal display panel 122 is disposed which is so large as to occupy an almost entire part of the inner side surface, and above the liquid crystal display panel 122, a speaker 123 is disposed. Furthermore, the display section 120 is also provided with an imager unit 110 of a digital camera section, and a zoom lens 111 of the imager unit 110 faces outward via an image-approaching hole 124 formed in the back of the display section 120. It is noted that the term "imager unit" is herein used to mean a unit composed of the imager lens 111 and an imaging device 112. Namely, the imager unit is a concept used to clarify that the imager lens 111 and the imaging device 112 need be provided inside the display section 120 simultaneously, but that other parts constituting the digital camera section, e.g., a camera control section, a recording medium, and the like may be disposed in the body section 130. It is noted that as the imaging device 112, one using a photoelectric conversion element such as, e.g., a CCD or a CMOS may be applicable. Furthermore, as the zoom lens 111, the zoom lens according to each of the embodiments of the above-described first to fourth inventions in the present invention can be applied, and further, the zoom lenses according to the present invention which are carried out in embodiments other than the embodiments disclosed in the present description can also be applied.

Furthermore, an infrared communication section 125 is disposed at an end of the display section 120. The infrared communication section 125 is provided with infrared light-emitting elements and infrared light-receiving elements, although not shown.

On an inner side surface of the body section 130 are numerical keys "0" to "9", operation keys 131, 131, . . . , such as a call key and a power key. Below a portion where the operation keys 131, 131, are disposed is a microphone 132. Furthermore, on a side surface of the body section 130 is a memory card slot 133. It is configured such that a memory card 140 is detachably attached to the body section 130 via the memory card slot 133.

FIG. 67 is a block diagram showing a configuration of the cellular phone 100.

The cellular phone 100 includes a CPU (Central Processing Unit) 150. The CPU 150 controls the entire operation of the cellular phone 100. Namely, the CPU 150 loads a control program stored in a ROM (Read Only Memory) 151 into a RAM (Random Access Memory) 152, to control the operation of the cellular phone 100 via a bus 153.

A camera control section 160 controls the imager unit 110 formed of the zoom lens 111 and the imaging device 112 to take an image such as a still image and a moving image. After subjecting the obtained image information to a compression process and the like into JPEG, MPEG, or the like, the camera control section 160 delivers the resultant image information to the bus 153. The image information delivered to the bus 153 is temporarily stored in the RAM 152, and outputted to a memory card interface 141 as necessary to be stored in the memory card 140 by the memory card interface 141, or displayed on the liquid crystal display panel 122 via a display control section 154. Furthermore, voice information recorded via the microphone 132 simultaneously with the image taking is temporarily stored in the RAM 152 along with the image information via an audio codec 170, and stored in the memory card 140 or outputted from the speaker 123 via the audio codec 170 simultaneously with display of the image on the liquid crystal display panel 122. Furthermore, the image information and the voice information are outputted to an infrared interface 155 as necessary, to be outputted to external equipment by the infrared interface 155 via the infrared communication section 125, and transmitted to external information equipment provided with a similar infrared communication section, e.g., a cellular phone, a personal computer, a PDA (Personal Digital Assistance), and the like. It is noted that when a moving image or a still image is to be displayed on the liquid crystal display panel 122 on the basis of image information stored in the RAM 152 or the memory card 140, a file stored in the RAM 152 or the memory card 140 is decoded or decompressed in the camera control section 160, and the resultant image data is transferred to the display control section 154 via the bus 153.

A communication control section 180 performs transmission and reception of electric waves to and from a base station via the antenna 121, and in a conversation mode, processes received voice information, thereafter outputs the processed voice information to the speaker 123 via the audio codec 170. The communication control section 180 also receives audio collected by the microphone 132 via the audio codec 170, subjects the audio to a predetermined process, and thereafter transmits the resultant audio.

The above-mentioned zoom lens 111 can be composed small in size in the direction of the incident light axis, and thus can easily be incorporated into thickness-restricted equipment such as the cellular phone 100. Furthermore, the zoom lens 111 can capture much information from a high-definition image, and thus is suitable as an imager lens of a cellular phone being portable information equipment.

It is noted that the structures and shapes as well as the numerical values that have been referred to in the above description of the embodiments and the numeral examples are provided merely as one example for illustrative purposes for ease of understanding of various embodiments for carrying out the present invention, and these are not to be construed as limiting the technical scope of the present invention.

The invention claimed is:

1. A zoom lens composed by arranging, in the order from an object side, a first lens group having a weak refractive power, a second lens group having a negative refractive power, a third lens group having a positive refractive power, and a fourth lens group having a positive refractive power, and configured to perform zooming by moving the second lens group and the third lens group, characterized in that:

the first lens group is composed by arranging in the order from an object side, a single lens having a negative refractive power, a prism for folding an optical path, and a single lens having a positive refractive power; and the second lens group is composed of one single lens having a negative refractive power, and satisfies the following conditional formula (1):

$$t2/fw<0.4 \quad (1)$$

where t2 represents the center thickness of the single lens having a negative refractive power constituting the second lens group, and fw represents the focal length of a whole lens system at a wide-angle position.

2. The zoom lens according to claim 1, characterized in that at least the single lens having a negative refractive power constituting the second lens group is made of a resin material, and satisfies the following conditional formula (2):

$$f2/fw<-2.0 \quad (2)$$

where f2 represents the focal length of the single lens having a negative refractive power constituting the second lens group.

3. The zoom lens according to claim 2, characterized in that at least the single lens having a positive refractive power constituting the first lens group is made of a resin material, and satisfies the following conditional formula (3):

$$f12/fw>2.0 \quad (3)$$

where f12 represents the focal length of the single lens having a positive refractive power constituting the first lens group.

4. The zoom lens according to claim 3, characterized by satisfying the following conditional formula (4):

$$-2.0 \leq f12/f2 \leq -0.5. \quad (4)$$

5. The zoom lens according to claim 1, characterized in that the third lens group is composed by arranging, in the order from an object side, a single lens having a positive refractive power and a single lens having a negative refractive power, and satisfies the following conditional formulae (5) and (6):

$$vd31-vd32>20, \text{ and} \quad (5)$$

$$0.9<\beta 3w \cdot \beta 3t<1.1 \quad (6)$$

where vd31 represents the Abbe number of d-line (wavelength=587.6 nm), of the single lens having a positive refractive power constituting the third lens group, vd32 represents the Abbe number of d-line, of the single lens having a negative refractive power constituting the third lens group, β3w represents the transverse magnification at the wide-angle position of the third lens group with respect to an infinity object, and β3t represents the transverse magnification at a telephoto position of the third lens group with respect to the infinity object.

6. A zoom lens composed by arranging, in the order from an object side, a first lens group having a weak refractive power, a second lens group having a negative refractive power, a third lens group having a positive refractive power, and a fourth lens group having a positive refractive power, and configured to perform zooming by moving the second lens group, the third lens group, and the fourth lens group, characterized in that:

the first lens group is composed by arranging, in the order from an object side, a single lens having a negative refractive power, a prism for folding an optical path, and a single lens having a positive refractive power; and the second lens group is composed of one single lens having a negative refractive power, and satisfies the following conditional formula (1):

$$t2/fw<0.4 \quad (1)$$

where t2 represents the center thickness of the single lens having a negative refractive power constituting the second lens group, and fw represents the focal length of a whole lens system at a wide-angle position.

7. The zoom lens according to claim 6, characterized in that at least the single lens having a negative refractive power constituting the second lens group is made of a resin material, and satisfies the following conditional formula (2):

$$f2/fw<-2.0 \quad (2)$$

where f2 represents the focal length of the single lens having a negative refractive power constituting the second lens group.

8. The zoom lens according to claim 7, characterized in that at least the single lens having a positive refractive power constituting the first lens group is made of a resin material, and satisfies the following conditional formula (3):

$$f12/fw>2.0 \quad (3)$$

where f12 represents the focal length of the single lens having a positive refractive power constituting the first lens group.

9. The zoom lens according to claim 8, characterized by satisfying the following conditional formula (4):

$$-2.0 \leq f12/f2 \leq -0.5. \quad (4)$$

10. The zoom lens according to claim 6, characterized in that the third lens group is composed by arranging, in the order from an object side, a single lens having a positive refractive power and a single lens having a negative refractive power, and satisfies the following conditional formula (5):

$$vd31-vd32>20 \quad (5)$$

where vd31 represents the Abbe number of d-line of the single lens constituting the third lens group and having a a positive refractive power, and vd32 represents the Abbe number of d-line, of the single lens having a negative refractive power constituting the third lens group.

11. A zoom lens composed by arranging, in the order from an object side, a first lens group having a weak refractive power, a second lens group having a negative refractive power, a third lens group having a positive refractive power, and a fourth lens group having a positive refractive power, and configured to perform zooming by moving the second lens group and the third lens group, characterized in that:

the first lens group is composed by arranging, in the order from the object side, a lens prism having a negative refractive power for folding an optical path, and a single lens having a positive refractive power; and the second lens group is composed of one single lens having a negative refractive power, and satisfies the following conditional formula (1):

$$t2/fw<0.4 \qquad (1)$$

where t2 represents the center thickness of the single lens having a negative refractive power constituting the second lens group, and fw represents the focal length of a whole lens system at a wide-angle position.

12. The zoom lens according to claim 11, characterized in that at least the single lens having negative a refractive power constituting the second lens group is made of a resin material, and satisfies the following conditional formula (2):

$$f2/fw<-2.0 \qquad (2)$$

where f2 represents the focal length of the single lens having a negative refractive power constituting the second lens group.

13. The zoom lens according to claim 12, characterized in that at least the single lens having a positive refractive power constituting the first lens group is made of a resin material, and satisfies the following conditional formula (3):

$$f12/fw>2.0 \qquad (3)$$

where f12 represents the focal length of the single lens having a positive refractive power constituting the first lens group.

14. The zoom lens according to claim 13, characterized by satisfying the following conditional formula (4):

$$-2.0 \leq f12/f2 \leq -0.5. \qquad (4)$$

15. The zoom lens according to claim 11, characterized in that the third lens group is composed by arranging, in the order from an object side, a single lens having a positive refractive power and a single lens having a negative refractive power, and satisfies the following conditional formulae (5) and (6):

$$vd31-vd32>20, \text{ and} \qquad (5)$$

$$0.9<\beta3w \cdot \beta3t<1.1 \qquad (6)$$

where vd31 represents the Abbe number of d-line of the single lens having a positive refractive power constituting the third lens group, vd32 represents the Abbe number of d-line of the single lens having a negative refractive power constituting the third lens group, β3w represents the transverse magnification at the wide-angle position of the third lens group with respect to an infinity object, and β3t represents the transverse magnification at a telephoto position of the third lens group with respect to the infinity object.

16. A zoom lens composed by arranging, in the order from an object side, a first lens group having a weak refractive power, a second lens group having a negative refractive power, a third lens group having a positive refractive power, and a fourth lens group having a positive refractive power, and configured to perform zooming by moving the second lens group, the third lens group, and the fourth lens group, characterized in that:

the first lens group is composed by arranging, in the order from an object side, a lens prism having a negative refractive power for folding an optical path, and a single lens having a positive refractive power; and the second lens group is composed of one single lens having a negative refractive power, and satisfies the following conditional formula (1):

$$t2/fw<0.4 \qquad (1)$$

where t2 represents the center thickness of the single lens having a negative refractive power constituting the second lens group, and fw represents the focal length of a whole lens system at a wide-angle position.

17. The zoom lens according to claim 16, characterized in that at least the single lens having a negative refractive power constituting the second lens group is made of a resin material, and satisfies the following conditional formula (2):

$$f2/fw<-2.0 \qquad (2)$$

where f2 represents the focal length of the single lens having a negative refractive power constituting the second lens group.

18. The zoom lens according to claim 17, characterized in that at least the single lens having a positive refractive power constituting the first lens group is made of a resin material, and satisfies the following conditional formula (3):

$$f12/fw>2.0 \qquad (3)$$

where f12 represents the focal length of the single lens having a positive refractive power constituting the first lens group.

19. The zoom lens according to claim 18, characterized by satisfying the following conditional formula (4):

$$-2.0 \leq f12/f2 \leq -0.5. \qquad (4)$$

20. The zoom lens according to claim 16, characterized in that the third lens group is composed by arranging, in the order from an object side, a single lens having a positive refractive power and a single lens having a negative refractive power, and satisfies the following conditional formula (5):

$$vd31-vd32>20 \qquad (5)$$

where vd31 represents the Abbe number of d-line of the single lens having a a positive refractive power constituting the third lens group, and vd32 represents the Abbe number of d-line of the single lens having a negative refractive power constituting the third lens group.

21. An imaging apparatus having a zoom lens and an imaging device for converting an optical image formed by the zoom lens into an electrical signal, characterized in that:

the zoom lens is composed by arranging, in the order from an object side, a first lens group having a weak refractive power, a second lens group having a negative refractive power, a third lens group having a positive refractive power, and a fourth lens group having a positive refractive power, and is configured to perform zooming by moving the second lens group and the third lens group; the first lens group is composed by arranging, in the order from the object side, a single lens having a negative refractive power, a prism for folding an optical path, and a single lens having a positive refractive power; and the second lens group is composed of one single lens having a negative refractive power, and satisfies a conditional formula (1) t2/fw<0.4, where t2 represents the center thickness of the single lens having a negative refractive power constituting the second lens group and fw represents the focal length of a whole lens system at a wide-angle position.

22. An imaging apparatus having a zoom lens and an imaging device for converting an optical image formed by the zoom lens into an electrical signal, characterized in that:

the zoom lens is composed by arranging, in the order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group; the first lens group is composed by arranging, in the order from an object side, a single lens having a negative refractive power, a prism for folding an optical path, and a single lens having a positive refractive power; and the second lens group is composed of one single lens having a negative refractive power, and satisfies a conditional formula (1) t2/fw<0.4, where t2 represents the center thickness of the single lens having a negative refractive power constituting the second lens group and fw represents the focal length of a whole lens system at a wide-angle position.

23. An imaging apparatus having a zoom lens and an imaging device for converting an optical image formed by the zoom lens into an electrical signal, characterized in that:

the zoom lens is composed by arranging, in the order from an object side, a first lens group having a weak refractive power, a second lens group having a negative refractive power, a third lens group having a positive refractive power, and a fourth lens group having a positive refractive power, and is configured to perform zooming by moving the second lens group and the third lens group; the first lens group is composed by arranging, in the order from the object side, a lens prism having a negative refractive power for folding an optical path, and a single lens having a positive refractive power; and the second lens group is composed of one single lens having a negative refractive power, and satisfies a conditional formula (1) t2/fw<0.4, where t2 represents the center thickness of the single lens having a negative refractive power constituting the second lens group and fw represents the focal length of a whole lens system at a wide-angle position.

24. An imaging apparatus having a zoom lens and an imaging device for converting an optical image formed by the zoom lens into an electrical signal, characterized in that:

the zoom lens is composed by arranging, in the order from an object side, a first lens group having a weak refractive power, a second lens group having a negative refractive power, a third lens group having a positive refractive power, and a fourth lens group having a positive refractive power, and is configured to perform zooming by moving the second lens group, the third lens group, and the fourth lens group; the first lens group is composed by arranging, in the order from an object side, a lens prism having a negative refractive power for folding an optical path, and a single lens having a positive refractive power; and the second lens group is composed of one single lens having a negative refractive power, and satisfies a conditional formula (1) t2/fw<0.4, where t2 represents the center thickness of the single lens having a negative refractive power constituting the second lens group and fw represents the focal length of a whole lens system at a wide-angle position.

* * * * *